(12) United States Patent
Sunkavalli et al.

(10) Patent No.: US 10,665,011 B1
(45) Date of Patent: May 26, 2020

(54) DYNAMICALLY ESTIMATING LIGHTING PARAMETERS FOR POSITIONS WITHIN AUGMENTED-REALITY SCENES BASED ON GLOBAL AND LOCAL FEATURES

(71) Applicants: Adobe Inc., San Jose, CA (US); Université Laval, Québec (CA)

(72) Inventors: Kalyan Sunkavalli, San Jose, CA (US); Sunil Hadap, Dublin, CA (US); Nathan Carr, San Jose, CA (US); Jean-Francois Lalonde, Quebec City (CA); Mathieu Garon, Quebec City (CA)

(73) Assignees: ADOBE INC., San Jose, CA (US); UNIVERSITÉ LAVAL, Quebec (CA)

( * ) Notice: Subject to any disclaimer, the term of this patent is extended or adjusted under 35 U.S.C. 154(b) by 0 days.

(21) Appl. No.: 16/428,482

(22) Filed: May 31, 2019

(51) Int. Cl.
| | | |
|---|---|---|
| *G06T 15/80* | (2011.01) | |
| *G06N 20/10* | (2019.01) | |
| *G06T 19/00* | (2011.01) | |
| *G06N 3/08* | (2006.01) | |
| *G06T 15/00* | (2011.01) | |

(52) U.S. Cl.
CPC ............ *G06T 15/80* (2013.01); *G06N 3/084* (2013.01); *G06N 20/10* (2019.01); *G06T 15/005* (2013.01); *G06T 19/006* (2013.01)

(58) Field of Classification Search
CPC ................................ G06T 15/80; G06N 20/10
See application file for complete search history.

(56) References Cited

U.S. PATENT DOCUMENTS

| | | | | |
|---|---|---|---|---|
| 5,522,491 A | * | 6/1996 | Baudat | G06K 9/52 194/207 |
| RE42,255 E | * | 3/2011 | Woodall | G01J 3/465 348/273 |
| 2004/0223218 A1 | * | 11/2004 | Putilin | H04N 13/366 359/462 |
| 2004/0227992 A1 | * | 11/2004 | Putilin | H04N 13/117 359/462 |

(Continued)

OTHER PUBLICATIONS

J. Barron and J. Malik. Intrinsic scene properties from a single rgb-d image. IEEE Conference on Computer Vision and Pattern Recognition, 2013.

(Continued)

*Primary Examiner* — Jitesh Patel
(74) *Attorney, Agent, or Firm* — Keller Jolley Preece

(57) ABSTRACT

This disclosure relates to methods, non-transitory computer readable media, and systems that use a local-lighting-estimation-neural network to render a virtual object in a digital scene by using a local-lighting-estimation-neural network to analyze both global and local features of the digital scene and generate location-specific-lighting parameters for a designated position within the digital scene. For example, the disclosed systems extract and combine such global and local features from a digital scene using global network layers and local network layers of the local-lighting-estimation-neural network. In certain implementations, the disclosed systems can generate location-specific-lighting parameters using a neural-network architecture that combines global and local feature vectors to spatially vary lighting for different positions within a digital scene.

20 Claims, 17 Drawing Sheets

(56) References Cited

U.S. PATENT DOCUMENTS

| | | | | |
|---|---|---|---|---|
| 2005/0146787 | A1* | 7/2005 | Lukyanitsa | G02F 1/13471 |
| | | | | 359/462 |
| 2012/0051628 | A1* | 3/2012 | Noguchi | G06F 16/5854 |
| | | | | 382/159 |
| 2016/0140408 | A1* | 5/2016 | Shen | G06K 9/4628 |
| | | | | 382/157 |
| 2018/0114096 | A1* | 4/2018 | Sen | G06T 5/002 |
| 2018/0253869 | A1* | 9/2018 | Yumer | G06T 11/001 |
| 2018/0359416 | A1* | 12/2018 | Hold-Geoffroy | |
| | | | | G06K 9/00664 |
| 2019/0098724 | A1* | 3/2019 | Zhao | G06T 7/33 |
| 2019/0147305 | A1* | 5/2019 | Lu | G06N 3/0454 |
| | | | | 382/157 |
| 2019/0164261 | A1* | 5/2019 | Sunkavalli | G06T 9/00 |
| 2019/0347526 | A1* | 11/2019 | Sunkavalli | G06K 9/46 |

OTHER PUBLICATIONS

J. T. Barron and J. Malik. Shape, illumination, and reflectance from shading. IEEE Transactions on Pattern Analysis and Machine Intelligence, 37(8):1670-1687, 2015.

V. Blanz and T. Vetter. A morphable model for the synthesis of 3d faces. In SIGGRAPH, pp. 187-194, 1999.

D. Cheng, J. Shi, Y. Chen, X. Deng, and X. Zhang. Learning scene illumination by pairwise photos from rear and front mobile cameras. Computer Graphics Forum, 37:213-221, 10 2018.

P. Debevec. Rendering synthetic objects into real scenes: Bridging traditional and image-based graphics with global illumination and high dynamic range photography. In Proceedings of the 25th Annual Conference on Computer Graphics and Interactive Techniques, SIGGRAPH, pp. 189-198, 1998.

P. E. Debevec and J. Malik. Recovering high dynamic range radiance maps from photographs. In ACM SIGGRAPH 2008 classes, p. 31. ACM, 2008.

Y. Ganin and V. Lempitsky. Unsupervised domain adaptation by backpropagation. In International Conference on Machine Learning (ICML), 2015.

M.-A. Gardner, K. Sunkavalli, E. Yumer, X. Shen, E. Gambaretto, C. Gagné, and J.-F. Lalonde. Learning to predict indoor illumination from a single image. ACM Transactions on Graphics (SIGGRAPH Asia), 9(4), 2017.

S. Georgoulis, K. Rematas, T. Ritschel, M. Fritz, T. Tuytelaars, and L. Van Gool. What is around the camera? In IEEE International Conference on Computer Vision, Oct. 2017.

S. Georgoulis, K. Rematas, T. Ritschel, E. Gavves, M. Fritz, L. Van Gool, and T. Tuytelaars. Reflectance and natural illumination from single-material specular objects using deep learning. IEEE Transactions on Pattern Analysis and Machine Intelligence, 40(8):1932-1947, 2018.

R.Grosse, M.K. Johnson, E.H.Adelson, and W.T.Freeman. Ground truth dataset and baseline evaluations for intrinsic image algorithms. In IEEE International Conference on Computer Vision (ICCV), 2009.

L. Gruber, T. Richter-Trummer, and D. Schmalstieg. Real-time photometric registration from arbitrary geometry. In IEEE International Symposium on Mixed and Augmented Reality (ISMAR). IEEE, 2012.

Y. Hold-Geoffroy, A. Athawale, and J.-F. Lalonde. Deep sky modeling for single image outdoor lighting estimation. In IEEE International Conference on Computer Vision and Pattern Recognition, 2019.

Y. Hold-Geoffroy, K. Sunkavalli, S. Hadap, E. Gambaretto, and J.-F. Lalonde. Deep outdoor illumination estimation. In IEEE International Conference on Computer Vision and Pattern Recognition, 2017.

G. Huang, Z. Liu, L. van der Maaten, and K. Q. Weinberger. Densely connected convolutional networks. In IEEE Conference on Computer Vision and Pattern Recognition, 2017.

F. N. landola, S. Han, M. W. Moskewicz, K. Ashraf, W. J. Daily, and K. Keutzer. Squeezenet: Alexnet-level accuracy with 50x fewer parameters and < 0.5 mb model size. arXiv preprint arXiv:1602.07360, 2016.

W. Jakob. Mitsuba renderer, 2010. http://www.mitsubarenderer.org.

K. Karsch, V. Hedau, D. Forsyth, and D. Hoiem. Rendering synthetic objects into legacy photographs. ACM Transactions on Graphics, 30(6):1, 2011.

K. Karsch, K. Sunkavalli, S. Hadap, N. Carr, H. Jin, R. Fonte, M. Sittig, and D. Forsyth. Automatic scene inference for 3d object compositing. ACM Transactions on Graphics, (3):32:1-32:15, 2014.

E. A. Khan, E. Reinhard, R. W. Fleming, and H. H. Bulthoff. Image-based material editing. ACM Transactions on Graphics, 25(3):654, 2006.

J. F. Lalonde, A. A. Efros, and S. G. Narasimhan. Estimating the natural illumination conditions from a single outdoor image. International Journal of Computer Vision, 98(2):123-145, 2012.

J.-F. Lalonde, D. Hoiem, A. A. Efros, C. Rother, J. Winn, and A. Criminisi. Photo clip art. ACM Transactions on Graphics, 26(3), Jul. 2007.

Z. Li and N. Snavely. CGIntrinsics: Better intrinsic image decomposition through physically-based rendering. In European Conference on Computer Vision, 2018.

S. Lombardi and K. Nishino. Reflectance and illumination recovery in the wild. IEEE Transactions on Pattern Analysis and Machine Intelligence, 38(1), 2016.

R. Maier, K. Kim, D. Cremers, J. Kautz, and M. Nießner. Intrinsic3d: High-quality 3d reconstruction by joint appearance and geometry optimization with spatially-varying lighting. In Proceedings of the IEEE International Conference on Computer Vision, pp. 3114-3122, 2017.

R. Monroy, M. Hudon, and A. Smolic. Dynamic environment mapping for augmented reality applications on mobile devices. In F. Beck, C. Dachsbacher, and F. Sadlo, editors, Vision, Modeling and Visualization. The Eurographics Association, 2018.

P. K. Nathan Silberman, Derek Hoiem and R. Fergus. Indoor segmentation and support inference from rgbd images. In European Conference on Computer Vision, 2012.

R. Ramamoorthi and P. Hanrahan. An efficient representation for irradiance environment maps. In ACM Transactions on Graphics (SIGGRAPH), pp. 497-500. ACM, 2001.

E. Reinhard, M. Stark, P. Shirley, and J. Ferwerda. Photographic tone reproduction for digital images. ACM transactions on graphics, 21(3):267-276, 2002.

K. Rematas, T. Ritschel, M. Fritz, E. Gavves, and T. Tuyte-laars. Deep reflectance maps. In IEEE Conference on Computer Vision and Pattern Recognition, 2016.

O. Ronneberger, P. Fischer, and T. Brox. U-net: Convolutional networks for biomedical image segmentation. In International Conference on Medical image computing and computer-assisted intervention, pp. 234-241. Springer, 2015.

P.-P. Sloan, J. Kautz, and J. Snyder. Precomputed radiance transfer for real-time rendering in dynamic, low-frequency lighting environments. In ACM Transactions on Graphics, vol. 21, pp. 527-536. ACM, 2002.

S. Song, F. Yu, A. Zeng, A. X. Chang, M. Savva, and T. Funkhouser. Semantic scene completion from a single depth image. IEEE Conference on Computer Vision and Pattern Recognition, 2017.

H. Weber, D. Prevost, and J.-F. Lalonde. Learning to estimate indoor lighting from 3D objects. In International Conference on 3D Vision, 2018.

A. R. Zamir, A. Sax, W. Shen, L. Guibas, J. Malik, and S. Savarese. Taskonomy: Disentangling task transfer learning. In IEEE Conference on Computer Vision and Pattern Recognition, 2018.

E. Zhang, M. F. Cohen, and B. Curless. Emptying, refurnishing, and relighting indoor spaces. ACM Transactions on Graphics, 35(6), 2016.

E. Zhang, M. F. Cohen, and B. Curless. Discovering point lights with intensity distance fields. In IEEE Conference on Computer Vision and Pattern Recognition, 2018.

(56) References Cited

OTHER PUBLICATIONS

Y. Zhang, S. Song, E. Yumer, M. Savva, J.-Y. Lee, H. Jin, and T. Funkhouser. Physically-based rendering for indoor scene understanding using convolutional neural networks. The IEEE Conference on Computer Vision and Pattern Recog-nition (CVPR), 2017.

* cited by examiner

DYNAMICALLY ESTIMATING LIGHTING PARAMETERS FOR POSITIONS WITHIN AUGMENTED-REALITY SCENES BASED ON GLOBAL AND LOCAL FEATURES

BACKGROUND

Augmented-reality systems often portray digitally enhanced images or other scenes with computer-simulated objects. To portray such scenes, an augmented-reality system sometimes renders both real objects and computer-simulated objects with shading and other lighting conditions. Many augmented-reality systems attempt to seamlessly render virtual objects composited with objects from the real world. To achieve convincing composites, an augmented reality system need to illuminate virtual objects with consistent lighting matching a physical scene.

Despite advances in estimating lighting conditions for digitally enhanced scenes, some technical limitations impede conventional augmented-reality systems from realistically lighting virtual objects and accurately reflecting changes to physical environments. For example, conventional augmented-reality systems cannot quickly render or adjust lighting conditions in real (or near-real) time, alter lighting conditions when a digitally enhanced scene changes, or faithfully capture variation of lighting throughout a scene. Three-dimensional scenes exasperate these technical limitations because each location in three dimensions can receive a different amount of light at a given moment from a full 360-degree range of directions. Both the directional dependence and the variation of light across the scene play an important role when attempting to faithfully and convincingly render synthetic objects into the scene.

For example, some conventional augmented-reality systems cannot realistically portray lighting conditions for a computer-simulated object in real (or near-real) time. In some cases, conventional augmented-reality systems use an ambient-light model (i.e., only a single constant term with no directional information) to estimate the light received by an object from its environment. For example, conventional augmented-reality systems often use simple heuristics to create lighting conditions, such as by relying on mean-brightness values for pixels of (or around) an object to create lighting conditions in an ambient-light model. Additionally, existing augmented-reality systems decode full environmental maps of a low dynamic range ("LDR") image or a high dynamic range ("HDR") image as a basis for estimating lighting conditions. Based on the environmental map, such existing systems determine a single lighting parameter for the entire image (e.g., by estimating lighting conditions at a default center of the image). Such an approximation does not capture the directional variation of lighting and can fail to produce a reasonable ambient-lighting approximation under many conditions—resulting in unrealistic and unnatural lighting. Indeed, by applying a single lighting parameter, existing systems can illuminate computer-simulated objects with lighting that conflicts with natural lighting of real objects in the immediate physical vicinity.

In addition to challenges to portraying realistic lighting, in some cases, conventional augmented-reality systems cannot flexibly adjust or change lighting conditions for a particular computer-simulated object in a scene. For instance, some augmented-reality systems determine lighting conditions for a digitally enhanced image as a collective set of objects or (as above) for an image as a whole. Because such lighting conditions generally apply to a set of objects or an entire image, conventional systems either cannot adjust lighting conditions for a particular object or can only do so by redetermining lighting conditions for the entire digitally enhanced image in an inefficient use of computing resources.

Independent of technical limitations affecting the realism or flexibility of lighting in augmented reality, some conventional augmented-reality systems can estimate reflections (but not lighting conditions based on a light source) in real time for a virtual object. For instance, some conventional augmented-reality systems use exposure information to determine a relative brightness of an environment by scanning part of the environment and completing a map of the environment using machine-learning algorithms. By extrapolating a map of the environment, such conventional systems can estimate a reflection for virtual objects within the environment, but cannot determine lighting conditions for such virtual objects based on a real light source within or outside of the environment.

SUMMARY

This disclosure describes embodiments of methods, non-transitory computer readable media, and systems that solve the foregoing problems in addition to providing other benefits. For example, the disclosed systems can render a virtual object in a digital scene by using a local-lighting-estimation-neural network to analyze both global and local features of the digital scene and generate location-specific-lighting parameters for a designated position within the digital scene. In certain implementations, the disclosed systems extract and combine such global and local features from a digital scene using global network layers and local network layers of the local-lighting-estimation-neural network. As explained below, the disclosed systems can generate location-specific-lighting parameters using a neural-network architecture that combines global and local feature vectors to spatially vary lighting for different positions within a digital scene. As requests to render a virtual object come in real (or near real) time, the disclosed systems can quickly generate different location-specific-lighting parameters that reflect lighting conditions at different positions of (or changes in lighting within) a digital scene more realistically and flexibly than state-of-the-art augmented-reality systems.

In some embodiments, for example, the disclosed systems identify a request to render a virtual object at a designated position within a digital scene. The disclosed systems subsequently extract a global feature vector from the digital scene using a global anterior set of network layers of a local-lighting-estimation-neural network. Similarly, the systems extract a local feature vector from a local patch of the digital scene utilizing a local anterior set of network layers of the local-lighting-estimation-neural network. The systems further combine the global feature vector and the local feature vector to form a combined feature vector. Based on the combined feature vector, the systems generate location-specific-lighting parameters for the designated position using a posterior set of layers of the local-lighting-estimation-neural network. In response to the request to render, the systems render a modified digital scene comprising the virtual object at the designated position illuminated according to the location-specific-lighting parameters.

The following description sets forth additional features and advantages of the disclosed methods, non-transitory computer readable media, and systems, and may make such additional features and advantages obvious or disclose them from the practice of exemplary embodiments.

BRIEF DESCRIPTION OF THE DRAWINGS

The detailed description refers to the drawings briefly described below.

DETAILED DESCRIPTION

Figure 1:
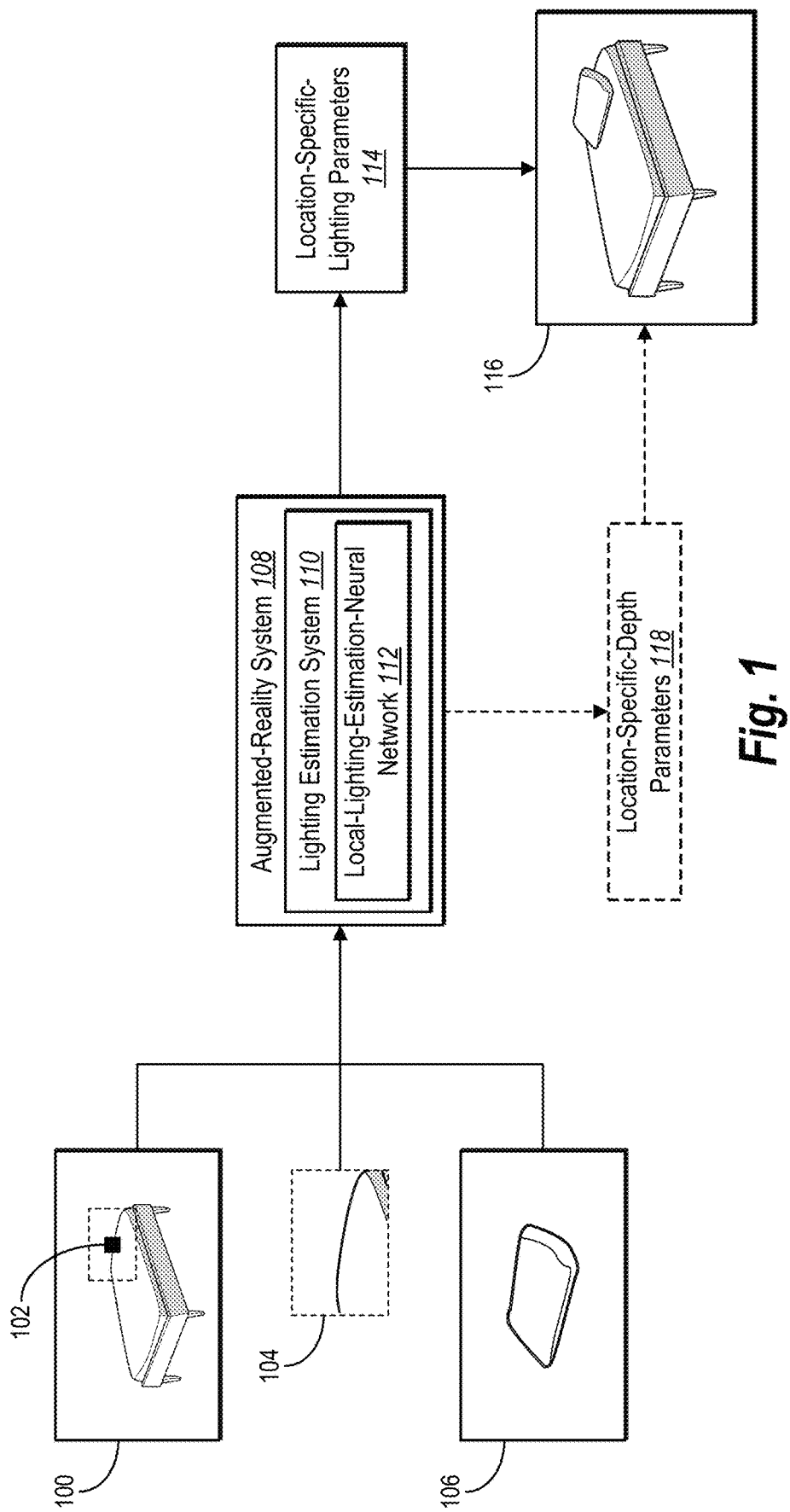
FIG. 1 illustrates an augmented-reality system and a lighting estimation system using a local-lighting-estimation-neural network to generate location-specific-lighting parameters for a designated position within a digital scene and rendering a modified digital scene comprising the virtual object at the designated position according to the parameters in accordance with one or more embodiments.

This disclosure describes one or more embodiments of a lighting estimation system that uses a local-lighting-estimation-neural network to estimate lighting parameters for specific positions within a digital scene for augmented reality. Based on a request to render a virtual object in a digital scene, for example, the lighting estimation system uses a local-lighting-estimation-neural network to analyze both global and local features of the digital scene and generate location-specific-lighting parameters for a designated position within the digital scene. In certain implementations, the lighting estimation system renders a modified digital scene comprising the virtual object at the designated position lit according to the parameters. Furthermore, the lighting estimation system can spatially vary lighting for different positions within the digital scene on demand. To generate such location-specific-lighting parameters, the lighting estimation system can extract and combine global and local features from a digital scene using global network layers and local network layers of the local-lighting-estimation-neural network. As requests to render a virtual object come in real (or near real) time, the lighting estimation system can quickly generate different location-specific-lighting parameters that reflect lighting conditions at different positions of (or changes in lighting within) a digital scene more realistically and flexibly than state-of-the-art augmented-reality systems.

For instance, in some embodiments, the lighting estimation system identifies a request to render a virtual object at a designated position within a digital scene. To render such a scene, the lighting estimation system can extract a global feature vector from the digital scene using a global anterior set of network layers of a local-lighting-estimation-neural network. The lighting estimation system similarly can extract a local feature vector from a local patch of the digital scene utilizing a local anterior set of network layers of the local-lighting-estimation-neural network. The lighting estimation system further can combine the global feature vector and the local feature vector to form a combined feature vector. Based on the combined feature vector, the lighting estimation system can generate location-specific-lighting parameters for the designated position using a posterior set of layers of the local-lighting-estimation-neural network. In response to the request to render, the lighting estimation system can render a modified digital scene comprising the virtual object at the designated position illuminated according to the location-specific-lighting parameters.

As noted above, the lighting estimation system can use both global anterior and local anterior sets of network layers of the local-lighting-estimation-neural network to analyze global and local features of a digital scene. For instance, the lighting estimation system can extract a global feature map from a digital scene and a global feature vector from the global feature map using the global anterior set of network layers. In some cases, the lighting estimation system also identifies a local position indicator for a designated position and modifies the global feature map based on the local position indicator (e.g., by using a masking feature map corresponding to a local patch) before extracting the global feature vector. As for the local features, the lighting estimation system can extract a local feature map from a local patch of the digital scene and a local feature vector from the local feature map using the local anterior set of network layers. The lighting estimation system subsequently combines the global and local feature vectors and uses a posterior set of network layers to generate location-specific-lighting parameters from the combined global and local feature vectors.

By using location-specific-lighting parameters, in some embodiments, the lighting estimation system can both illuminate a virtual object from different perspectives of a scene and quickly update lighting conditions for different positions (or from different perspectives) of a virtual object on demand. For instance, in some cases, the lighting estimation system generates location-specific-lighting parameters that capture lighting conditions for a position of a virtual object from various perspectives within the digital scene. Upon identifying a position-adjustment request to move a virtual object to a new designated position, the lighting estimation system can also generate new global and local feature vectors (and a new combined feature vector) for the digital scene to output new location-specific-lighting parameters for the new designated position. Upon identifying a change in lighting conditions for the digital scene, the lighting estimation system can also update global and local feature vectors for the digital scene to output new location-specific-lighting parameters for the new lighting conditions.

In addition to location-specific-lighting parameters, in some embodiments, the lighting estimation system generates location-specific-depth parameters. Based on a combined feature vector, for example, the lighting estimation system can generate location-specific-depth parameters for a designated position within a digital scene using an alternative posterior set of network layers of the local-lighting-estimation-neural network. The lighting estimation system may further render a modified digital scene comprising a virtual object at the designated depth position according to the location-specific-depth parameters in response to a render request.

When generating one or both of location-specific-lighting parameters or location-specific-depth parameters, the lighting estimation system can generate spherical-harmonic coefficients that indicate lighting conditions or depth for a designated position within a digital scene for a virtual object. Such localized-lighting-spherical-harmonic coefficients can capture high dynamic range ("HDR") lighting for a position within a digital scene when the digital scene is represented in low dynamic range ("LDR") lighting. Such localized-depth-spherical-harmonic coefficients can capture depth from an LDR image. As a virtual object changes positions within the digital scene, the lighting estimation system can use the local-lighting-estimation-neural network to generate one or both of new localized-lighting-spherical-harmonic coefficients and new localized-depth-spherical-harmonic coefficients by request to realistically depict changes in lighting at changed positions of the virtual object.

As further suggested above, in some embodiments, the lighting estimation system not only applies a local-lighting-estimation-neural network but can optionally train such a network to generate location-specific-lighting parameters. When training a neural network, in certain implementations, the lighting estimation system extracts a global-feature-training vector from a digital training scene (and a local-feature-training vector from a local patch of the digital training scene) respectively using a global anterior set of network layers and a local anterior set of network layers of a local-lighting-estimation-neural network. Based on generating a combined-feature-training vector, the lighting estimation system further generates location-specific-lighting-training parameters for the designated position using a posterior set of network layers of the local-lighting-estimation-neural network. As suggested above, the lighting estimation system can further generate location-specific-depth parameters for the designated position using an alternative posterior set of network layers.

Having generated location-specific-lighting-training parameters, the lighting estimation system modifies network parameters of the local-lighting-estimation-neural network based on a comparison of the location-specific-lighting-training parameters with ground-truth-lighting parameters for the designated position within the digital training scene. Similarly, in some embodiments, the lighting estimation system also modifies network parameters of the local-lighting-estimation-neural network based on a comparison of the location-specific-depth-training parameters with ground-truth-depth parameters for the designated position. Such ground-truth parameters may be projected from cube maps. By iteratively generating such location-specific-lighting-training parameters and (in some cases) location-specific-depth-training parameters—and adjusting network parameters of the neural network—the lighting estimation system can train a local-lighting-estimation-neural network to a point of convergence.

In addition (or in the alternative) to training a neural network to generate location-specific-lighting-training parameters based on location-specific-depth-training parameters, in some embodiments, the lighting estimation system uses additional training tasks to train a neural network. For example, in some implementations, the lighting estimation system extracts and modifies a latent feature vector using a gradient reversal layer and modifies network parameters of the local-lighting-estimation-neural network based on an adversarial loss from a comparison by a discriminator-neural network of the modified latent feature vector and a ground-truth-feature vector. In certain implementations, the lighting estimation system uses skip links from the local anterior set of network layers and reconstructs a localized albedo image and a localized shading image of a local patch from the digital training scene. The lighting estimation system subsequently modifies network parameters of the local-lighting-estimation-neural network based on loss functions comparing the localized albedo and localized shading images to the local patch and ground-truth images. By employing additional training tasks, the lighting estimation system can have increased accuracy compared to conventional systems.

As suggested above, the disclosed lighting estimation system overcomes several technical deficiencies that hinder conventional augmented-reality systems. For example, the lighting estimation system improves the accuracy and realism with which existing augmented-reality systems generate lighting conditions for specific locations within a digital scene. As noted above and described below, the lighting estimation system can create such realistic lighting in part by using a local-lighting-estimation-neural network trained to analyze global and local features of a digital scene in global and local network layers and generate location-specific-spherical-lighting parameters for a designated position based on a combination of such global and local features.

Unlike some conventional systems that render unnatural lighting for virtual objects using a single lighting parameter for an entire image, the disclosed lighting estimation system can create lighting parameters with coordinate-level accuracy corresponding to a designated position within a digital scene. Further, unlike certain conventional systems that flip an HDR image to estimate out-of-view illumination but poorly portray lighting predominantly coming from outside the perspective of a digital scene, the disclosed lighting estimation system can create lighting parameters that capture lighting conditions emanating from a light source outside a digital scene's perspective. To attain such accuracy, in some embodiments, the lighting estimation system generates localized-lighting-spherical-harmonic coefficients that efficiently capture realistic and natural-looking lighting conditions for a particular position from multiple points of view within the digital scene.

In addition to more realistically portraying lighting, the disclosed lighting estimation system can also increase the speed with which an augmented-reality system renders a digital scene with location-specific lighting for virtual objects. As suggested above, some existing augmented-reality systems use a Radiance Transfer Function or identify isotropic point light positions in a scene transform to reconstruct or estimate the geometry of an entire digital scene. While geometry reconstruction facilitates spatially varying illumination, such augmented-reality systems use considerable computing resources and time in determining a digital scene's geometry. Unlike lighting models that rely on an image's geometry or similar baseline parameters, the disclosed lighting estimation system uses a neural network that needs relatively fewer inputs to estimate lighting—that is, a single digital scene and an indicator of a virtual object's position. By training a local-lighting-estimation-neural network to analyze such inputs, the lighting estimation system reduces the computing resources needed to quickly generate lighting parameters for a specific location within a digital scene. In some cases, for instance, the lighting estimation system generates localized-lighting-spherical-harmonic coefficients for specific positions in less than 20 milliseconds on a laptop mobile graphics card—without determining scene geometry.

Independent of realism and speed, in some embodiments, the lighting estimation system demonstrates more flexibility in rendering different lighting conditions for different positions relative to existing augmented-reality systems. Unlike some conventional augmented-reality systems limited to redetermining lighting for a collective set of objects or for an entire image in response to scene changes, the lighting estimation system can flexibly adapt lighting conditions for different positions to which a virtual object moves. Upon identifying a position-adjustment request to move a virtual object, for instance, the disclosed lighting estimation system can extract a new local feature vector for a digital scene to form a new combined feature vector with a global feature vector. Based on a new combined feature vector reflecting a new designated location, the lighting estimation system can generate new location-specific-lighting parameters for the new designated location—without having to redetermine lighting conditions for other objects or for the entire image. Such flexibility enables users (or an augmented-reality system) to manipulate objects in augmented-reality applications for mobile devices or other computing devices.

Along similar lines, upon identifying, or otherwise in response to, a change in lighting conditions for a digital scene, the lighting estimation system can likewise update a global feature map for the digital scene to output new lighting parameters for the new lighting conditions. For example, as a viewers point of view changes (e.g., a camera moves through a scene), as lighting changes in a scene (e.g., lights are added, dimmed, occluded, exposed), as objects within a scene or the scene itself changes, the lighting estimation system can dynamically determine or update lighting parameters.

Turning now to FIG. 1, this figure illustrates an augmented-reality system 108 and a lighting estimation system 110 using a neural network to estimate location-specific-lighting parameters. In general, and as shown in FIG. 1, the lighting estimation system 110 identifies a request to render a virtual object 106 at a designated position within a digital scene 100 and uses a local-lighting-estimation-neural network 112 to generate location-specific-lighting parameters 114 for the designated position. Based on the request, the augmented-reality system 108 in conjunction with the lighting estimation system 110 renders a modified digital scene 116 comprising the virtual object 106 at the designated position illuminated according to the location-specific-lighting parameters 114. While FIG. 1 depicts the augmented-reality system 108 comprising the lighting estimation system 110 and rendering the modified digital scene 116, the lighting estimation system 110 may alternatively render the modified digital scene 116 by itself.

As just noted, the lighting estimation system 110 identifies a request to render the virtual object 106 at a designated position within the digital scene 100. For instance, the lighting estimation system 110 may identify a digital request from a mobile device to render a virtual pillow (or other virtual item) at a particular position on a piece of furniture (or another real item) depicted in a digital image. Alternatively, the lighting estimation system 110 may identify a digital request from computer-executable instructions that are part of an augmented-reality application and accordingly not directly selected by a user. Regardless of the types of objects or scenes from a request, in some embodiments, the request to render the digital scene includes an indication of a designated position at which to render a virtual object. For example, in some embodiments, the request includes a local position indicator 102 identifying the designated position, as shown in FIG. 1.

As used in this disclosure, the term "digital scene" refers to a digital image, model, or depiction of objects. For example, in some embodiments, a digital scene comprises a digital image of a realistic scene from a particular point of view or from multiple points of view. As a non-limiting example, a digital image may be an RGB image of 341×256 resolution. As a further example, a digital scene can comprise a three-dimensional-digital model of a scene or a frame a 360-degree or other video. Regardless of format, the digital scene may include depictions of light from a light source. To illustrate but one example, a digital scene may comprise a digital image of a real room containing real walls, carpet, furniture, and people with light emanating from a lamp or a window. As discussed further below, a digital scene may be modified to include a virtual object in an adjusted or modified digital scene portraying augmented reality.

Relatedly, the term "virtual object" refers to a computer-generated-graphical object that does not exist in the physical world. For example, a virtual object may include an object created by a computer for use within an augmented-reality application. Such a virtual object may be, but is not limited to, virtual accessories, animals, clothing, cosmetics, footwear, fixtures, furniture, furnishings, hair, people, physical human features, vehicles, or any other graphical object created by a computer. This disclosure generally uses the word "virtual" to designate specific virtual objects (e.g., "virtual pillow" or "virtual shoe"), but generally refers to real objects without the word "real" (e.g., "bed," "couch").

As further used herein, the term "local position indicator" refers to a digital identifier for a location within a digital scene. For example, in certain implementations, a local position indicator includes a digital coordinate, pixel, or other marker indicating a designated position within a digital scene from a request to render a virtual object. To illustrate, a local position indicator may be a coordinate representing a designated position or a pixel (or coordinate for a pixel) corresponding to the designated position. Among other embodiments, the lighting estimation system 110 may generate (and input) a local position indicator into the local-lighting-estimation-neural network 112.

As further indicated by FIG. 1, the lighting estimation system 110 extracts or generates a local patch 104 corresponding to the designated position from the digital scene 100. As shown in FIG. 1, the local patch 104 constitutes a portion of the digital scene 100 and includes the local position indicator 102. As used in this disclosure, the term "local patch" refers to a portion or section of a digital scene associated with a designated position. For instance, in some embodiments, a local patch includes a designated position as a center of a portion or section from a digital scene. As a none limiting example, a local patch may be 150×150 in resolution.

In addition to identifying a local position indicator and extracting a local patch, the lighting estimation system 110 uses the local-lighting-estimation-neural network 112 to analyze the digital scene 100, the local position indicator 102, and the local patch 104. The term "local-lighting-estimation-neural network" refers to an artificial neural network that generates lighting parameters indicating lighting conditions for a position within a digital scene. In particular, in certain implementations, a local-lighting-estimation-neural network refers to an artificial neural network that generates location-specific-lighting-parameters indicating lighting conditions for a designated position corresponding to a virtual object within a digital scene. In some embodiments, a local-lighting-estimation-neural network comprises some or all of the following network layers: (i) a global anterior set of network layers including blocks from a densely connected convolutional network ("DenseNet") and an encoder, (ii) a local anterior set of network layers including blocks from a DenseNet and an encoder, and (iii) a posterior set of network layers including multiple fully connected layers.

The lighting estimation system 110 the local-lighting-estimation-neural network 112 to generate the location-specific-lighting parameters 114. As used in this disclosure, the term "location-specific-lighting parameters" refer to parameters that indicate lighting or illumination of a portion or position within a digital scene. For instance, in some embodiments, location-specific-lighting parameters define, specify, or otherwise indicate lighting or shading of pixels corresponding to a designated position of a digital scene. Such location-specific-lighting parameters may define the shade or hue of pixels for a virtual object at a designated position. In some embodiments, location-specific-lighting parameters comprise spherical harmonic coefficients that indicate lighting conditions for a designated position within a digital scene for a virtual object. This disclosure refers to such spherical harmonic coefficients as "localized-lighting-spherical-harmonic coefficients." Accordingly, location-specific-lighting parameters may be functions corresponding to a sphere's surface.

As further shown in FIG. 1, in addition to generating such lighting parameters, the augmented-reality system 108 renders the modified digital scene 116 comprising the virtual object 106 at the designated position illuminated according to the location-specific-lighting parameters 114. For example, in certain implementations, the augmented-reality system 108 superimposes or otherwise integrates a computer-generated image of the virtual object 106 within the digital scene 100. As part of the rendering, the augmented-reality system 108 selects and renders pixels for the virtual object 106 that reflect lighting, shading, or appropriate color hues indicated by the location-specific-lighting parameters 114.

In addition to generating the location-specific-lighting parameters 114, the lighting estimation system 110 optionally generates location-specific-depth parameters 118. In some embodiments, the lighting estimation system 110 generates the location-specific-depth parameters 118 for a designated position within a digital scene using an alternative set of network layers of the local-lighting-estimation-neural network 112.

As used in this disclosure, the term "location-specific-depth parameters" refer to parameters that indicate depth or location of a designated position within a digital scene. For instance, in some embodiments, location-specific-depth parameters define, specify, or otherwise indicate depth for a designated position of a digital scene. As suggested above, in some embodiments, location-specific-depth parameters comprise spherical harmonic coefficients that indicate depth of an object at a designated position within a digital scene. This disclosure refers to such spherical harmonic coefficients as "localized-depth-spherical-harmonic coefficients."

The augmented-reality system 108 optionally uses location-specific-depth parameters to render modified digital scenes. Accordingly, in some embodiments, the augmented-reality system 108 renders the modified digital scene 116 comprising the virtual object 106 at the designated depth position illuminated according to the location-specific-lighting parameters 114 and the location-specific-depth parameters 118. As part of the rendering, for example, the augmented-reality system 108 selects and renders pixels for the virtual object 106 that reflect a depth map for an object at the designated position as indicated by the location-specific-depth parameters 118.

Figure 2:
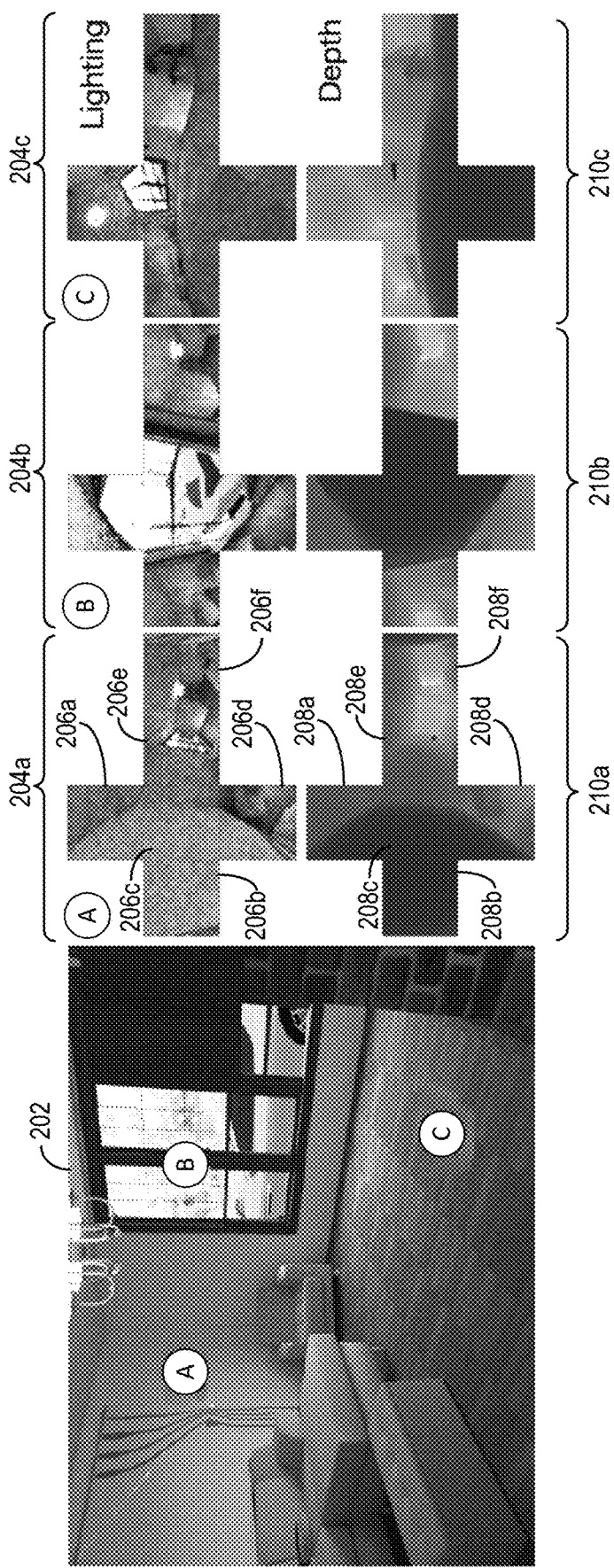
FIG. 2 illustrates a digital training scene and corresponding cube maps in accordance with one or more embodiments.

As further suggested above, in some embodiments, the lighting estimation system 110 uses cube maps for digital scenes to project one or both of ground-truth-lighting parameters and ground-truth-depth parameters for designated positions within a digital scene. FIG. 2 illustrates examples of cube maps corresponding to a digital scene. As shown in FIG. 2, a digital training scene 202 includes a viewpoint of locations illuminated by a light source. To generate ground-truth-lighting parameters and ground-truth-depth parameters for training, in some cases, the lighting estimation system 110 selects and identifies positions within the digital training scene 202. The lighting estimation system 110 can generate lighting cube maps 204a-204c and depth cube maps 210a-210c corresponding to the identified positions, where each cube map represents an identified position within the digital training scene 202. The lighting estimation system 110 then can project the lighting cube maps 204a-204c to ground-truth-lighting-spherical-harmonic coefficients and the depth cube maps 210a-210c to ground-truth-depth-spherical-harmonic coefficients for training a local-lighting-estimation-neural network.

The lighting estimation system 110 optionally generates or prepares digital training scenes, such as the digital training scene 202, by modifying images of realistic or computer-generated scenes. For instance, in some cases, the lighting estimation system 110 modifies three-dimensional scenes from Princeton University's SUNCG dataset, as described by Shuran Song et al., "Semantic Scene Completion from a Single Depth Image," *Proceedings of the IEEE Conference on Computer Vision and Pattern Recognition* (2017), the entire contents of which are incorporated by reference. The scenes in the SUNCG dataset generally comprise realistic rooms and furniture layouts. In one implementation, the lighting estimation system 110 modifies and renders a total of 26,800 images from the SUNCG dataset to training a local-lighting-estimation-neural network. Because many of the scene from the SUNCG dataset include windows, researchers randomly sampled a panorama from a dataset of two hundred HDR outdoor panoramas to select samples for training.

Based on the SUNCG dataset, the lighting estimation system 110 optionally computes physically based image renderings of scenes. In some such cases, the lighting estimation system 110 uses a Mitsuba framework to compute the physically based renderings, as described by Yinda Zhang et al., "Physically-Based Rendering for Indoor Scene Understanding Using Convolutional Neural Networks," *Proceedings of the IEEE Conference on Computer Vision and Pattern Recognition* (2017) (hereinafter "Zhang"), the entire contents of which are incorporated by reference.

To remove some of the inaccuracies and biases in such renderings, in some embodiments, the lighting estimation system 110 alters the computational approach from Zhang's algorithm in some respects. First, the lighting estimation system 110 can digitally remove lights that appear inconsistent with indoor scenes, such as area lights for floors, walls, and ceilings. Second, instead of using a single panorama for outdoor illumination as in Zhang, researchers randomly select one panorama from the dataset of two hundred HDR outdoor panoramas and apply a random rotation around the Y-axis of the panorama. Third, instead of assigning the same intensity for each indoor area light, the lighting estimation system 110 can randomly select a light intensity between one hundred and five hundred candelas with a uniform distribution. For example, the lighting estimation system 110 randomly scales the intensity of light sources in the SUNCG dataset by a factor e~$\mathcal{U}$ [100, 500], where $\mathcal{U}$ [a, b] is a uniform distribution in the [a, b] interval. In some implementations of generating digital training scenes, however, the lighting estimation system 110 uses the same rendering method and spatial resolution described by Zhang.

Because indoor scenes can include an arbitrary distribution of light sources and light intensity, in certain implementations, the lighting estimation system 110 normalizes each physically based rendering of a digital scene. When normalizing renderings, the lighting estimation system 110 can use the following equation:

$$I' = I * \frac{m}{P_{90}} \quad (1)$$

In equation (1), I represents an original image rendering with HDR, I' represents the re-exposed image rendering, m is set to a value of 0.8, and $P_{90}$ represents the 90th percentile of the original image rendering I. By re-exposing the original image rendering I, the re-exposed image rendering I' still includes HDR values. The lighting estimation system 110 further applies a gamma tone-map operation with a random value between 1.8 and 2.2 to the re-exposed image rendering I' and clip all values above 1. By applying the gamma-tone-mapping operation, the lighting estimation system 110 can produce images with saturated bright windows and improved contrast in the scene.

As noted above, the lighting estimation system 110 can identify sample positions within a digital training scene, such as the digital training scene 202. As depicted in FIG. 2, the digital training scene 202 includes three sample positions identified by the lighting estimation system 110. The digital training scene 202 includes the identifiers A, B, and C to mark the sample positions for illustrative purposes. Accordingly, the A, B, and C identifiers represent a visualization of sample positions identified by the lighting estimation system 110, not objects in the digital training scene 202.

To identify such sample positions, in some embodiments, the lighting estimation system 110 identifies four different quadrants of the digital training scene 202 with a margin of 20% of the image resolution from the image's borders. In each quadrant, the lighting estimation system 110 identifies one sample position. Accordingly, while FIG. 2 depicts three sample positions for illustrative purposes, the lighting estimation system 110 optionally identifies four such sample positions in each digital training scene.

As further indicated above, the lighting estimation system 110 generates the lighting cube maps 204a-204c based on the sample positions from the digital training scene 202. In some cases, the lighting estimation system 110 applies a Bidirectional Path Tracing ("BDPT") algorithm of Mitsuba to render such lighting cube maps. As shown in FIG. 2, each of the lighting cube maps 204a-204c include six visual portions in HDR representing six different perspectives of the digital training scene 202. The lighting cube map 204a, for instance, includes visual portions 206a-206e. In some cases, each of the lighting cube maps 204a-204c include a 64×64×6 resolution. Such a resolution has a low impact on spherical harmonics of degree five or less and facilitates quick rendering of cube maps. In multiple tests described below, researchers determined that a degree of five for localized-lighting-spherical-harmonic coefficients provided a practical trade-off between rendering time and visual quality, including shading and shadow softness. But a local-lighting-estimation-neural network could likewise generate localized-lighting-spherical-harmonic coefficients of higher degrees (e.g., 3-8 degrees).

Similarly, in some embodiments, the lighting estimation system 110 generates the depth cube maps 210a-210c based on the sample positions from the digital training scene 202. The depth cube maps 210-210c correspond to the lighting cube maps 204a-204c, respectively. As shown in FIG. 2, each of the depth cube maps 210a-210c include six visual portions representing six different perspectives of depth from a sample position within the digital training scene 202. The depth cube map 210a, for instance, includes visual portions 208a-208e. Accordingly, in some cases, each of the depth cube maps 210a-210c include a 64×64×6 resolution.

To render the lighting cube maps 204a-204c or the depth cube maps 210a-210c, the lighting estimation system 110 can apply a two-stage Primary Sample Space Metropolis Light Transport ("PSSMLT") with 512 direct samples. When generating the visual portion of a cube map—such as the visual portion 206c—the lighting estimation system 110 can translate the surface position in the direction of a surface normal 10 centimeters to minimize the risk of having a part of the cube map inside a surface of another object. In some implementations, the lighting estimation system 110 uses the same approach to (i) identifying sample positions in digital training scenes, (ii) generating corresponding lighting cube maps as precursors to determining ground-truth-lighting-spherical-harmonic coefficients, and (iii) generating corresponding depth cube maps as precursors to determining ground-truth-depth-spherical-harmonic coefficients.

After generating the lighting cube maps 204a-204c, for instance, the lighting estimation system 110 projects the lighting cube maps 204a-204c to ground-truth-lighting-spherical-harmonic coefficients for each identified position within the digital training scene 202. Similarly, the lighting estimation system 110 can project the depth cube maps 210a-210c to ground-truth-depth-spherical-harmonic coefficients for each identified position within the digital training scene 202. In some cases, each of the ground-truth-lighting-spherical-harmonic coefficients and the ground-truth-depth-spherical-harmonic coefficients comprise coefficients of degree five. To compute such spherical harmonics, the lighting estimation system 110 can apply a least-squared method for projecting cube maps.

For example, the lighting estimation system 110 may use the following equation for projecting cube maps:

$$f_l^m = \int f(s) y_l^m(s) \delta s \qquad (2)$$

In equation (2), $f$ represents the light intensity for each direction shown by visual portions of a cube map, where a solid angle corresponding to a pixel position weights the light intensity. The symbols $y_l^m$ represent a spherical-harmonic function of the degree l and order m. In some cases, for each lighting cube map, the lighting estimation system 110 computes spherical-harmonic coefficients of degree five for each color channel (e.g., order of three), making for 36×3 spherical-harmonic coefficients. Conversely, for each depth cube map, the lighting estimation system 110 computes spherical-harmonic coefficients of degree five, making for 36-dimensional spherical-harmonic coefficients.

In addition to generating ground-truth-lighting-spherical-harmonic coefficients and ground-truth-depth-spherical-harmonic coefficients, in some embodiments, the lighting estimation system 110 further augments digital training scenes in particular ways. First, the lighting estimation system 110 can randomly scale exposure to a uniform distribution between 0.2 and 4. Second, the lighting estimation system 110 can randomly set a gamma value for a tone-map operator to between 1.8 and 2.2. Third, the lighting estimation system 110 can invert the viewpoint of digital training scenes on the X-axis. Similarly, the lighting estimation system 110 flips the ground-truth-lighting-spherical-harmonic coefficients and the ground-truth-depth-spherical-harmonic coefficients to match the inverted viewpoints by inverting the negative order harmonics as shown by the symbols $y_l^{-m}$.

Figure 3:
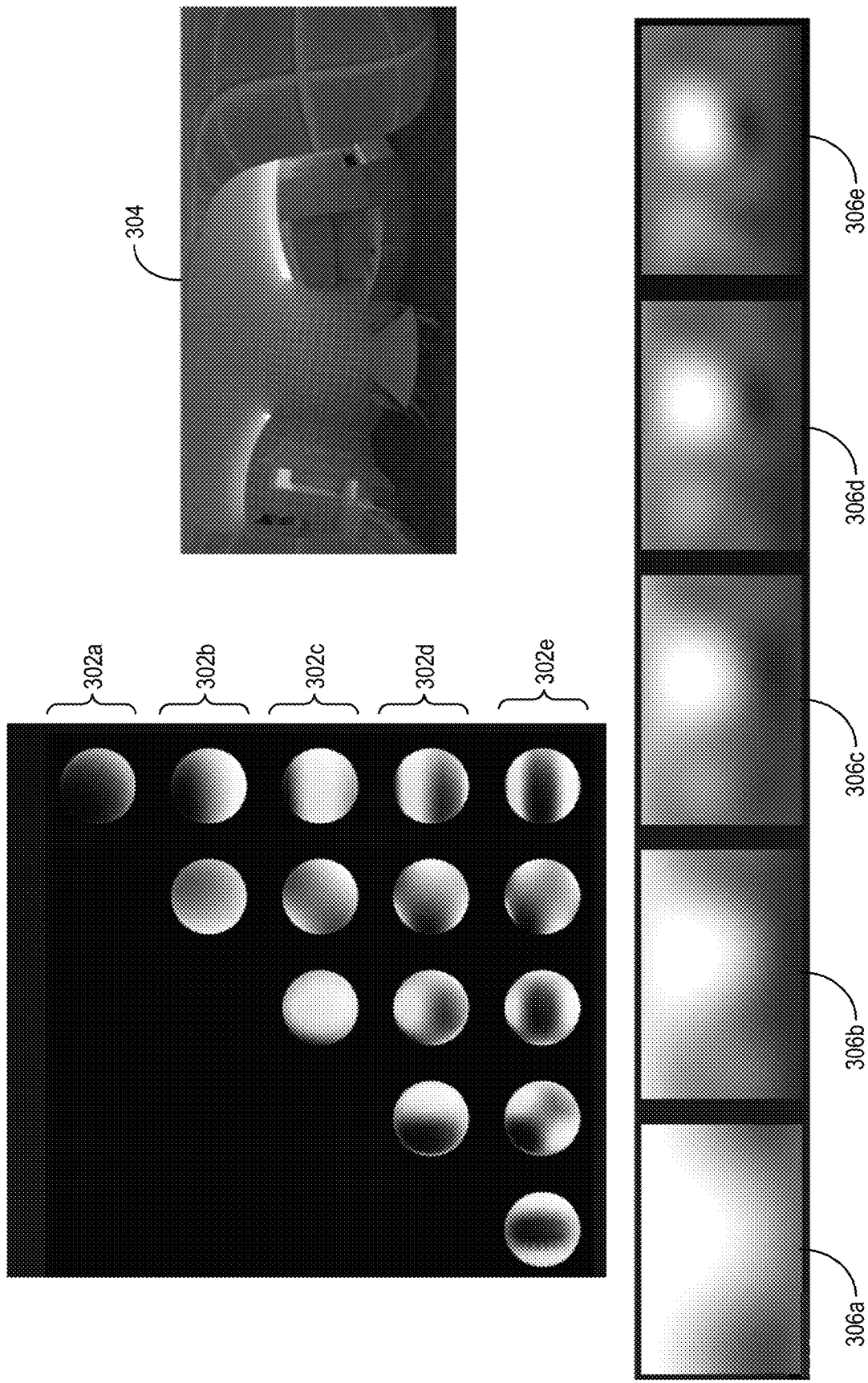
FIG. 3 illustrates degrees of location-specific-spherical-harmonic coefficients in accordance with one or more embodiments.

As further suggested above, in certain implementations, the lighting estimation system 110 can use varying degrees of spherical-harmonic coefficients. For instance, the lighting estimation system 110 can generate ground-truth-lighting-spherical-harmonic coefficients of degree five for each color channel or localized-lighting-spherical-harmonic coefficients of degree five for each color channel. FIG. 3 illustrates a visual representation of various degrees of spherical harmonics and lighting conditions of a full environment map for a position within a digital scene according to different degrees of spherical harmonics.

As shown in FIG. 3, visual representations 302a, 302b, 302c, 302d, and 302e respectively correspond to spherical harmonics of degrees one, two, three, four, and five. In particular, each of the visual representations 302a-302e includes one or more spheres in a row visually representing different degrees. As indicated by FIG. 3, with each incremental degree, the spherical-harmonic coefficients indicate more detailed lighting conditions or more detailed depth information.

To illustrate, FIG. 3 includes lighting depictions 306a-306e for a full-environment map 304 of a position within a digital scene. The lighting depictions 306a, 306b, 306c, 306d, and 306e respectively correspond to spherical-harmonic coefficients of degrees one, two, three, four, and five. As the degree of spherical harmonic increases, the lighting depictions 306a-306e better capture the lighting shown in the full-environment map 304. As indicated by the lighting depictions 306a-306e, spherical-harmonic coefficients can implicitly capture occlusion and geometry of a digital scene.

Figure 4A:
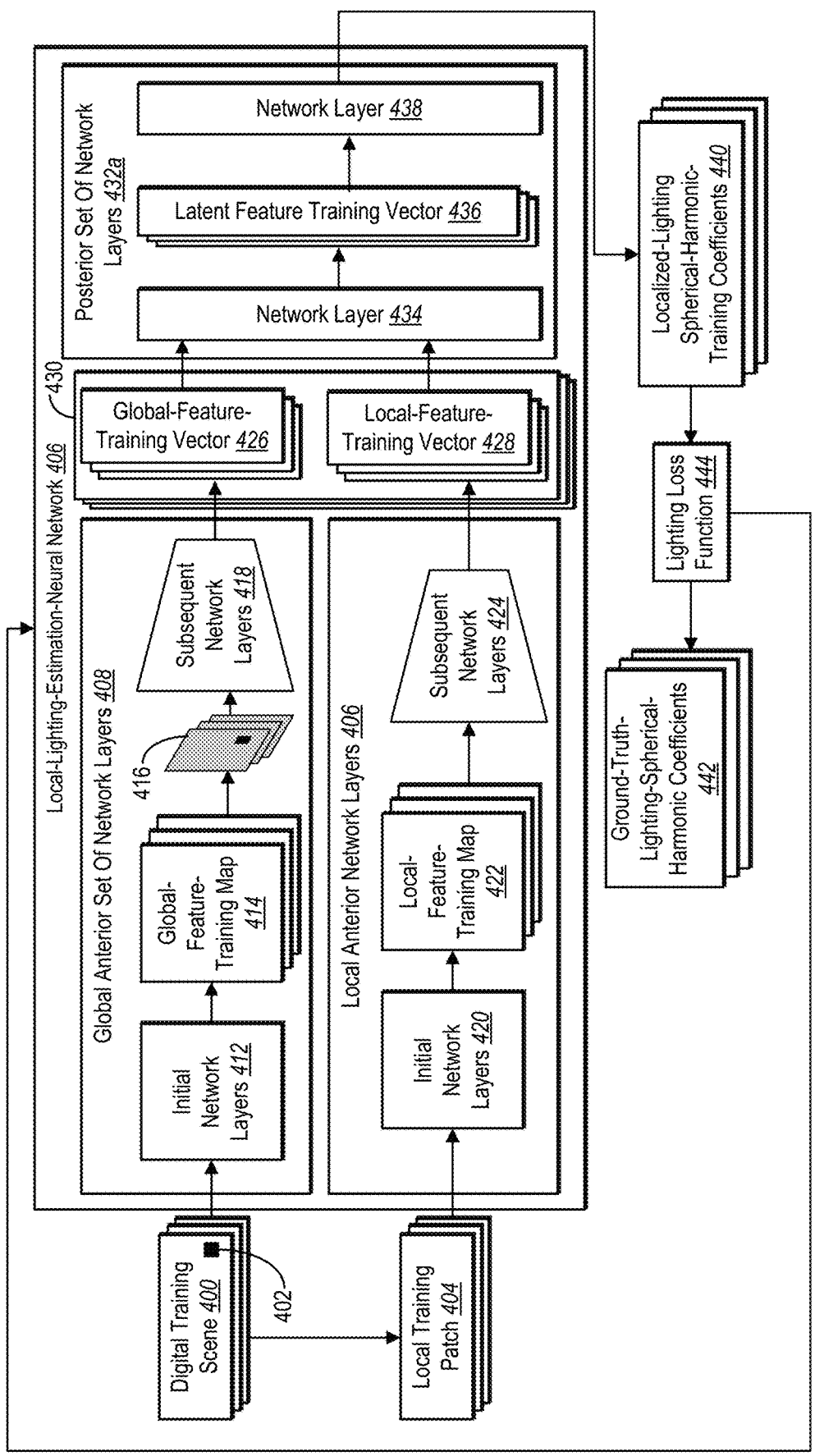
FIG. 4A illustrates a lighting estimation system training a local-lighting-estimation-neural network to generate localized-lighting-spherical-harmonic coefficients for designated positions within digital scenes in accordance with one or more embodiments.
Figure 4B:
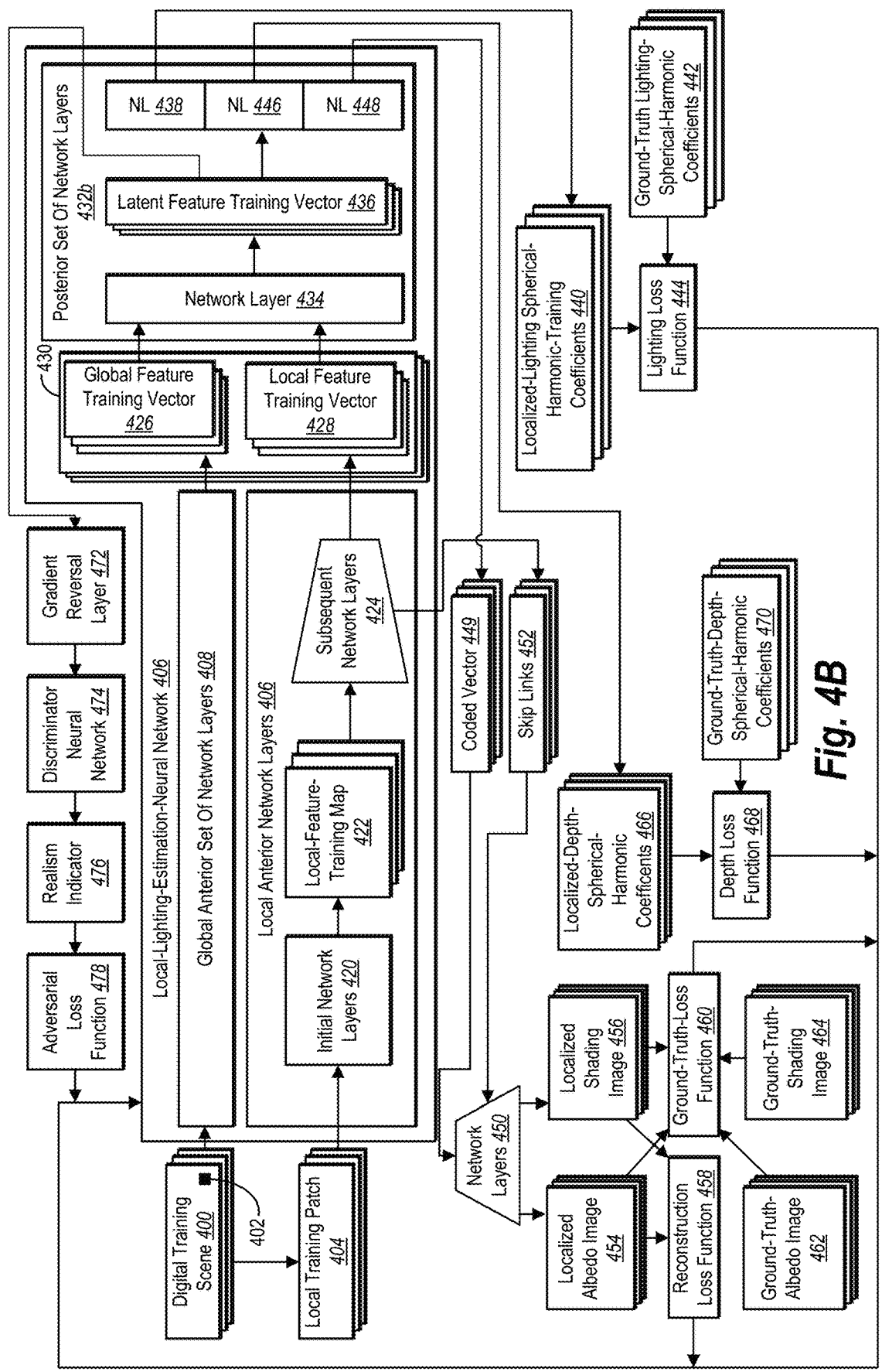
FIG. 4B illustrates a lighting estimation system training a local-lighting-estimation-neural network to generate localized-lighting-spherical-harmonic coefficients for designated positions within digital scenes using additional output parameters and a discriminator-neural network in accordance with one or more embodiments.
Figure 4C:
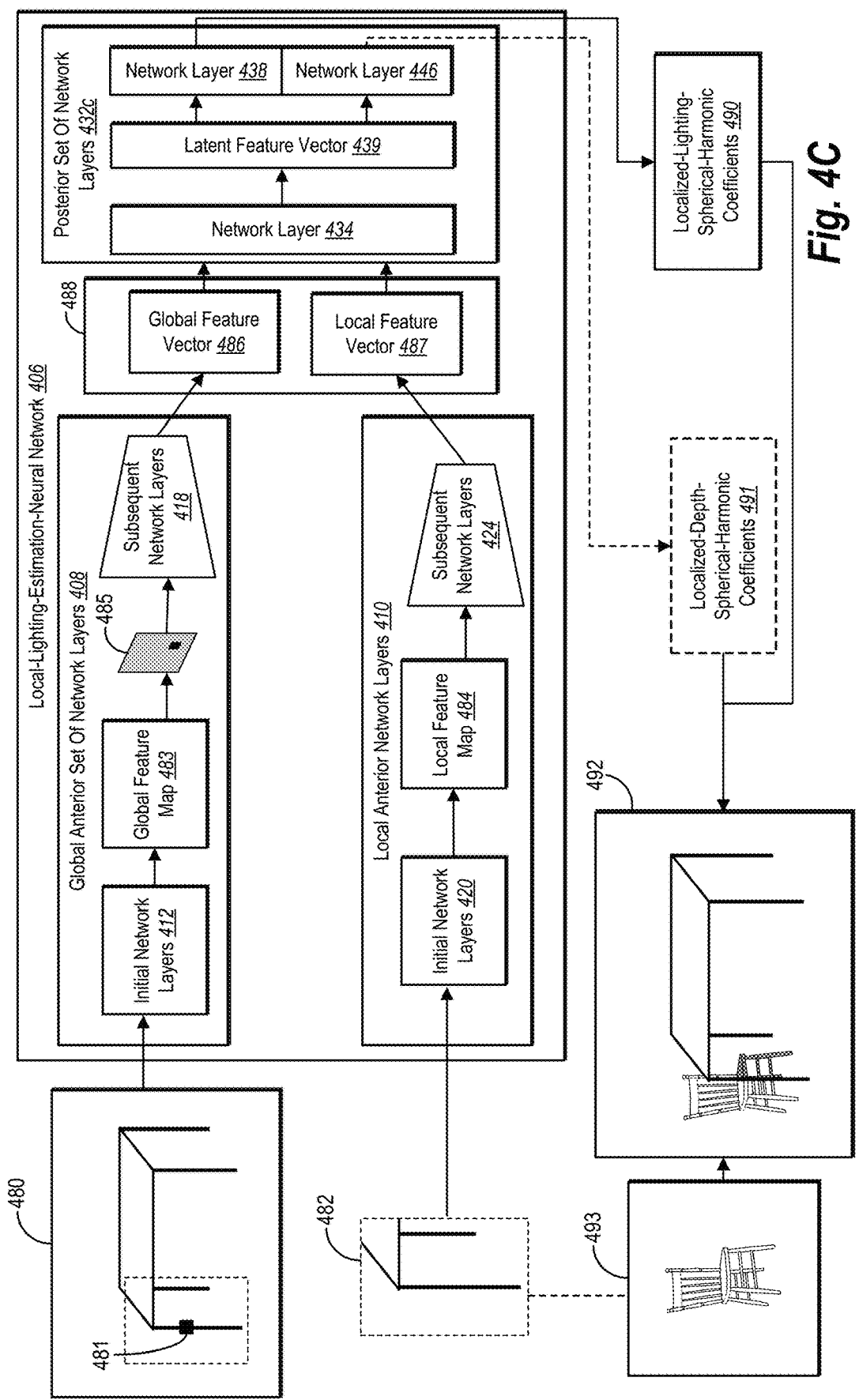
FIG. 4C illustrates a lighting estimation system using a trained local-lighting-estimation-neural network to generate localized-lighting-spherical-harmonic coefficients and localized-depth-spherical-harmonic coefficients for a designated position within a digital scene in accordance with one or more embodiments.

As suggested above, the lighting estimation system 110 can both train and apply a local-lighting-estimation-neural network. FIGS. 4A and 4B depict embodiments of the lighting estimation system 110 training a local-lighting-estimation-neural network to generate location-specific-lighting parameters. Each such embodiment can use the digital training scenes and corresponding spherical-harmonic coefficients from cube maps as described with respect to FIGS. 2 and 3 above. FIG. 4C depicts an embodiment of the lighting estimation system 110 applying a trained local-lighting-estimation-neural network to generate location-specific-lighting parameters.

As shown in FIG. 4A, for example, the lighting estimation system 110 iteratively trains a local-lighting-estimation-neural network 406. As an overview of a training iteration, the lighting estimation system 110 extracts a global-feature-training vector from a digital training scene using a global anterior set of network layers 408 of the local-lighting-estimation-neural network 406. The lighting estimation system 110 similarly extracts a local-feature-training vector from a local training patch of the digital training scene utilizing a local anterior set of network layers 410 of the local-lighting-estimation-neural network 406. The lighting estimation system 110 further combines the global-feature-training vector and the local-feature-training vector to form a combined-feature-training vector.

Based on the combined-feature-training vector, the lighting estimation system 110 generates localized-lighting-spherical-harmonic-training coefficients for a designated position within the digital training scene using a posterior set of network layers 432a of the local-lighting-estimation-neural network 406. The lighting estimation system 110 then modifies network parameters of the local-lighting-estimation-neural network 406 based on a comparison of the localized-lighting-spherical-harmonic-training coefficients with ground-truth-lighting-spherical-harmonic coefficients for the designated position.

In an initial training iteration shown by FIG. 4A, the lighting estimation system 110 feeds a digital training scene 400 to the local-lighting-estimation-neural network 406. As indicated above, the digital training scene 400 may be a real or synthetic image and (in some cases) have a resolution of 341×256. Upon receiving the digital training scene 400 as a training input, the lighting estimation system 110 identifies a local-position-training indicator 402 for a designated position within the digital training scene 402. For instance, the lighting estimation system 110 can identify local-position-training coordinates representing a designated position within the digital training scene 400. Such coordinates may represent two-dimensional coordinates of a sample position within the digital training scene 400 corresponding to a cube map (and ground-truth-spherical-harmonic coefficients) generated by the lighting estimation system 110.

In addition to identifying the local-position-training indicator 402, the lighting estimation system 110 analyzes the digital training scene 400 in a global path of the local-lighting-estimation-neural network 406. In particular, the lighting estimation system 110 uses initial network layers 412 from the global anterior set of network layers 408 to extract a global-feature-training map 414 from the digital training scene 400. In some such embodiments, the global-feature-training map 414 represents visual features of the digital training scene 400, such as light-source positions and global geometry of the digital training scene 400.

As used herein, the term "feature map" refers to a multi-dimensional array or multi-dimensional vector representing features of a digital scene or a local patch of a digital scene (e.g., a portion of a digital image or three-dimensional-digital model). Whereas a global feature map represents features of a digital scene, a local feature map represents features of a local patch. For instance, a global feature map for a digital scene may represent different visual or latent features of an entire digital scene, such as lighting or geometric features visible or embedded within a digital image or a three-dimensional-digital model. Similarly, a local feature map for a local patch may represent different visual or latent features of the local patch.

After extracting the global-feature-training map 414, the lighting estimation system 110 uses the local-position-training indicator 402 to modify the global-feature-training map 414. In some cases, for example, the lighting estimation system 110 references a local training patch 404 from the digital training scene 400 to mask the global-feature-training map 414, such as by concatenating the global-feature-training map 414 with a masking-feature-training map 416. Alternatively, in some embodiments, the lighting estimation system 110 multiplies the global-feature-training map 414 by the masking-feature-training map 416.

As suggested above, the lighting estimation system 110 optionally generates the masking-feature-training map 416 based on the local training patch 404. In some implementations, for example, the masking-feature-training map 416 includes an array of values indicating the local training patch 404 within the digital training scene 400, such as (i) one or more values of the number one indicating coordinates for and around a designated position within the digital training scene 400 and (ii) other values (e.g., the number zero) indicating coordinates for other positions within the digital training scene 400. In particular, the masking-feature-training map 416 may constitute a binary coordinate mask of spatial resolution 16×21 comprising elements corresponding to the local training patch 404 set to the number one and elements corresponding to remaining section of the digital training scene 400 set to the number zero. Additionally, or alternatively, the lighting estimation system 110 generates the masking-feature-training map 416 by applying a vector encoder to the local-position-training indicator 402 (e.g., by one-hot encoding).

As further suggested by FIG. 4A, by applying the masking-feature-training map 416 to the global-feature-training map 414, the lighting estimation system 110 generates a masked-dense-feature-training map. Because the masking-feature-training map 416 and the global-feature-training map 414 can comprise the same spatial resolution, in some embodiments, the masking-feature-training map 416 effectively masks the global-feature-training map 414 to create a masked-dense-feature-training map. A masked-dense-feature-training map accordingly represents a feature map reflecting lighting conditions for a designated position globally from the digital training scene 400. Because of space constraints, FIG. 4A depicts the global-future-training map 414 and the masking-feature-training map 416, but not the resultant masked-dense-feature-training map.

Upon generating a masked-dense-feature-training map, the lighting estimation system 110 uses subsequent network layers 418 of the global anterior set of network layers 408 to extract a global-feature-training vector 426 from the masked-dense-feature-training map. In terms of dimension, the global-feature-training vector 426 can constitute a 5120-dimensional vector. As explained below, the lighting estimation system 110 subsequently combines the global-feature-training vector 426 with a local-feature-training vector output by the local anterior set of network layers 410.

The term "feature vector" refers to a multi-dimensional vector representing features of a digital scene or a local patch of a digital scene. Whereas a global feature vector represents features of a digital scene, a local feature vector represents features of a local patch. As indicated above, in some embodiments, the lighting estimation system 110 extracts a global feature vector from a global feature map using a global anterior set of network layers. Similarly, in certain cases, the lighting estimation system 110 extracts a local feature vector from a local feature map using a local anterior set of network layers.

As further shown in FIG. 4A, the lighting estimation system 110 analyzes the local training patch 404 in a local path of the local-lighting-estimation-neural network 406. In particular, the lighting estimation system 110 extracts the local training patch 404 from the digital training scene 402 based on the location-position-training indicator 402. As indicated above, the local training patch 404 may comprise a 150×150 section of an RGB image. The lighting estimation system 110 subsequently feeds the local training patch 404 to the local-lighting-estimation-neural network 406. Upon receiving the local training patch 404 as a training input, initial network layers 420 from the local anterior set of network layers 410 extract a local-feature-training map 422 from the local training patch 404. In some embodiments, the local-feature-training map 422 represents visual features of the local training patch 404, such as color and lighting conditions or latent features of the local training patch 404.

After extracting the local-feature-training map 422, the lighting estimation system 110 utilizes subsequent network layers 424 of the local anterior set of network layers 410 to extract a local-feature-training vector 428 from the local-feature-training map 422. In terms of dimension, the local-feature-training vector 428 can constitute a 512-dimensional vector. By using both a global path and a local path in a training iteration, the lighting estimation system 110 accordingly applies the global anterior set of network layers 408 and the local anterior set of network layers 410 to respectively extract the global-feature-training vector 426 from the digital training scene 400 and the local-feature-training vector 428 from the local training patch 404.

As suggested above, in certain implementations, the initial network layers 412 of the global anterior set of network layers 408 and the initial network layers 420 of the local anterior set of network layers 410 each comprise blocks from a DenseNet, such as lower layers from a DenseNet. For instance, each of the initial network layers 412 and 420 may include the initial three blocks from a pretrained DenseNet. In some cases, each of the initial network layers 412 and 420 comprise dense blocks and corresponding convolution and pooling layers from DenseNet-121, as described by G. Huang et al., "Densely Connected Convolutional Layers," *Proceedings of the IEEE Conference on Computer Vision and Pattern Recognition* (2017), the entire contents of which are incorporated by reference. Additionally, or alternatively, the lighting estimation system 110 initializes network parameters for blocks of a DenseNet using weights trained on an ImageNet, as described by Olga Russakovsky et al., "ImageNet Large Scale Visual Recognition Challenge," Vol. 30, Issue No. 3 *International Journal of Computer Vision* 211-252 (2015), the entire contents of which are incorporated by reference.

In the alternative to blocks of a DenseNet, in certain implementations, each of the initial network layers 412 and 420 comprise an encoder from a Convolutional Neural Network ("CNN"), including a couple of convolutional layers followed by four residual layers. In some such embodiments, each of the initial network layers 412 and 420 comprise the encoder described by Marc-André Gardner et al., "Learning to Predict Indoor Illumination from a Single Image," Vol. 36, Article No. 6, *ACM Transactions on Graphics* (2017) (hereinafter, "Gardner"), the entire contents of which are incorporated by reference. Accordingly, as an encoder, the initial network layers 412 and 420 respectively output the global-feature-training map 414 in the form of an encoded feature map of the digital training scene 400 and the local-feature-training map 422 in the form of an encoded feature map of the local training patch 404.

As further suggested above, in certain implementations, the subsequent network layers 418 of the global anterior set of network layers 408 and the subsequent network layers 424 of the local anterior set of network layers 410 each comprise an encoder. For instance, each of the subsequent network layers 418 and 424 may comprise Fire modules. By using a Fire module with fire-x-y notation, encoders reduce a number of channels to x before expanding a number of channels toy. In particular, each of the subsequent network layers 418 and 424 can include the following architecture for a Fire module using fire-x-y notation: fire-512-1024/fire-256-256 for a global stream, and fire-512-512/fire-128-128 for a local stream. Each such Fire module further includes an Exponential Learning Unit ("ELU") learning function followed by batch normalization. In some embodiments, the lighting estimation system 110 uses Fire modules for each of the subsequent network layers 418 and 424, as described by Forrest N. Iandola et al., "SqueezeNet: AlexNet-level Accuracy with 50× Fewer Parameters and <0.5 MB Model Size," *International Conference on Learning Representations* (2017), the entire contents of which are incorporated by reference.

As further shown in FIG. 4A, after generating feature-training vectors using both the global path and the local path, in some embodiments, the lighting estimation system 110 concatenates the global-feature-training vector 426 and the local-feature-training vector 428 to form a combined-feature-training vector 430. As a further example, the lighting estimation system 110 optionally couples the global-feature-training vector 426 and the local-feature-training vector 428 together to form a dual or stacked feature map as the combined-feature-training vector 430. Alternatively, in certain implementations, the lighting estimation system 110 combines rows of values from the global-feature-training vector 426 with rows of values from the local-feature-training vector 428 to form the combined-feature-training vector 430. But any suitable concatenation method may be used.

Upon generating the combined-feature-training vector 430, the lighting estimation system 110 uses the network layer 434 of the posterior set of network layers 432a to extract a latent-feature-training vector 436 from the combined-feature-training vector 430. The lighting estimation system 110 further feeds the latent-feature-training vector 436 to network layer 438 of the posterior set of network layers 432a. Based on the latent-feature-training vector 436, the network layer 438 outputs the localized-lighting-spherical-harmonic-training coefficients 440. Consistent with the disclosure above, the localized-lighting-spherical-harmonic-training coefficients 440 indicate lighting conditions for a designated position within the digital training scene 400. For example, the localized-lighting-spherical-harmonic-training coefficients 440 indicate lighting conditions for a designated position within the digital training scene 400 identified by the local-position-training indicator 402.

In some embodiments, the network layer 434 and the network layer 438 of the posterior set of network layers 432a each comprise a fully connected layer. While both network layers may be fully connected layers, each may also include different dimensions. For example, in some embodiments, the network layer 434 constitutes a fully connected layer comprising 1024 neurons, while the network layer 438 comprises a dimensionality of 36×3. Accordingly, in certain implementations, the local-lighting-estimation-neural network 406 outputs the localized-lighting-spherical-harmonic-training coefficients 440 in 36×3 dimensions, where the number three represents the three RGB color channels. As part of a training iteration with such network layers, the lighting estimation system 110 optionally passes the combined-feature-training vector 430 through the network layer 434 and the network layer 438 with batch normalization and an ELU learning function.

After generating the localized-lighting-spherical-harmonic-training coefficients 440, the lighting estimation system 110 compares the localized-lighting-spherical-harmonic-training coefficients 440 with ground-truth-lighting-spherical-harmonic coefficients 442. As used in this disclosure, the term "ground-truth-lighting-spherical-harmonic coefficients" refers to empirically determined spherical harmonic coefficients from one or more lighting cube maps. The ground-truth-lighting-spherical-harmonic coefficients 442, for instance, represent spherical harmonic coefficients projected from a lighting cube map corresponding to a designated position within the digital training scene 400 identified by the local-position-training indicator 402.

As further indicated by FIG. 4A, the lighting estimation system 110 uses a lighting loss function 444 to compare the localized-lighting-spherical-harmonic-training coefficients 440 with the ground-truth-lighting-spherical-harmonic coefficients 442. In some embodiments, the lighting estimation system 110 uses a mean-squared-error ("MSE") function as the lighting loss function 444. For example, in certain cases, the lighting estimation system 110 uses the following equation as the lighting loss function 444:

$$\mathcal{L}_{i\text{-}sh} = \frac{1}{36 \times 3} \sum_{c=1}^{3} \sum_{l=0}^{4} \sum_{m=-l}^{l} (i_{l,c}^{m*} - \hat{i}_{l,c}^{m})^2 \quad (3)$$

In equation (3), the symbol $\mathcal{L}_{i\text{-}sh}$ represents the MSE loss for localized-lighting-spherical-harmonic coefficients generated in a given training iteration. The symbols $i_{l,c}^{m}$ represent localized-lighting-spherical-harmonic-training coefficients for the c-th color channel in RGB. Relatedly, the symbols $i_{l,c}^{m}$ represent ground-truth-lighting-spherical-harmonic coefficients derived from a lighting cube map for a digital training scene.

Upon determining a loss from the lighting loss function 444, the lighting estimation system 110 modifies network parameters (e.g., weights or values) of the local-lighting-estimation-neural network 406 to decrease a loss for the lighting loss function 444 in a subsequent training iteration using back propagation—as shown by the arrow from the lighting loss function 444 to the local-lighting-estimation-neural network 406. For example, the lighting estimation system 110 may increase or decrease weights or values from some (or all) of the global anterior set of network layers 408, the local anterior set of network layers 410, and the posterior set of network layers 432a within the local-lighting-estimation-neural network 406 to decrease or minimize a loss in a subsequent training iteration. In some cases, the lighting estimation system 110 performs training iterations until the value or weights of the local-lighting-estimation-neural network 406 do not change significantly across training iterations or otherwise satisfies a convergence criteria.

FIG. 4A illustrates one embodiment of training the local-lighting-estimation-neural network 406. In additional embodiments, the lighting estimation system 110 jointly performs additional imagery tasks to train the local-lighting-estimation-neural network 406. FIG. 4B illustrates the lighting estimation system 110 performing examples of additional imagery tasks and determining corresponding losses to train the local-lighting-estimation-neural network 406. As an overview of FIG. 4B, the lighting estimation system 110 can use the local-lighting-estimation-neural network 406 to generate location-specific-lighting parameters and one or more of the following imagery outputs in a given training iteration: location-specific-depth parameters, an albedo image corresponding to a local training patch, and a shading image corresponding to the local training patch.

Based on comparing location-specific-lighting parameters and one or more of the additional imagery outputs to corresponding ground truths, the lighting estimation system 110 determines a combination of training losses in a given training iteration. Additionally, or alternatively, the lighting estimation system 110 uses a discriminator-neural network to distinguish between real and synthetic digital training scenes and determine an adversarial loss. The lighting estimation system 110 subsequently modifies network parameters of the local-lighting-estimation-neural network 406 based on one or both of the determined training loss(es) and the adversarial loss. The following paragraphs describe the lighting estimation system 110 generating such additional imagery outputs and determining losses in a given training iteration in addition to those described above with respect to FIG. 4A.

As shown in FIG. 4B, for example, the lighting estimation system 110 generates localized-depth-spherical-harmonic-training coefficients 466. To generate such coefficients, the lighting estimation system 110 generates the combined-feature-training vector 430, as described above in relation to FIG. 4A. The lighting estimation system 110 further extracts the latent-feature-training vector 436 from the combined-feature-training vector 430 using the network layer 434 and processes the latent-feature-training vector 436 using an additional network layer—a network layer 446 from the posterior set of network layers 432b. By processing the latent-feature-training vector 436 using the network layer 446, the local-lighting-estimation-neural network 406 generates the localized-depth-spherical-harmonic-training coefficients 466.

In some embodiments, the network layer 446 of the posterior set of network layers 432b comprises a fully connected layer. For example, the network layer 446 can constitute a fully connected layer comprising a dimensionality of 36. Accordingly, in certain implementations, the local-lighting-estimation-neural network 406 outputs the localized-depth-spherical-harmonic-training coefficients 466 in 36 dimensions.

As further shown in FIG. 4B, after generating the localized-depth-spherical-harmonic-training coefficients 466, the lighting estimation system 110 compares the localized-depth-spherical-harmonic-training coefficients 466 with ground-truth-depth-spherical-harmonic coefficients 470. As used in this disclosure, the term "ground-truth-depth-spherical-harmonic coefficients" refers to empirically determined spherical harmonic coefficients from one or more depth cube maps. The ground-truth-depth-spherical-harmonic coefficients 470, for instance, represent spherical harmonic coefficients projected from a depth cube map corresponding to the designated position within the digital training scene 400 identified by the local-position-training indicator 402.

As further indicated by FIG. 4B, the lighting estimation system 110 uses a depth loss function 468 to compare the localized-depth-spherical-harmonic-training coefficients 466 with the ground-truth-depth-spherical-harmonic coefficients 470. In some embodiments, the lighting estimation system 110 uses an MSE function as the depth loss function 468. For example, in certain cases, the lighting estimation system 110 uses the following equation as the depth loss function 468:

$$\mathcal{L}_{d-sh} = \frac{1}{36} \sum_{l=0}^{4} \sum_{m=-l}^{l} (d_l^{m*} - d_l^m)^2 \qquad (4)$$

In equation (4), the symbol $\mathcal{L}_{d-sh}$ represents the MSE loss for localized-depth-spherical-harmonic coefficients generated in a given training iteration. The symbols $d_l^m$ represent localized-depth-spherical-harmonic-training coefficients for a probe depth. Relatedly, the symbols $d_l^{m*}$ represent ground-truth-depth-spherical-harmonic coefficients derived from a depth cube map for a digital training scene.

In the alternative to equation (3) or equation (4) above, in certain implementations, the lighting estimation system 110 uses an L2-loss function, mean-absolute-error function, a mean-absolute-percentage-error function, a render-loss function, a root-mean-squared-error function, or other suitable loss function as the lighting loss function 444 or the depth loss function 468.

In addition (or in the alternative) to generating location-specific-depth parameters, in some embodiments, the lighting estimation system 110 uses the local-lighting-estimation-neural network 406 to reconstruct an albedo image corresponding to the local training patch 404 and a shading image corresponding to the local training patch 404 as part of a training iteration. To reconstruct such images, the lighting estimation system 110 extracts skip links 452 from the subsequent network layers 424 in the local anterior set of network layers 410 as part of processing the local-feature-training map 422. The lighting estimation system 110 also feeds the latent-feature-training vector 436 to an additional network layer—a network layer 448 from the posterior set of network layers 432b. Based on the latent-feature-training vector 436, the network layer 448 outputs a coded vector 449. In some embodiments, the network layer 448 includes a dimensionality of 4×4×4. Accordingly, the coded vector 449 optionally constitutes a 4×4×4 vector.

As further shown in FIG. 4B, to generate an albedo image and a shading image, the lighting estimation system 110 feeds the skip links 452 and the coded vector 449 to network layers 450. Based on the skip links 452 and the coded vector 449, the network layers 450 reconstruct a localized albedo image 454 and a localized shading image 456. The localized albedo image 454 represents reflectance within the local training patch 404. By contrast, the localized shading image 456 represents shading within the local training patch 404. By reconstructing the localized albedo image 454 and the localized shading image 456 and generating the localized-lighting-spherical-harmonic-training coefficients 440 in a training iteration, the lighting estimation system 110 can disambiguate color and intensity between reflectance and illumination.

As used in this disclosure, the term "localized albedo image" refers to a digital image representing incident light reflected in a local patch of a digital scene. In particular, a localized albedo image may include a digital image depicting a reflectance of light within a local patch in a 7×7 resolution. By contrast, the term "localized shading image" refers to a digital image representing shading or illumination within a local patch of a digital scene. In particular, a localized shading image may include a digital image depicting shading or illumination within a local patch in a 7×7 resolution.

To reconstruct such localized albedo images and localized shading images, in some embodiments, the subsequent network layers 424 of the local anterior set of network layers 410 comprise an encoder and the network layers 450 comprise a decoder. The lighting estimation system 110 accordingly can apply an up-sample to the encoder after a convolution to pass the skip links between the encoder and the decoder. In some cases, the subsequent network layers 424 constitute an encoder comprising the following layers: conv3-128, conv3-128, and conv1-4, where convx-y denotes a convolution layer of y filters of dimension x×x. In some such embodiments, the initial couple layers (conv3-128 and conv3-128) each comprise ELU-activation functions followed by a batch normalization, and the last layer (conv1-4) comprises a sigmoid-activation function for three albedo channels. Accordingly, in some embodiments, the lighting estimation system 110 applies a 2× up-sample to the subsequent network layers 424 as an encoder after a first convolution to pass skip links between the subsequent network layers 424 as the encoder and the network layers 450 as the decoder.

As further shown in FIG. 4B, after reconstructing the localized albedo image 454 and the localized shading image 456, the lighting estimation system 110 compares the localized albedo image 454 and the localized shading image 456 respectively to a ground-truth-albedo image 462 and a ground-truth-shading image 464 using a ground-truth-loss function 460. As used in this disclose, the term "ground-truth-albedo image" refers to an actual or real albedo image depicting reflectance within a local patch of a digital scene. By contrast, the term "ground-truth-shading image" refers to an actual or real shading image depicting shading within a local patch of a digital scene.

In addition to determining a ground-truth loss comparing localized albedo and shading images to ground-truth images, in certain implementations, the lighting estimation system 110 also compares the localized albedo image 454 and the localized shading image 456 to the local training patch 404 using a reconstruction-loss function 458. By using the reconstruction-loss function 458, the lighting estimation system 110 determines whether (and to what extent) the localized albedo image 454 and the localized shading image 456 reconstruct or capture the reflectance and shading in the local training patch 404.

In some embodiments, the lighting estimation system 110 uses a type of MSE function for the ground-truth-loss function 460 and the reconstruction-loss function 458. For example, the lighting estimation system 110 can use the following equations respectively for the ground-truth-loss function 460 and the reconstruction-loss function 458:

$$\mathcal{L}_{rs-mse} = \frac{1}{N}\sum_{i=1}^{N}(R_i^* - R_i)^2 + (S_i^* - S_i)^2 \quad (5)$$

$$\mathcal{L}_{rs-recons} = \frac{1}{N}\sum_{i=1}^{N}(P_i^* - (R_i + S_i))^2 \quad (6)$$

In equation (5), the symbol $\mathcal{L}_{rs-mse}$ represents an MSE loss for a comparison of a localized albedo image to a ground-truth-albedo image and a localized shading image to a ground-truth-shading image in a given training iteration. In equation (6), the symbol $\mathcal{L}_{rs-recons}$ represents a reconstruction loss for a comparison of a localized albedo image and a localized shading image to a local training patch in a given training iteration. As further depicted in equations (5) or (6), $R_i$ represents a log-reflectance prediction based on a localized albedo image, $R^*_i$ represents a ground-truth-log reflectance based on a ground-truth-albedo image, $S_i$ represents a log-shading prediction based on a localized shading image, and $S^*_i$ represents a ground-truth-log shading based on a ground-truth-shading image. Finally, $P^*_i$ represents a local training patch for a given training iteration.

In addition (or in the alternative) to generating a localized albedo image and a localized shading image, in some embodiments, the lighting estimation system 110 uses the local-lighting-estimation-neural network 406 and a discriminator-neural network 474 to distinguish between real and synthetic digital training scenes as training inputs. As shown in FIG. 4B, the lighting estimation system 110 extracts the latent-feature-training vector 436 from the combined-feature-training vector 430 using the network layer 434 of the posterior set of network layers 432b. The lighting estimation system 110 further feeds the latent-feature-training vector 436 (or an instance of the latent-feature-training vector 436) to a gradient reversal layer 472. The gradient reversal layer 472 modifies the latent-feature-training vector 436 to generate a gradient-modified-latent-feature vector.

As further indicated by FIG. 4B, the discriminator-neural network 474 identifies the gradient-modified-latent-feature vector as either real or synthetic—that is, either a vector extracted from a real digital training scene or from a synthetic digital training scene. For example, in some embodiments, the discriminator-neural network 474 generates a realism indicator 476 based on an analysis of the gradient-modified-latent-feature vector. The realism indicator 476 indicates whether the discriminator-neural network 474 identifies the gradient-modified-latent-feature vector as extracted from a real digital training scene or from a synthetic digital training scene. Accordingly, the realism indicator 476 indirectly predicts whether the digital training scene 400 is real or synthetic. In some embodiments, for example, a realism indicator is a value "0" representing real or a value "1" representing synthetic, or vice versa.

The architecture of (and inputs for) the discriminator-neural network 474 can take various forms. For example, in some embodiments, the discriminator-neural network 474 comprises three fully connected layers. In particular, the three fully connected layers can comprise neurons of 64, 32, and 2, respectively, with an ELU-activation function in the initial two fully connected layers followed by batch normalization. Further, instead of the gradient reversal layer 472, the lighting estimation system 110 optionally uses the local-lighting-estimation-neural network 406 as a generator and feeds the discriminator-neural network 474 with localized-lighting-spherical-harmonic-training coefficients as an input. The lighting estimation system 110 can similarly process other intermediary vectors from network layers within the local-lighting-estimation-neural network 406 using the gradient reversal layer 472, such as a combined-feature-training vector. Accordingly, in some embodiments, a realism indicator indicates whether the discriminator-neural network 474 identifies localized-lighting-spherical-harmonic-training coefficients, a combined-feature-training vector, or other intermediary vector as extracted from a real digital training scene or from a synthetic digital training scene.

As further indicated by FIG. 4B, the lighting estimation system 110 determines an adversarial loss using an adversarial loss function 478 based on the realism indicator 476. In some embodiments, the lighting estimation system 110 uses a cross-entropy-loss function as the adversarial loss function 478. For example, in certain cases, the lighting estimation system 110 uses the following equation as the adversarial loss function 478:

$$\mathcal{L}_{da} = -\sum_{i=1}^{N} r_i^* \log r_i \qquad (7)$$

In equation (7), the symbol $\mathcal{L}_{da}$ represents the adversarial loss for a given training iteration. The symbol $r_i$ represents a realism indicator. By contrast, the symbol $r^*_i$ represents a ground-truth indicator for a latent-feature-training vector.

As noted above, the lighting estimation system 110 can use either a real digital training scene or a synthetic digital training scene as a training input for a given training iteration for the local-lighting-estimation-neural network 406. The lighting estimation system 110 can likewise generate any combination of the imagery outputs and determine corresponding losses depending on whether a digital training scene is real or synthetic. For example, in certain implementations, the lighting estimation system 110 applies the gradient reversal layer 472 and the discriminator-neural network 474 to determine an adversarial loss (e.g., by solving equation (7)) when the digital training scene is real—because the lighting estimation system 110 sometimes lacks corresponding ground-truth parameters for real digital training scenes. In some such embodiments, the lighting estimation system 110 does not determine other training losses in a particular training iteration beyond an adversarial loss when using a real digital training scene as a training input.

By contrast, in certain embodiments, the lighting estimation system 110 generates each imagery output and determines each training loss depicted in FIG. 4B when the digital training scene is synthetic. In particular, based on a synthetic digital training scene, the lighting estimation system 110 generates location-specific-lighting parameters, location-specific-depth parameters, a localized albedo image, and a localized shading image. The lighting estimation system 110 further determines training losses using the lighting loss function 444, the depth loss function 468, the reconstruction-loss function 458, the ground-truth-loss function 460, and the adversarial loss function 478.

In some such embodiments, the lighting estimation system 110 determines an overall loss, as follows:

$$\mathcal{L} = \mathcal{L}_{i\text{-}sh} + \mathcal{L}_{d\text{-}sh} + \mathcal{L}_{rs\text{-}mse} + \mathcal{L}_{rs\text{-}recons} + \|\mathcal{L}_{da} \qquad (8)$$

In equation (8), $\mathcal{L}$ represents an overall loss for a given training iteration. The lighting estimation system 110 determines the overall loss by summing the losses from equations (3), (4), (5), (6), and (7), where $\lambda$ is applied to equation (7). Further $\lambda$ represents a weight controlling the importance of a domain adaption loss, where $\lambda=2/(1+\mathrm{esp}(-8n/60))-1$ and n represents a particular epoch. During training, the weight $\lambda$ becomes asymptotically closer to the value 1 as the number of training epochs e increases.

As further indicated by FIG. 4B, upon determining a loss from one or more of the lighting loss function 444, the depth loss function 468, the reconstruction-loss function 458, the ground-truth-loss function 460, or the adversarial loss function 478, the lighting estimation system 110 modifies network parameters (e.g., weights or values) of the local-lighting-estimation-neural network 406 to decrease a loss for such loss function(s) in a subsequent training iteration using back propagation—as shown by the arrows from the various loss functions in FIG. 4B. For example, the lighting estimation system 110 may increase or decrease weights or values from some (or all) of the global anterior set of network layers 408, the local anterior set of network layers 410, and the posterior set of network layers 432a within the local-lighting-estimation-neural network 406 to decrease or minimize a loss in a subsequent training iteration. The lighting estimation system 110 can perform training iterations until the value or weights of the local-lighting-estimation-neural network 406 do not change significantly across training iterations or otherwise satisfies a convergence criteria.

In some implementations, the lighting estimation system 110 trains the network layers of the local-lighting-estimation-neural network 406 from scratch or without initializing parameters using an Adam optimizer where $\beta=(0.9, 0.999)$, except for the initial network layers 412 and 420 each comprising blocks from a DenseNet-121. As noted above, the lighting estimation system 110 can initialize network parameters for blocks of a DenseNet using weights pre-trained on an ImageNet. In training the local-lighting-estimation-neural network 406, the lighting estimation system 110 can use a learning rate of $10^{-4}$ for the initial 60 epochs and a learning rate of $10^{-5}$ for 30 additional epochs.

As further suggested above, the lighting estimation system 110 can train the local-lighting-estimation-neural network 406 using a combination of synthetic digital training scenes and real digital training scenes. For example, the lighting estimation system 110 optionally uses minibatches of 20 digital training scenes comprising 50% synthetic digital training scenes and 50% real digital training scenes. In training iterations using a synthetic digital training scene as an input, the lighting estimation system 110 optionally determines each training loss from equation (8). In one implementation of training, the lighting estimation system 110 uses 83,812 probes at designated positions within 24,000 synthetic digital training scenes and 9,967 probes at designated position within 2,800 synthetic digital training scenes for validation (e.g., to monitor for overfitting).

During training iterations with synthetic digital training scenes, the lighting estimation system 110 optionally augments the synthetic digital training scenes and constituent probes at designated positions using three strategies. First, the lighting estimation system 110 can flip the synthetic digital training scenes horizontally. Second, the lighting estimation system 110 can use a random exposure factor $f \sim \mathcal{U}[0.16, 3]$, where $\mathcal{U}[a, b]$ is a uniform distribution in the [a, b] interval. Third, the lighting estimation system 110 can use a random camera response function $f(x)=x^{1/\gamma}$, $\gamma \sim \mathcal{U}[1.8, 2.4]$.

During training iterations with real digital training scenes, the lighting estimation system 110 optionally uses digital training scenes extracted from the Laval Indoor HDR dataset, as described in Gardner. Because the real images from the Laval Indoor HDR dataset lack corresponding ground-truth parameters, in some embodiments, the lighting estimation system 110 determines an adversarial loss from equation (7), but not losses from equations (3), (4), (5), or (6), when using such real images training inputs.

Once trained, the lighting estimation system 110 can use the local-lighting-estimation-neural network to generate location-specific-lighting parameters. FIG. 4C depicts an example of one such application. In general, and as shown in FIG. 4C, the lighting estimation system 110 can identify a request to render a virtual object 493 at a designated position within a digital scene 480. The lighting estimation system 110 then can use the local-lighting-estimation-neural network 406 to analyze the digital scene 480, a local position indicator 481 indicating the designated position, and a local patch 482 extracted from the digital scene 480 to generate localized-lighting-spherical-harmonic coefficients 490 for the designated position. Based on the request, the lighting estimation system 110 can render a modified digital scene 492 comprising the virtual object 493 at the designated position illuminated according to the localized-lighting-spherical-harmonic coefficients 490.

As just noted, the lighting estimation system 110 can identify a request to render the virtual object 493 at a designated position within the digital scene 480. For instance, the lighting estimation system 110 may identify a digital request from a computing device executing an augmented-reality application to render a virtual piece of furniture (or other virtual item) at a particular position on, near, or within another piece of furniture (or another real item) depicted in the digital scene 480. Alternatively, the lighting estimation system 110 may identify a digital request from computer-executable instructions that are part of an augmented-reality application and accordingly not directly selected by a user. As indicated by FIG. 4C, the request to render the virtual object 493 can include the local position indicator 481 for a designated position at which to render the virtual object 493.

Based on receiving the request indicated by FIG. 4C, the lighting estimation system 110 can process the digital scene 480 using the local-lighting-estimation-neural network 406. In particular, the lighting estimation system 110 can feed the digital scene 480 to the initial network layers 412 of the global anterior set of network layers 408 to extract a global feature map 483 from the digital scene 480. Consistent with the disclosure above, the lighting estimation system 110 further can apply a masking feature map 485 to the global feature map 483. For example, the lighting estimation system 110 multiplies the global feature map 483 and the masking feature map 485.

By applying the masking feature map 485 to the global feature map 483, the lighting estimation system 110 can generate a masked-dense-feature map. Given that the masking feature map 485 and the global feature map 483 comprise the same spatial resolution, in some embodiments, the masking feature map 485 effectively masks the global feature map 483 to create the masked-dense-feature map. The masked-dense-feature map accordingly represents a local feature map corresponding to the local patch 482 influenced by global lighting within the digital scene 480.

After generating the masked-dense-feature map, the lighting estimation system 110 can use the subsequent network layers 418 of the global anterior set of network layers 408 to extract a global feature vector 486 from the masked-dense-feature map. As suggested above, the global feature vector 486 can constitute a 5120-dimensional vector.

As further shown in FIG. 4C, the lighting estimation system 110 can analyze the local patch 482 in a local path of the local-lighting-estimation-neural network 406. In particular, the lighting estimation system 110 can extract the local patch 482 from the digital scene 480 based on the location position indicator 481. The lighting estimation system 110 subsequently can feed the local patch 482 to the local-lighting-estimation-neural network 406. Upon receiving the local patch 482 as an input, the lighting estimation system 110 can use the initial network layers 420 from the local anterior set of network layers 410 to extract a local feature map 484 from the local patch 482. In some embodiments, the local feature map 484 represents visual features of the local patch 482, such as color and lighting conditions or latent features of the local patch 482.

After extracting the local feature map 484, the lighting estimation system 110 can utilize the subsequent network layers 424 of the local anterior set of network layers 410 to extract a local feature vector 487 from the local feature map 484. In terms of dimension, the local feature vector 487 can constitute a 512-dimensional vector. By using both a global path and a local path, the lighting estimation system 110 accordingly can apply the global anterior set of network layers 408 and the local anterior set of network layers 410 to respectively extract the global feature vector 486 from the digital scene 480 and the local feature vector 487 from the local patch 482.

As further shown in FIG. 4C, the lighting estimation system 110 can concatenate the global feature vector 486 and the local feature vector 487 to form a combined feature vector 488. As a further example, the lighting estimation system 110 optionally couples the global feature vector 486 and the local feature vector 487 together to form a dual or stacked feature map as the combined feature vector 488. But any suitable concatenation method may be used.

Upon generating the combined feature vector 488, the lighting estimation system 110 can use the network layer 434 of a posterior set of network layers 432c to extract a latent feature vector 489 from the combined feature vector 488. The lighting estimation system 110 further can feed the latent feature vector 489 to the network layer 438 of the posterior set of network layers 432c. Based on the latent feature vector 489, the lighting estimation system 110 can use the network layer 438 to generate the localized-lighting-spherical-harmonic coefficients 490. Consistent with the disclosure above, the localized-lighting-spherical-harmonic coefficients 490 can indicate lighting conditions for a designated position within the digital scene 480. For example, the localized-lighting-spherical-harmonic coefficients 490 indicate lighting conditions for a designated position within the digital scene 480 identified by the local position indicator 481.

After generating such location-specific-lighting parameters, the lighting estimation system 110 can render the modified digital scene 492 comprising the virtual object 493 at the designated position illuminated according to the localized-lighting-spherical-harmonic coefficients 490. For example, in some embodiments, the lighting estimation system 110 superimposes or otherwise integrates a computer-generated image of the virtual object 493 within the digital scene 480. As part of the rendering, the lighting estimation system 110 can select and renders pixel for the virtual object 493 that reflect lighting, shading, or appropriate color hues indicated by the localized-lighting-spherical-harmonic coefficients 490.

As further shown in FIG. 4C, the lighting estimation system 110 optionally generates localized-depth-spherical-harmonic coefficients 491. To generate such coefficients, the lighting estimation system 110 can process the latent feature vector 489 using the network layer 446 from the posterior set of network layers 432c. By passing the latent feature vector 489 through the network layer 446, the local-lighting-estimation-neural network 406 can generate the localized-depth-spherical-harmonic coefficients 491.

As indicated above, the lighting estimation system 110 optionally uses such localized-depth-spherical-harmonic coefficients to render modified digital scenes. Accordingly, in some embodiments, the lighting estimation system 110 renders the modified digital scene 492 comprising the virtual object 493 at the designated position illuminated according to the localized-lighting-spherical-harmonic coefficients 490 and the localized-depth-spherical-harmonic coefficients 491. As part of the rendering, for example, the lighting estimation system 110 selects and renders pixels for the virtual object 493 that reflect a depth map for an object at the designated position as indicated by the localized-depth-spherical-harmonic coefficients 491.

In addition to accurately portraying lighting conditions at designated positions, the localized-lighting-spherical-harmonic coefficients 490 can dynamically capture lighting from different perspectives of a designated position within the digital scene 480. As the digital scene 480 changes in perspective in camera viewpoint, model orientation, or other perspective adjustment, in some embodiments, in certain implementations, the localized-lighting-spherical-harmonic coefficients 490 can still accurately indicate lighting conditions for the designated position despite such perspective changes.

For example, in some embodiments, the lighting estimation system 110 identifies a perspective-adjustment request to render the digital scene 480 from a different point of view, such as by detecting movement of a mobile device reorienting the digital scene 480 or identifying a user input modifying the perspective of the digital scene 480 (e.g., a camera movement adjusting the perspective). Based on the perspective-adjustment request, the lighting estimation system 110 can render a modified digital scene from the different point of view comprising the virtual object 493 at the designated position illuminated according to the localized-lighting-spherical-harmonic coefficients 490.

Alternatively, in certain implementations, the lighting estimation system 110 adjusts or generates new location-specific-lighting parameters in response to a perspective-adjustment request and corresponding change in point of view for a digital scene (e.g., a camera movement adjusting the perspective). For instance, in some embodiments, the lighting estimation system 110 identifies a perspective-adjustment request to render a virtual object at a designated position within a digital scene from a new or different point of view. Based on such a perspective-adjustment request, the lighting estimation system 110 can generate new localized-lighting-spherical-harmonic coefficients consistent with FIG. 4C.

In some cases, for example, the lighting estimation system 110 generates a new local position indicator for the designated position within the digital scene from a different point of view (e.g., new coordinates for a new designated position). The lighting estimation system 110 also extracts a new local patch from the digital scene (e.g., where the new local patch uses the new local position indicator as a center point). When following the global path within the local-lighting-estimation-neural network 406, the lighting estimation system 110 can extract a new global feature map from the digital scene utilizing the global anterior set of network layers 410. The lighting estimation system 110 further can extract a new global feature vector from the new global feature map based on a masking feature map for the new local patch again utilizing the global anterior set of network layers 410.

When following the local path within the local-lighting-estimation-neural network 406, the lighting estimation system 110 can extract a new local feature map from a new local patch of the digital scene utilizing the local anterior set of network layers 410. The lighting estimation system 110 further can extract a new local feature vector from the new local feature map again utilizing the local anterior set of network layers 410. The lighting estimation system 110 subsequently can combine the new global feature vector and the new local feature vector to form a new combined feature vector.

Based on the new combined feature vector, the lighting estimation system 110 can generate new localized-lighting-spherical-harmonic coefficients for the designated position from the different point of view using a posterior set of network layers. In response to the perspective-adjustment request, the lighting estimation system 110 accordingly can render an adjusted digital scene comprising the virtual object at the designated position illuminated according to the new localized-lighting-spherical-harmonic coefficients.

In addition to generating such location-specific-lighting parameters, in some embodiments, the lighting estimation system 110 uses localized-lighting-spherical-harmonic coefficients and localized-depth-spherical-harmonic coefficients to predict a location of a light source and render a virtual light source within a digital scene. Based on predictions from the direction and distance of a light source from such spherical harmonic coefficients, the lighting estimation system 110 optionally renders a light source with an intensity and shape consistent with the spherical harmonic coefficients. Additionally, or alternatively, the lighting estimation system 110 can edit or filter a digital scene to have consistent lighting throughout based on a predicted location and intensity of a light source.

Conversely, in certain implementations, the lighting estimation system 110 reconstructs three-dimensional scenes based on localized-lighting-spherical-harmonic coefficients, localized-depth-spherical-harmonic coefficients, a localized albedo image, and a localized shading image for a designated position within a scene. By relying on the illumination, depth, reflectance, and shading from such imagery outputs, the lighting estimation system 110 optionally estimates a shape of a three-dimensional indoor space and lighting at positions throughout the space.

As suggested above, the lighting estimation system 110 can generate or adjust one or both of location-specific-lighting parameters and location-specific-depth parameters based on a change in a virtual object's position or a change in lighting conditions within a digital scene. To illustrate such adjustments, FIGS. 5A-5D depict an embodiment of the lighting estimation system 110 in which a computing device renders a digital scene comprising a virtual object at different designated positions and under different lighting conditions according to location-specific-lighting parameters. As an overview, FIGS. 5A-5D each depict a computing device 500 comprising an augmented-reality application for the augmented-reality system 108 and the lighting estimation system 110. The augmented-reality application comprises computer-executable instructions that cause the computing device 500 to perform certain actions depicted in FIGS. 5A-5D.

Rather than repeatedly describe the computer-executable instructions within the augmented-reality application as causing the computing device 500 to perform such actions, this disclosure primarily describes the computing device 500 or the lighting estimation system 110 as performing the actions as a shorthand. This disclosure additionally refers to various user interactions indicated by FIGS. 5A-5D, such as when the computing device 500 detects a user selection of a virtual object. While the computing device 500 appears as a mobile device (e.g., tablet) in FIGS. 5A-5D, the computing device 500 may alternatively be any type of computing device, such as a desktop, laptop, or smartphone, and may also detect any suitable user interaction, including, but not limited to, an audio input into a microphone, a gaming-device-button input, a keyboard input, a mouse click, a stylus interaction with a touch screen, or a touch gesture on a touch screen.

Figure 5A:
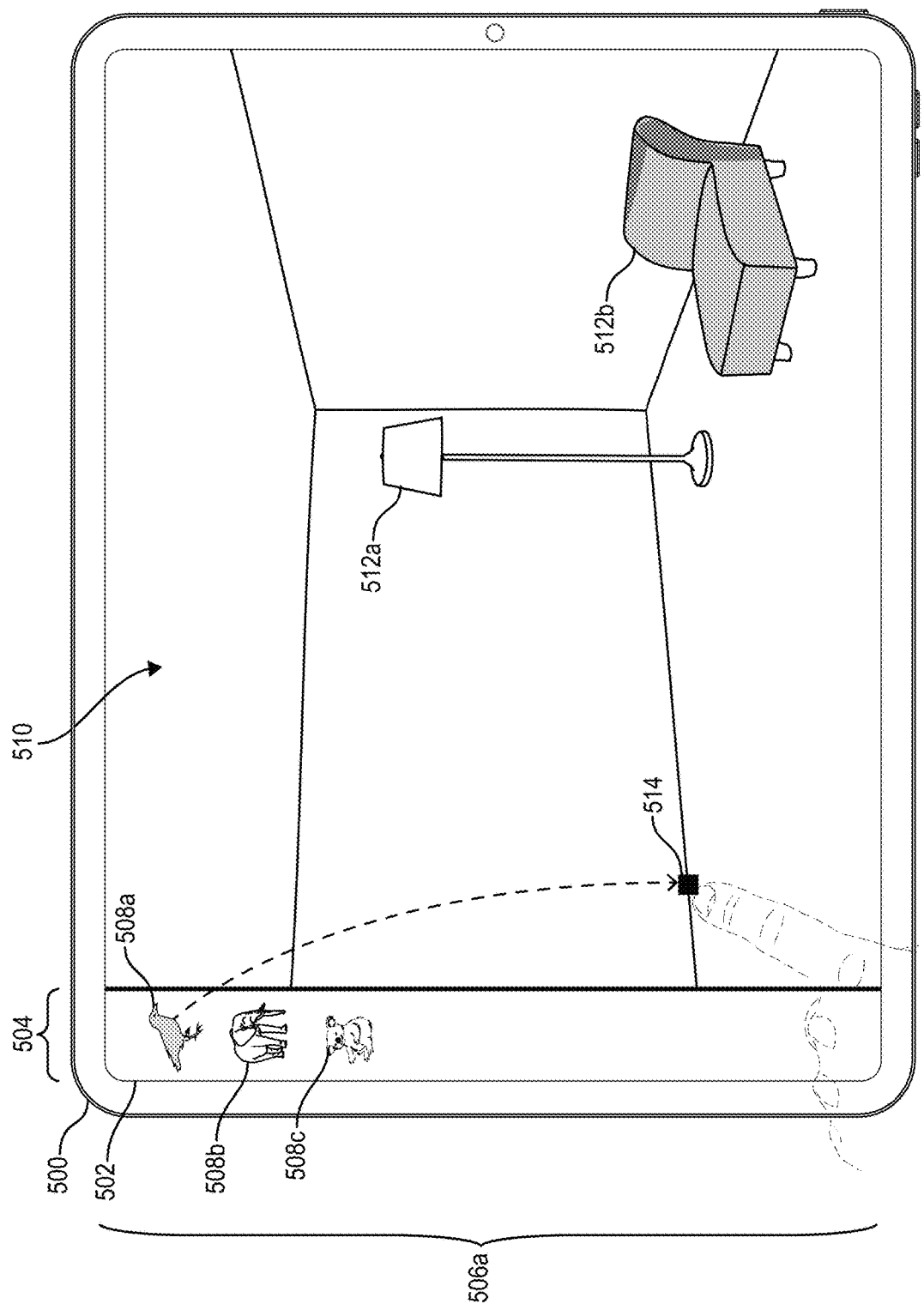
FIGS. 5A-5D illustrate a computing device rendering a digital scene comprising a virtual object at different designated positions and under different lighting conditions according to location-specific-lighting parameters in accordance with one or more embodiments.

Turning back now to FIG. 5A, this figure depicts the computing device 500 presenting a graphical user interface 506a comprising a digital scene 510 within a screen 502. As shown in FIG. 5A, the digital scene 510 includes real objects 512a and 512b. The graphical user interface 506a further comprises a selectable-option bar 504 for virtual objects 508a-508c. By presenting the graphical user interface 506a, the computing device 500 provides options for a user to request the lighting estimation system 110 to render one or more of the virtual objects 508a-508c at designated positions within the digital scene 510.

As indicated by FIG. 5A, for example, the computing device 500 detects a user interaction requesting that the lighting estimation system 110 render the virtual object 508a at a designated position 514 within the digital scene 510. In particular, FIG. 5A depicts the computing device 500 detecting a drag-and-drop gesture moving the virtual object 508a to the designated position 514 or identifying the designated position 514 as a destination for the virtual object 508a. While FIG. 5A illustrates a user using a drag-and-drop gesture, the computing device 500 may detect any suitable user interaction requesting the lighting estimation system 110 render a virtual object within a digital scene.

Figure 5B:
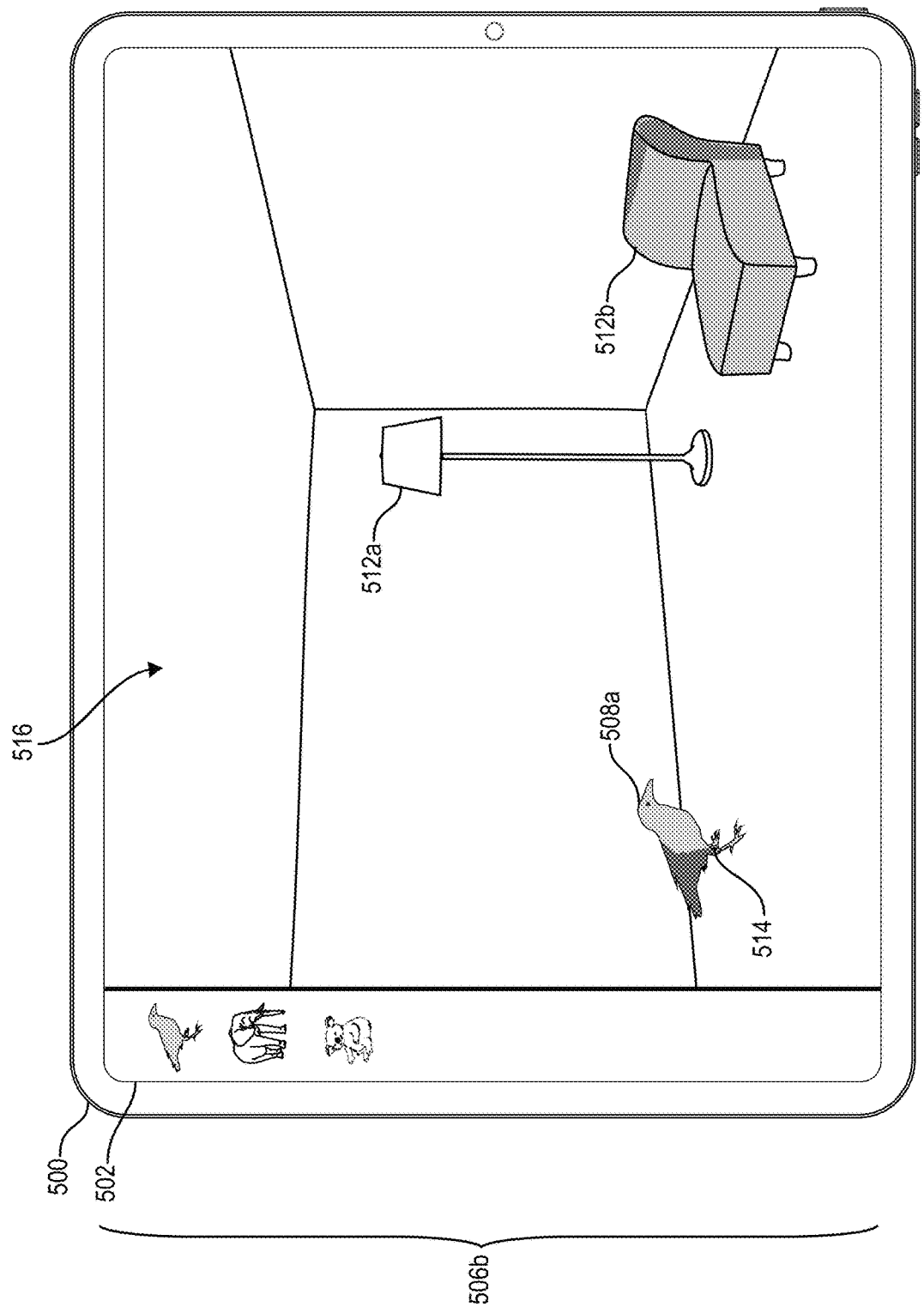

Based on receiving the request for the lighting estimation system 110 to render the virtual object 508a within the digital scene 510, the augmented-reality system 108 in conjunction with the lighting estimation system 110 can render the virtual object 508a at the designated position 514. FIG. 5B depicts an example of such a rendering. As illustrated in FIG. 5B, the computing device 500 presents a graphical user interface 506b comprising a modified digital scene 516 within the screen 502. Consistent with the disclosure above, the computing device 500 renders the modified digital scene 516 comprising the virtual object 508a at the designated position 514 illuminated according to location-specific-lighting parameters and (optionally) location-specific-depth parameters generated by the lighting estimation system 110.

To generate one or both of such location-specific-lighting parameters and location-specific-depth parameters, the lighting estimation system 110 optionally performs the actions illustrated in FIG. 4C. As shown in rendered form in FIG. 5B, the location-specific-lighting parameters indicate realistic lighting conditions for the virtual object 508a with lighting and shading consistent with the real objects 512a and 512b. The shading for the virtual object 508a and for the real object 512b consistently reflect light from the real object 512a (e.g., a lamp and artificial light source) and from a light source outside the perspective shown in the modified digital scene 516.

Figure 5C:
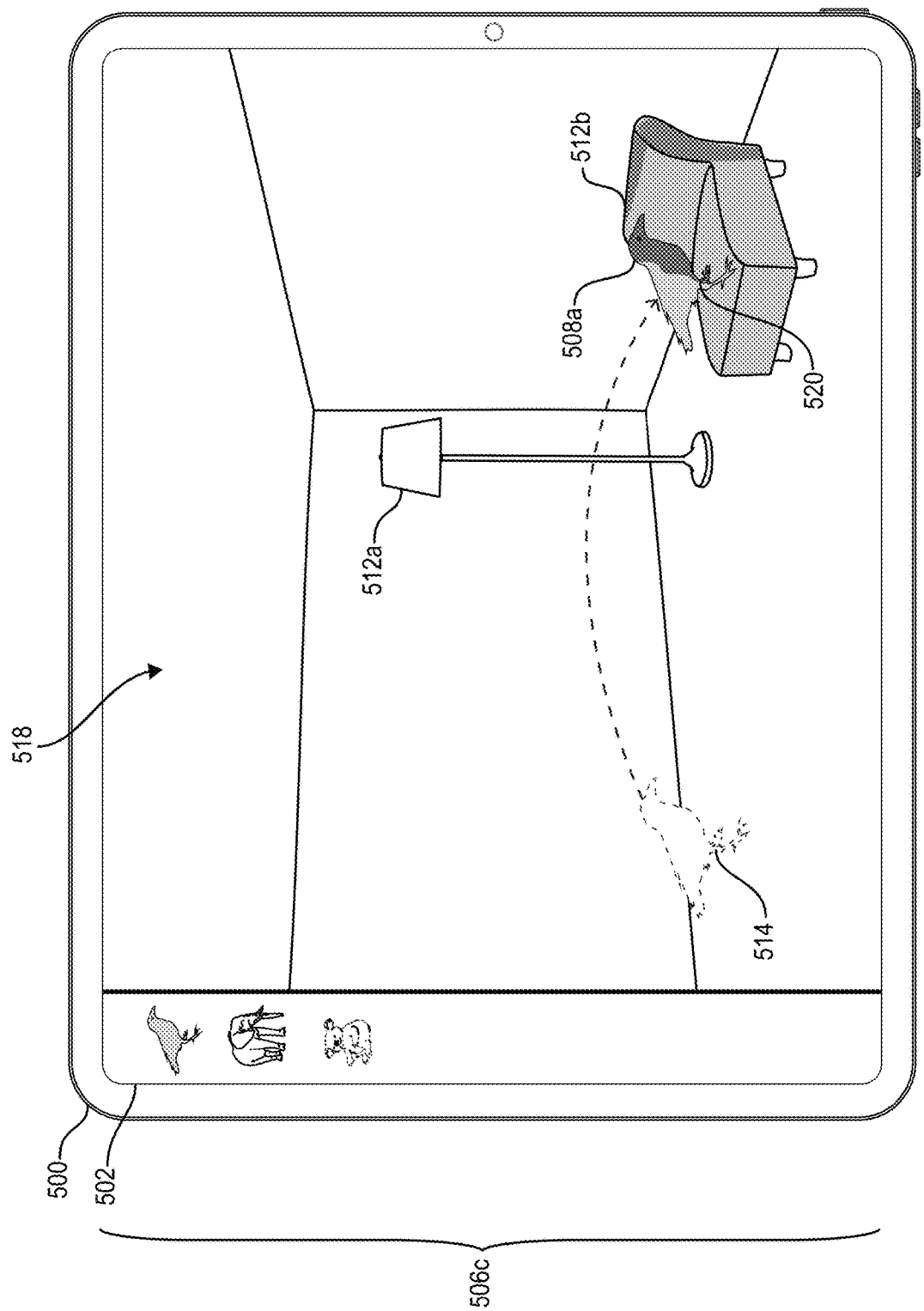

As noted above, the lighting estimation system 110 can generate new location-specific-lighting parameters and an adjusted digital scene in response to a position-adjustment request to render a virtual object at a new designated position. FIG. 5C depicts an example of such an adjusted digital scene reflecting new location-specific-lighting parameters. As shown in FIG. 5C, the computing device 500 presents a graphical user interface 506c comprising an adjusted digital scene 518 within the screen 502. As a trigger for moving the virtual object 508a, the computing device 500 detects a user interaction comprising a position-adjustment request to move the virtual object 508a from the designated position 514 to a new designated position 520.

Based on receiving the request for the lighting estimation system 110 to move the virtual object 508a, the augmented-reality system 108 in conjunction with the lighting estimation system 110 render the virtual object 508a at the new designated position 520. Accordingly, FIG. 5C depicts the computing device 500 rendering the adjusted digital scene 518 comprising the virtual object 508a at the new designated position 520 illuminated according to new location-specific-lighting parameters and (optionally) new location-specific-depth parameters generated by the lighting estimation system 110.

To generate such new location-specific-lighting parameters, the lighting estimation system 110 optionally uses the local-lighting-estimation-neural network 406 to generate location-specific-spherical-harmonic coefficients as illustrated in FIG. 4C. For instance, the lighting estimation system 110 can identify a new local position indicator based on the new designated position 520 and extract a new local patch from a digital scene (e.g., the digital scene 510 or the modified digital scene 516) based on the new local position indicator. The lighting estimation system 110 can then use the new designated position 520 and extract a new local patch to generate new or updated location-specific-spherical-harmonic coefficients. In response to the position-adjustment request, the augmented-reality system 108 in conjunction with the lighting estimation system 110 accordingly can render the adjusted digital scene 518 comprising the virtual object 508a at the new designated position 520 illuminated according to the new localized-lighting-spherical-harmonic coefficients.

As depicted in FIG. 5C, the new localized-lighting-spherical-harmonic coefficients indicate realistic lighting conditions for the virtual object 508a with adjusted lighting and shading consistent with the real objects 512a and 512b. As the transition from FIGS. 5B to 5C illustrate, the lighting estimation system 110 can adapt lighting conditions to different positions in real (or near-real) time in response to a position-adjustment request to move a virtual object within a digital scene. For example, in some embodiments, the lighting estimation system 110 can generate the modified digital scene 516 or the adjusted digital scene 518 in 20 milliseconds per image using a Nvidia 970M mobile Graphics Processing Unit ("GPU"). The transition from FIGS. 5B to 5C further illustrates a practical application of the lighting estimation system 110 in real time. As a user drags a virtual object across a screen in a video captured using Kinect V2 with a static camera, the lighting estimation system 110 can adjust location-specific-lighting parameters for the virtual object in different RGB images with different lighting.

Figure 5D:
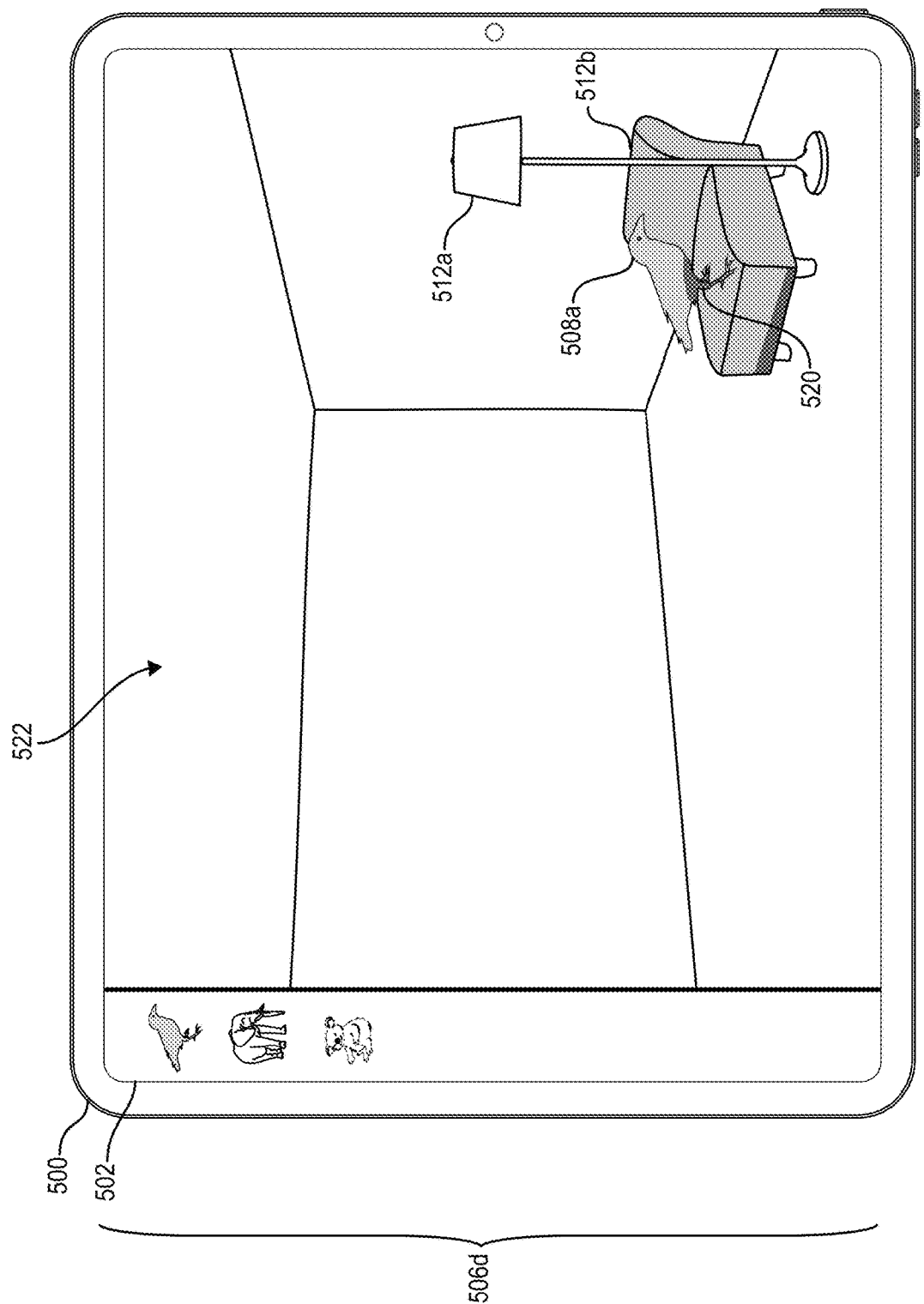

As further noted above, the lighting estimation system 110 can also generate new location-specific-lighting parameters and an adjusted digital scene in response to a change in lighting conditions within a digital scene. FIG. 5D depicts an example of such an adjusted digital scene reflecting new location-specific-lighting parameters for a change in lighting conditions. As shown in FIG. 5D, the computing device 500 presents a graphical user interface 506*d* comprising an adjusted digital scene 522 within the screen 502. The computing device 500 detects a change in lighting conditions, for example, when the real object 512*a* (e.g., a lamp or other light source) moves from one position to another position within a digital scene. The change in lighting conditions could likewise come from a change in light intensity, a change in occlusion, or some other change in position or brightness to a light source.

Based on detecting a change in lighting conditions, the augmented-reality system 108 in conjunction with the lighting estimation system 110 can render the virtual object 508*a* at the new designated position 520 according to new location-specific-lighting parameters reflecting the changed lighting conditions. Accordingly, FIG. 5C depicts the computing device 500 rendering the adjusted digital scene 518 comprising the virtual object 508*a* at the new designated position 520 illuminated according to new location-specific-lighting parameters and (optionally) new location-specific-depth parameters generated by the lighting estimation system 110 in response to the changed lighting conditions.

To generate new location-specific-lighting parameters reflecting the changed lighting conditions, the lighting estimation system 110 optionally uses the local-lighting-estimation-neural network 406 to generate new location-specific-spherical-harmonic coefficients reflecting the changed lighting conditions, in the manner described above in relation to FIG. 4C. In response to the change in lighting conditions, the augmented-reality system 108 in conjunction with the lighting estimation system 110 accordingly can render the adjusted digital scene 518 comprising the virtual object 508*a* at the new designated position 520 illuminated according to the new localized-lighting-spherical-harmonic coefficients reflecting the changed lighting conditions.

The transition from FIGS. 5C to 5D further illustrates a practical application of the lighting estimation system 110 in real time. As a user moves a light source in real time as recorded by a video captured using Kinect V2, the lighting estimation system 110 can adjust location-specific-lighting parameters for a virtual object in different RGB images to reflect a change in lighting from the moving light source. In some such embodiments, the lighting estimation system 110 automatically adjusts such location-specific-lighting parameters for a designated position within each frame of such a video with an execution time of 20 milliseconds per image using the Nvidia 970M mobile GPU.

Figure 6:
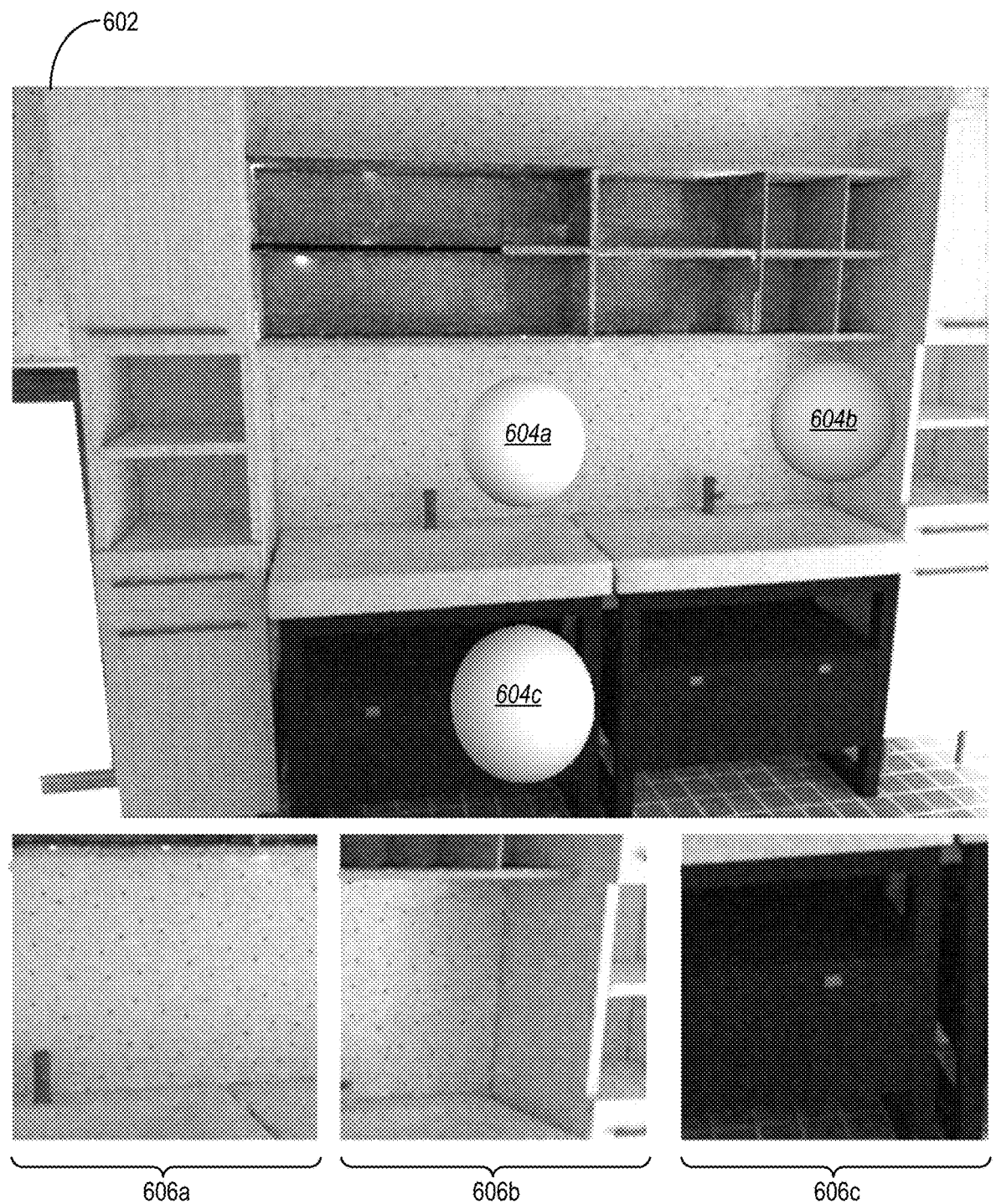
FIG. 6 illustrates a digital scene comprising virtual objects at different designated positions illuminated according to location-specific-lighting parameters generated by a lighting estimation system in accordance with one or more embodiments.

As noted above, the lighting estimation system 110 can generate location-specific-lighting parameters that indicate accurate and realistic lighting conditions for specific positions within a digital scene. To test the accuracy and realism of the lighting estimation system 110, researchers modified synthetic digital scenes from the SUNCG dataset (as described above) and applied variations of a local-lighting-estimation-neural network to generate location-specific-lighting parameters for various positions within such digital scenes. As described below, the researchers performed a couple of ablation studies to test the accuracy and realism of a local-lighting-estimation-neural network. FIG. 6 illustrates a qualitative example of the accuracy and realism with which the lighting estimation system 110 renders a digital scene with probes at different depths and at positions illuminated according to localized-lighting-spherical-harmonic coefficients, as suggested by the following ablation studies.

As inputs for the ablation studies, the lighting estimation system 110 used a non-overlapping set of 9,900 probes within 2,800 synthetic digital scenes. Based on the synthetic digital scenes, the researchers evaluated the accuracy of modified digital scenes output by the lighting estimation system 110 when using various combinations of a global path and a local path in a neural network. The researchers further evaluated the accuracy and shading within modified digital scenes output by lighting estimation system 110 using a neural network.

In the first ablation study, for example, the researchers evaluated the impact of using a global path and a local path in a neural network. As shown in Table 1 below, the researchers used various combinations of a global path and a local path in a neural network and determined a MAE loss with various degrees of spherical harmonic coefficients. To vary the architecture of a neural network, the researchers used (i) a neural network comprising a global anterior set of network layers without a masking feature map and without a local anterior set of network layers, as indicated by "Global (w/o mask)" in Table 1; (ii) a neural network comprising a global anterior set of network layers with a masking feature map, but without a local anterior set of network layers, as indicated by "Global (w/mask)" in Table 1; (iii) a neural network comprising a local anterior set of network layers, but without a global anterior set of network layers, as indicated by "Local" in Table 1; and (iv) a neural network comprising a global anterior set of network layers with a masking feature map and a local anterior set of network layers, as indicated by "Local+Global" in Table 1. Each variation of the neural network comprised a posterior set of network layers. The researchers used the neural network comprising "Global (w/o mask)" as a baseline to process a full digital scene without a local patch—similar to Gardner.

As shown in Table 1, the neural network for "Global (w/o mask)" can predict an average lighting condition of a digital scene as a whole without local information, but fails to predict local changes in lighting conditions—producing low accuracy in terms of MAE loss. When using the neural network for "Global (w/mask)"—in which the lighting estimation system 110 concatenates a global feature map and a masking feature map—the lighting estimation system 110 lowers the error rate in terms of MAE loss. Further, when using the neural network for "Local," the lighting estimation system 110 improves the accuracy in terms of MAE loss. Such an improved MAE loss suggests that local lighting can differ significantly from global lighting and that a local patch and a local anterior set of network layers better captures local lighting than a global anterior set of network layers by itself. The lighting estimation system 110 measured even better accuracy in terms of MAE loss by using the neural network for "Local+Global." Such an improved MAE loss suggests that a combination of a global anterior set of network layers, a masking feature map, and a local anterior set of network layers in a local-lighting-estimation-neural network improves accuracy of capturing local lighting conditions at designated positions.

TABLE 1

| SH Degree | Global (w/o mask) | Global (w/ mask) | Local | Local + Global (w/ mask) |
|---|---|---|---|---|
| 0 | 0.698 | 0.563 | 0.553 | 0.520 |
| 1 | 0.451 | 0.384 | 0.412 | 0.379 |
| 2-5 | 0.182 | 0.158 | 0.165 | 0.159 |

In the second ablation study, researchers compared the performance of a local-lighting-estimation-neural network trained using various imagery tasks and corresponding training losses in a cumulative progression. To vary the imagery tasks and corresponding training losses in a cumulative progression, the researchers used (i) a local-lighting-estimation-neural network generating localized-lighting-spherical-harmonic-training coefficients with a corresponding loss from equation (3) in training iterations, as indicated by "$\mathcal{L}_{i-sh}$" in Table 2; (ii) a local-lighting-estimation-neural network further generating localized-depth-spherical-harmonic-training coefficients with a corresponding loss from equation (4) in training iterations, as indicated by "$+\mathcal{L}_{d-sh}$" in Table 2; (iii) a local-lighting-estimation-neural network further generating a localized albedo image and a localized shading image with corresponding losses from equations (5) and (6) in training iterations, as indicated by "$+\mathcal{L}_{rs-mse}+\mathcal{L}_{rs-recons}$" in Table 2; and (iv) a local-lighting-estimation-neural network generating the previous imager outputs—that is, localized-lighting-spherical-harmonic-training coefficients, localized-depth-spherical-harmonic-training coefficients, a localized albedo image, and a localized shading image with corresponding losses from equations (3), (4), (5), and (6) in training iterations, as indicated by "All" in Table 2. As a point of comparison, the researchers used the neural network using equation (3) alone with $\mathcal{L}_{i-sh}$ as a baseline.

As shown in Table 2, a local-lighting-estimation-neural network further trained with an MSE loss on a low frequency probe depth $\mathcal{L}_{d-sh}$ improves the accuracy of directional components for spherical harmonic coefficients. But such training has little impact on spherical harmonic coefficients of degree zero. Conversely, a local-lighting-estimation-neural network further trained with localized albedo images and localized shading images, a ground-truth-loss function, and a reconstruction loss "$+\mathcal{L}_{rs-mse}+\mathcal{L}_{rs-recons}$" improves the ambient light estimation, as shown by spherical harmonic coefficients of degree zero. But such a local-lighting-estimation-neural network largely does not change directional components for spherical harmonic coefficients. As shown by the "All" column in Table 2, a local-lighting-estimation-neural network trained with all such imagery subtasks and corresponding losses improves both directional components and ambient light estimation. For purposes of comparison, the row for "Degree 1 Angle" in Table 2 represents an angular error for a degree one for spherical harmonic coefficients.

TABLE 2

| SH Degree | $\mathcal{L}_{i-sh}$ | $+\mathcal{L}_{d-sh}$ | $+\mathcal{L}_{rs-mse}$ $+\mathcal{L}_{rs-recons}$ | All |
|---|---|---|---|---|
| 0 | 0.520 | 0.511 | 0.472 | 0.449 |
| 1 | 0.379 | 0.341 | 0.372 | 0.336 |
| 2-5 | 0.159 | 0.149 | 0.166 | 0.146 |
| Degree 1 Angle | 0.604 | 0.582 | 0.641 | 0.541 |

Turning back to FIG. 6, this figures illustrates a digital scene 602 demonstrating some of the improved accuracy and shading in digital scenes generated by a local-lighting-estimation-neural network trained with "Local+Global" and "All" imagery tasks and losses. As shown in FIG. 6, the digital scene 602 includes virtual objects 604a-604c. Local patches 606a-606c respectively correspond to designated positions at which the lighting estimation system 110 renders the virtual objects 604a-604c. As a qualitative demonstration, the local patch 606a constitutes a reference local patch. The local patch 606b includes similar brightness as the local patch 606a, but different lighting conditions in comparison to the local patch 606a. Conversely, the local patch 606c has similar lighting as the local patch 606a, but different brightness in comparison to the local patch 606a. As the virtual objects 605a-604c shown in FIG. 6 demonstrate, the lighting estimation system 110 can render virtual objects at various designated positions according to localized-lighting-spherical-harmonic coefficients—with accurate and different lighting conditions and brightness for each designated position.

Figure 7:
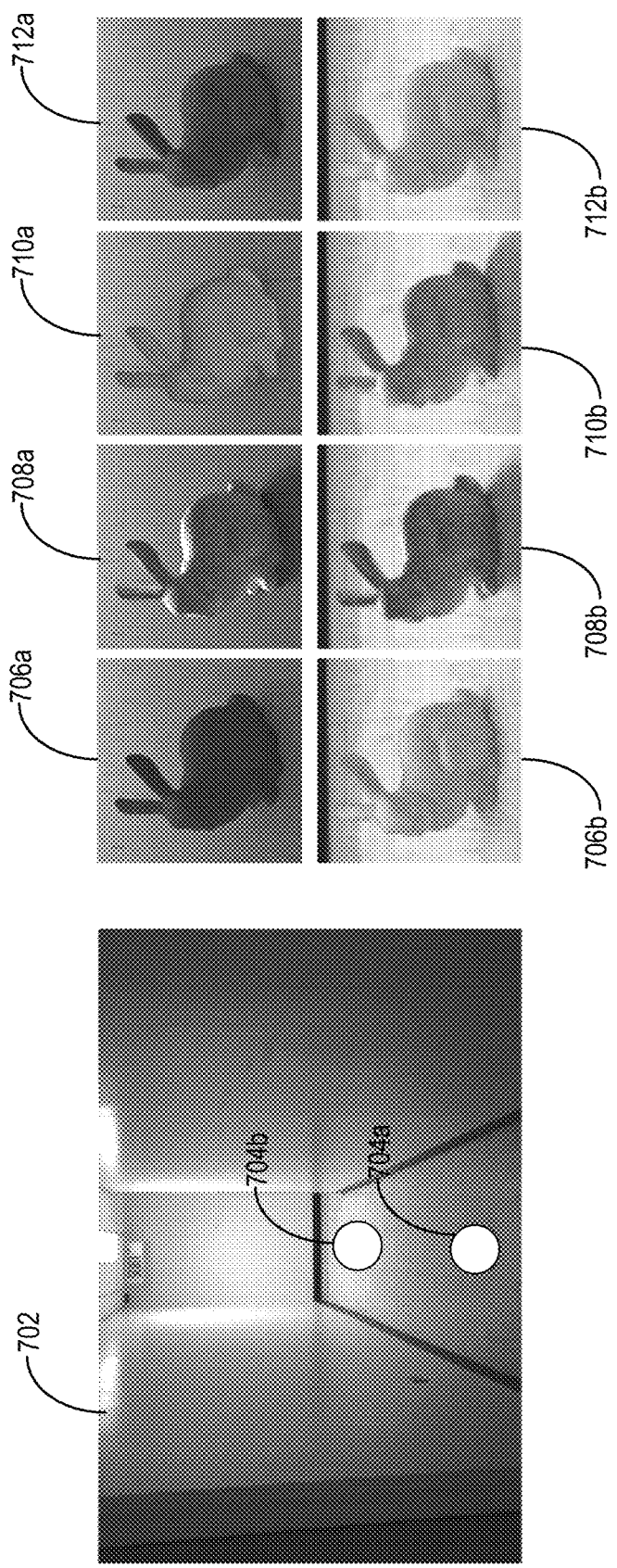
FIG. 7 illustrates a digital scene indicating designated positions and virtual objects illuminated at the designated positions according to location-specific-lighting parameters generated by different approaches in accordance with one or more embodiments.

As further noted above, the lighting estimation system 110 can generate location-specific-lighting parameters reflecting realistic lighting conditions in real digital scenes. To test a local-lighting-estimation-neural network using real digital scenes, researchers used a set of real digital images to evaluate the local-lighting-estimation-neural network (i) in terms of domain adaptation, (ii) in quantitative comparisons to existing augmented-reality systems, and (iii) in qualitative comparisons to existing augmented-reality systems as determined in a user-comparison study. To illustrate images shown in the user comparisons, FIG. 7 depicts digital scenes with virtual objects rendered at different designated positions according to lighting parameters generated by some existing augment-reality systems and by the lighting estimation system 110.

As part of testing real digital scenes with the local-lighting-estimation-neural network, researchers captured real indoor scenes and light probes in positions with spatially varying lighting conditions. In particular, the researchers captured the real digital scenes with a Canon Electro-Optical System ("EOS") 5D mark III and a 24-105 mm lens on a tripod. The researchers initially captured the real digital scenes in HDR by merging seven bracketed exposures from 1/8000 s to 8 s with an f/11 aperture. For each real digital scene, the researchers captured an average of four HDR light probes by placing a three-inch diameter chrome ball at different designated locations within a view and shooting the entire real scene with the chrome ball in HDR in each of the different designated locations.

The researchers further segmented out the chrome balls and rotated the corresponding cube map according to its view vector with respect to the center of the camera's projection. After segmentation and rotation, the real digital scenes comprise 20 real indoor scenes and 79 HDR light probes used in the following quantitative and qualitative evaluations. In particular, the lighting estimation system 110 trained one or more local-lighting-estimation-neural networks and neural networks described in Gardner with the real digital scenes using a diffuse bunny model. By using cube maps as a reference for ground truths and by determining a Root Mean Square Error ("RMSE") and a scale-invariant RMSE ("si-RMSE") for the outputs of the local-lighting-estimation-neural network and the neural networks from Gardner, the researchers evaluated relighting errors to compare the lighting parameters of local-lighting-estimation-neural network with Gardner. As suggested above, because the embodiment of the local-lighting-estimation-neural network used in the comparison outputs localizedlighting-spherical-harmonic coefficients, the lighting estimation system 110 converts such localized-lighting-spherical-harmonic coefficients to cube maps before rendering a digital scene with a virtual object.

As indicated in Table 3, to evaluate relighting error in terms of domain adaptation, the researchers used the real indoor scenes as inputs for (i) a local-lighting-estimation-neural network trained with domain adaptation using the discriminator-neural network 474 and an adversarial loss determined by equation (7) and (ii) a local-lighting-estimation-neural network trained without such domain adaptation. As shown in Table 3, the local-lighting-estimation-neural network trained with domain adaptation generated spherical harmonic coefficients with better corresponding RMSE and si-RMSE than the local-lighting-estimation-neural network trained without domain adaptation. Accordingly, domain adaptation improves relighting error for a local-lighting-estimation-neural network, albeit in slight increments of RMSE and si-RMSE.

TABLE 3

|  | Local-Lighting-Estimation-Neural Network w/o Domain Adaption | Local-Lighting-Estimation-Neural Network w/ Domain Adaptation |
| --- | --- | --- |
| RMSE | 0.051 ± 0.011 | 0.049 ± 0.006 |
| si-RMSE | 0.072 ± 0.009 | 0.062 ± 0.005 |

To provide a more nuanced comparison, the researchers further determined RMSE and si-RMSE for a local-lighting-estimation-neural network, a neural network named "global" in Gardner (hereinafter "Gardner Global"), and a neural network named "local" in Gardner (hereinafter "Gardner Local"). Table 4 below presents the results of such a comparison. Using each such neural network, the researchers determined RMSE and si-RMSE for (i) real digital scenes in which chrome balls or probes were located near a center of the digital scene and not affected by local geometry (e.g., shadows) or close to a light source, as indicated by "Center" in Table 4; (ii) real digital scenes in which chrome balls or probes were not located near a center of the digital scene, as indicated by "Off-Center" in Table 4; and (iii) both types of real digital scenes in which the chrome balls were located anywhere, as indicated by "All" in Table 4. As shown in Table 4, the local-lighting-estimation-neural network from the lighting estimation system 110 demonstrated a better corresponding relighting error as measured in RMSE and si-RMSE than either neural networks for Gardner Global or Gardner Local.

TABLE 4

|  |  | All | Center | Off-Center |
| --- | --- | --- | --- | --- |
| RMSE | Gardner Global | 0.081 ± 0.015 | 0.079 ± 0.021 | 0.086 ± 0.019 |
|  | Gardner Local | 0.072 ± 0.013 | 0.086 ± 0.027 | 0.068 ± 0.019 |
|  | Lighting Estimation System | 0.049 ± 0.006 | 0.049 ± 0.019 | 0.051 ± 0.012 |
| si-RMSE | Gardner Global | 0.120 ± 0.013 | 0.124 ± 0.018 | 0.120 ± 0.031 |
|  | Gardner Local | 0.092 ± 0.017 | 0.120 ± 0.035 | 0.084 ± 0.016 |
|  | Lighting Estimation System | 0.062 ± 0.005 | 0.072 ± 0.011 | 0.055 ± 0.009 |

In addition to the quantitative results shown in Tables 3 and 4, researchers conducted a qualitative comparison as evaluated by study participants. As indicated in Table 5, the researchers displayed pairs of images to participants, where the images were generated by each of a neural network for Gardner Global, a neural network for Gardner Local, and a local-lighting-estimation-neural network for the lighting estimation system 110. Each pair of images includes a reference image rendered with a ground-truth-light probe and a digital scene rendered with a lighting estimate from one of a neural network for Gardner Global, a neural network for Gardner Local, or a local-lighting-estimation-neural network for the lighting estimation system 110. Each participant was shown a version of all 20 real digital scenes, where either a random ground-truth-light probe or lighting estimates from the compared neural networks is presented. To prevent statistical bias, researchers permitted the participants to view pairs of images in a test at most twice and displayed two sentinels (i.e., obvious choices) to the participants to filter out bad responses. The researchers showed images to a total of 144 unique participants, resulting in an average of 20 votes per ground-truth-light probe.

FIG. 7 illustrates an example of a real digital scene and corresponding images shown to participants with ground-truth-light probes or lighting estimates from one of a neural network for Gardner Global, a neural network for Gardner Local, or a local-lighting-estimation-neural network for the lighting estimation system 110. As shown in FIG. 7, a real digital scene 702 includes designated positions 704a and 704b. As further shown in FIG. 7, ground-truth images 706a and 706b each include a ground-truth-light probe corresponding to the designated positions 704a and 704b, respectively; Gardner-global images 708a and 708b each include lighting estimates for an object located at the designated positions 704a and 704b, respectively, as determined by a neural network for Gardner Global; Gardner-local images 710a and 710b each include lighting estimates for an object located at the designated positions 704a and 704b, respectively, as determined by a neural network for Gardner Local; and lighting estimation images 712a and 712b each include lighting estimates for an object located at the designated positions 704a and 704b, respectively, as determined by the lighting estimation system 110 using an local-lighting-estimation-neural network. As FIG. 7 illustrates, the lighting estimation images 712a and 712b more closely resemble the lighting conditions in ground-truth images 706a and 706b than the Gardner-global images 708a and 708b or the Gardner-local images 710a and 710b.

Table 5 illustrates the results of participant evaluations of such images. As shown in Table 5, participants were generally more likely to confuse images comprising lighting conditions from the lighting estimation system 110 with ground-truth images than to confuse images comprising lighting conditions from a neural network of Gardner with ground-truth images. As shown by the "All" column in Table 5, the lighting estimation system 110 resulted in a 35.8% confusion rate compared to 28.0% and 31.0% confusion rates for Gardner Global and Gardner Local, respectively. A perfect confusion rate would equal 50% under the conditions described above.

By contrast, and as shown by the "Center" column in Table 5, the lighting estimation system 110 resulted in a 38.3% confusion rate compared to 39.8% and 25.2% confusion rates for Gardner Global and Gardner Local, respectively, when probes were located near a center of the digital scene and not affected by local geometry (e.g., shadows) or close to a light source. In other words, the neural network from Gardner Global slightly outperformed the lighting estimation system 110 when a probe was located in a center—presumably because the neural network for Gardner Global is trained for digital scenes with lighting based on a center position and because the non-parametric outputs in Gardner Global predict sharper shadows that participants apparently appreciated. Finally, as shown by the "Off-Center" column in Table 5, the lighting estimation system 110 resulted in a 34.5% confusion rate compared to 27.1% and 29.5% confusion rates for Gardner Global and Gardner Local, respectively, when probes were not located near a center.

TABLE 5

|  | All | Center | Off-Center |
| --- | --- | --- | --- |
| Gardner Global | 31.0% | 39.8% | 27.1% |
| Gardner Local | 28.0% | 25.2% | 29.5% |
| Lighting Estimation System | 35.8% | 38.3% | 34.5% |

As further noted above, the lighting estimation system 110 can generate location-specific-lighting parameters that indicate more accurate and more realistic lighting conditions for positions within a digital scene than existing augmented-reality systems. Such systems include existing augment-reality systems that generate lighting parameters for an entire image, as described by Jonathan T. Barron, "Intrinsic Scene Properties from a Single RGB-D Image," *Proceedings of the IEEE Conference on Computer Vision and Pattern Recognition* (2013) (hereinafter "Barron"). To facilitate a comparison with Barron, the lighting estimation system 110 modified digital scenes from the NYU-v2 dataset and applied a local-lighting-estimation-neural network to generate location-specific-lighting parameters for various positions within such digital scenes. An existing augmented-reality system as described in Barron also modified the same digital scenes and applied an algorithm to generate lighting parameters for such digital scenes.

Figure 8:
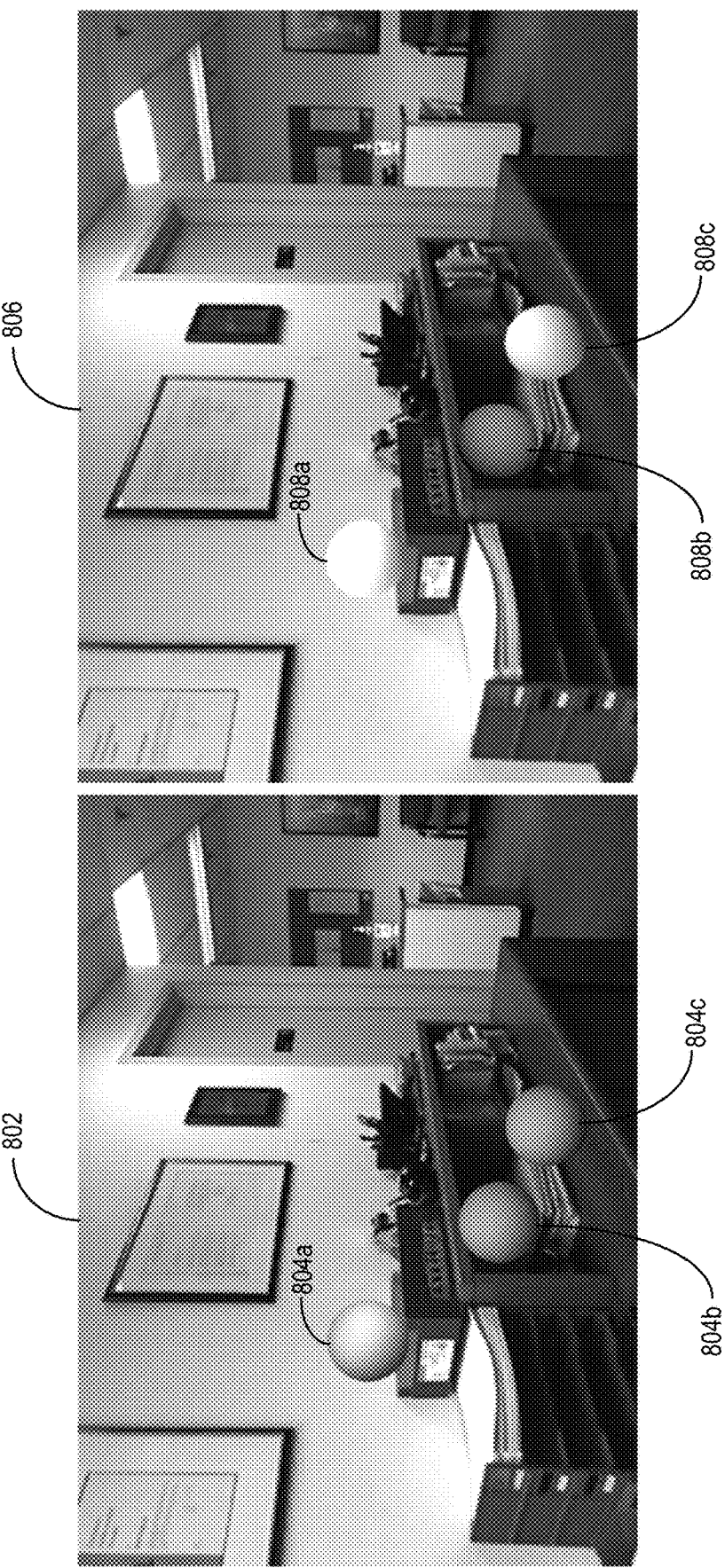
FIGS. 8A-8B illustrate a digital scene comprising virtual objects at designated positions illuminated according to location-specific-lighting parameters generated by a lighting estimation system and according to generic lighting parameters generated by an existing augmented-reality system.

FIG. 8A illustrates an example rendering of a digital scene with positions illuminated according to location-specific-lighting parameters from Barron. By contrast, FIG. 8B illustrates an example rendering of a digital scene with positions illuminated according to lighting parameters from the lighting estimation system 110. In particular, FIG. 8A depicts a modified digital scene 802 comprising virtual objects 804a-804c at designated positions illuminated according to lighting parameters generated by an algorithm from Barron. FIG. 8B depicts a modified digital scene 806 comprising virtual objects 808a-808c at the designated positions illuminated according to localized-lighting-spherical-harmonic coefficients generated by the lighting estimation system 110.

As indicated by a comparison of FIGS. 8A and 8B, the lighting estimation system 110 generates localized-lighting-spherical-harmonic coefficients that more accurately indicate lighting conditions and shading specific to designated positions within a digital scene than Barron. Whereas Barron does not capture abrupt changes in ambient lighting caused by local geometry, the lighting estimation system 110 accurately captures such changes in ambient lighting. In addition to more realistic lighting conditions, the lighting estimation system 110 more quickly renders such modified digital scenes. Whereas Barron requires specific depth information and expends up to 1.5 hours to render a single modified digital scene, the lighting estimation system 110 renders a single digital scene in less than 20 milliseconds.

Figure 9:
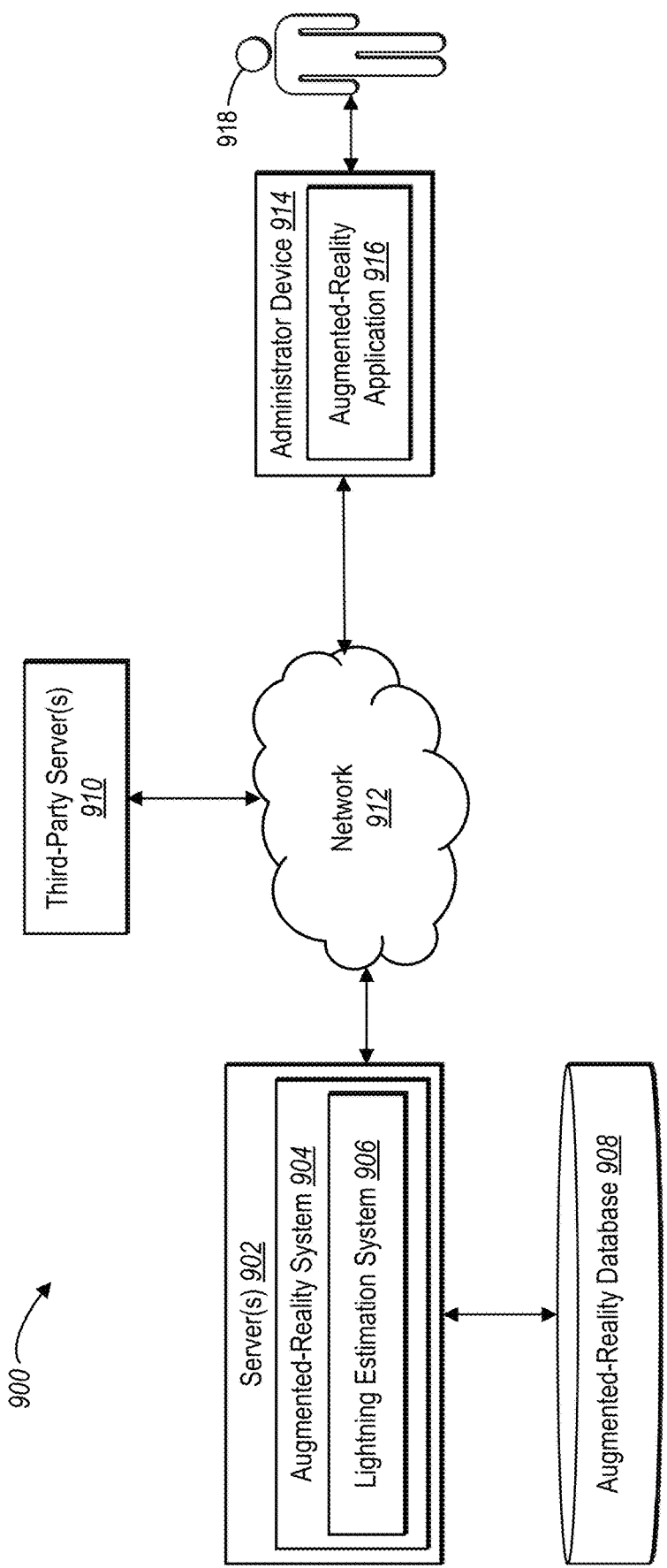
FIG. 9 illustrates a block diagram of an environment in which the lighting estimation system can operate in accordance with one or more embodiments.
Figure 10:
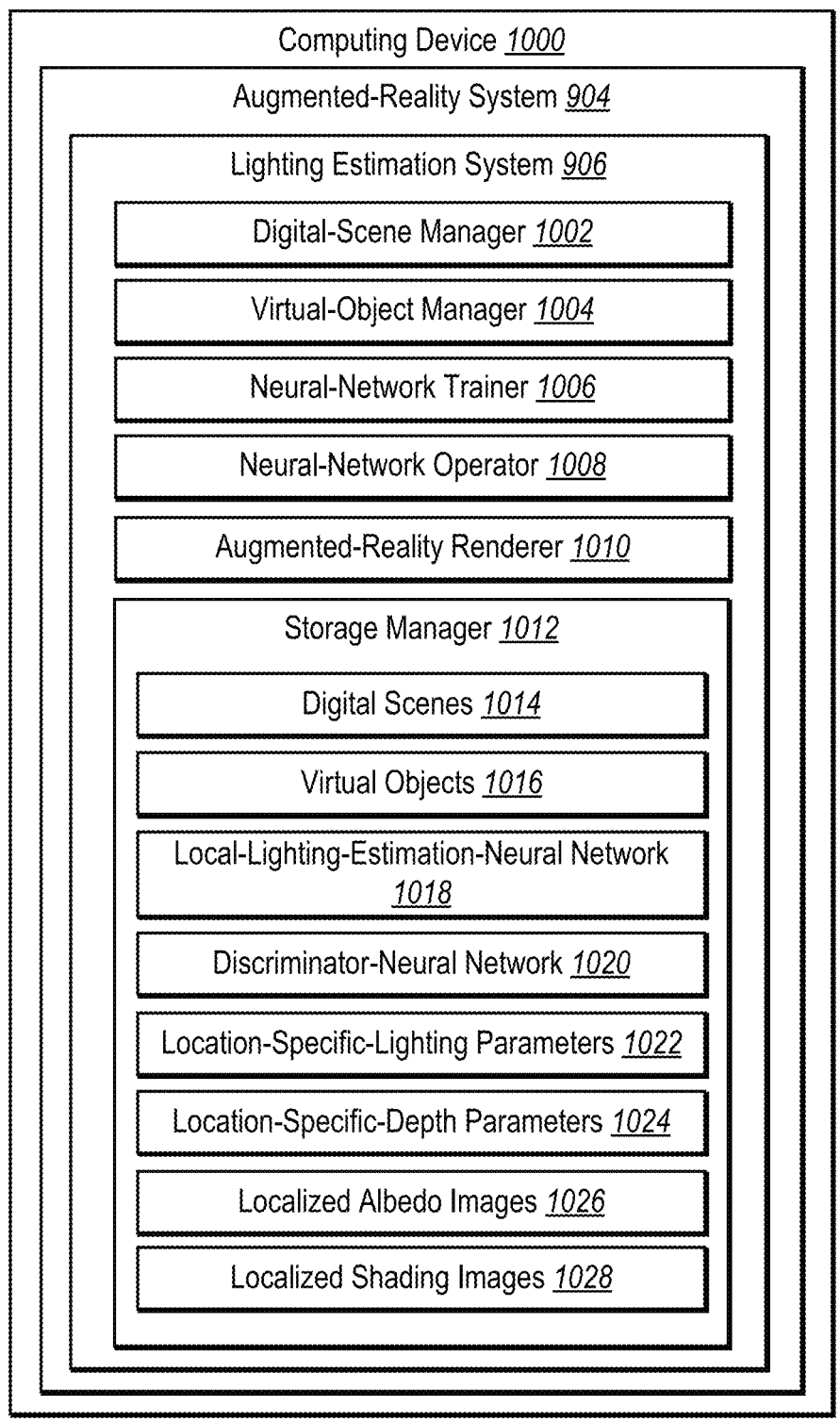
FIG. 10 illustrates a schematic diagram of the lighting estimation system of FIG. 9 in accordance with one or more embodiments.

Turning now to FIGS. 9 and 10, these figures provide an overview of an environment in which a lighting estimation system can operate and an example of an architecture for the lighting estimation system. In particular, FIG. 9 depicts a block diagram illustrating an exemplary system environment ("environment") 900 in which a lighting estimation system 906 can operate in accordance with one or more embodiments. Specifically, FIG. 9 illustrates the environment 900 comprising server(s) 902, third-party server(s) 910, a network 912, a client device 914, and a user 918 associated with the client device 914. Although FIG. 9 illustrates one client device and one user, in alternative embodiments, the environment 900 can include any number of computing devices and associated users. Similarly, although FIG. 9 illustrates a particular arrangement of the server(s) 902, the third-party server(s) 910, the network 912, the client device 914, and the user 918, various additional arrangements are possible.

Figure 12:
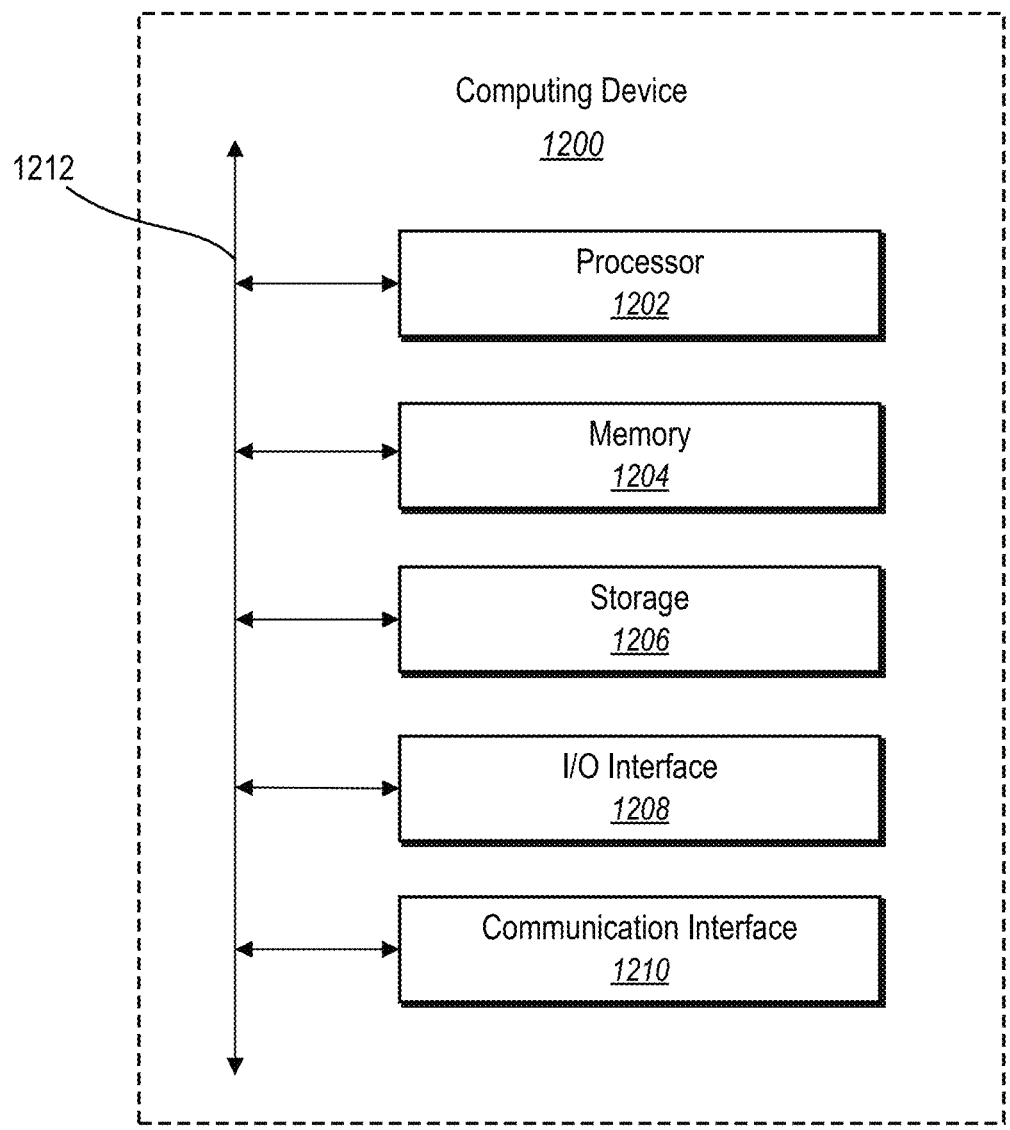
FIG. 12 illustrates a block diagram of an exemplary computing device for implementing one or more embodiments of the present disclosure.

As shown in FIG. 9, the server(s) 902, the third-party server(s) 910, the network 912, and the client device 914 may be communicatively coupled with each other either directly or indirectly, such as coupling through the network 912, which is described further below in relation to FIG. 12. The server(s) 902 and the client device 914 may include any type of computing device, including one or more computing devices as discussed further below in relation to FIG. 12.

As depicted in FIG. 9, the server(s) 902 can generate, store, receive, and/or transmit any type of data, including inputs of digital scenes into neural networks or user inputs requesting a rendering of a virtual object to create an augmented-reality scene. For example, the server(s) 902 can receive a user input from the client device 914 requesting to render a virtual object at a designated position within a digital scene and then utilize a local-lighting-estimation-neural network to generate location-specific-lighting parameters for the designated position. Upon generating such parameters, the server(s) 902 can further render a modified digital scene comprising the virtual object at the designated position illuminated according to the location-specific-lighting parameters. In some embodiments, the server(s) 902 comprise a data server, a communication server, or a web-hosting server.

As further shown in FIG. 9, the server(s) 902 can include an augmented-reality system 904. In general, the augmented-reality system 904 facilitates the generation, modification, sharing, accessing, storing, and/or deletion of digital content in augmented-reality-based imagery (e.g., two-dimensional-digital image of a scene or three-dimensional-digital model of a scene). For example, the augmented-reality system 904 can use the server(s) 902 to generate modified digital images or models comprising virtual objects or modify existing digital scenes. In certain implementations, the augmented-reality system 904 uses the server(s) 902 to receive user inputs identifying digital scenes, virtual objects, or designated positions within digital scenes from the client device 914 or transmit data representing digital scenes, virtual objects, or designated positions to the client device 914.

In addition to the augmented-reality system 904, the server(s) 902 include the lighting estimation system 906. The lighting estimation system 906 is an embodiment (and can perform the functions, methods, and processes) of the lighting estimation system 110 described above. In some embodiments, for example, the lighting estimation system 906 uses the server(s) 902 to identify a request to render a virtual object at a designated position within a digital scene. The lighting estimation system 906 further uses the server(s) 902 to extract a global feature vector from the digital scene using a global anterior set of network layers of a local-lighting-estimation-neural network. Similarly, the lighting estimation system 906 further uses the server(s) 902 to extract a local feature vector from a local patch of the digital scene utilizing a local anterior set of network layers of the local-lighting-estimation-neural network. Based on a combined feature vector, the lighting estimation system 906 further uses the server(s) 902 to (i) generate location-specific-lighting parameters for the designated position using a posterior set of layers of the local-lighting-estimation-neural network and (ii) render a modified digital scene comprising the virtual object at the designated position illuminated according to the location-specific-lighting parameters.

As suggested by previous embodiments, the lighting estimation system 906 can be implemented in whole or in part by the individual elements of the environment 900. Although FIG. 9 illustrates the lighting estimation system 906 implemented within the server(s) 902, components of the lighting estimation system 906 can be implemented in other components of the environment 900. For instance, in some embodiments, the client device 914 comprises the lighting estimation system 906 and performs all of the functions, methods, and processes of the lighting estimation system 906 described above and below. This disclosure describes the components of the lighting estimation system 906 further below with regard to FIG. 10.

As further shown in FIG. 9, in some embodiments, the client device 914 comprises a computing device that allows the user 918 to send and receive digital communications. For example, the client device 914 can include a desktop computer, laptop computer, smartphone, tablet, or other electronic device. In some embodiments, the client device 914 further includes one or more software applications (e.g., an augmented-reality application 916) that allows a user 918 to send and receive digital communications. For example, the augmented-reality application 916 can be a software application installed on the client device 914 or a software application hosted on the server(s) 902. When hosted on the server(s) 902, the augmented-reality application 916 may be accessed by the client device 914 through another application, such as a web browser. In some implementations, the augmented-reality application 916 includes instructions that, when executed by a processor, cause the client device 914 to present one or more graphical user interfaces, such as user interfaces comprising digital scenes and/or virtual objects for the user 918 to select and for the lighting estimation system 906 to include as inputs when generating location-specific-lighting parameters or modified digital scenes.

As also illustrated in FIG. 9, the augmented-reality system 904 is communicatively coupled to an augmented-reality database 908. In one or more embodiments, the augmented-reality system 904 accesses and queries data from the augmented-reality database 908 associated with requests from the lighting estimation system 906. For instance, the augmented-reality system 904 may access digital scenes, virtual objects, designated positions within digital scenes, location-specific-lighting parameters, or location-specific-depth parameters for the lighting estimation system 906. As shown in FIG. 9, the augmented-reality database 908 is separately maintained from the server(s) 902. Alternatively, in one or more embodiments, the augmented-reality system 904 and the augmented-reality database 908 comprise a single combined system or subsystem within the server(s) 902.

Turning now to FIG. 10, this figure provides additional detail regarding components and features of the lighting estimation system 906. In particular, FIG. 10 illustrates a computing device 1000 implementing the augmented-reality system 904 and the lighting estimation system 906. In some embodiments, the computing device 1000 comprises one or more servers (e.g., the server(s) 902). In other embodiments, the computing device 1000 comprises one or more client devices (e.g., the client device 914).

As shown in FIG. 10, the computing device 1000 includes the augmented-reality system 904. In some embodiments, the augmented-reality system 904 uses its components to provide tools for generating digital scenes or other augmented-reality-based imagery or modifying existing digital scenes or other augmented-reality-based imagery within a user interface of the augmented-reality application 916. Additionally, in some cases, the augmented-reality system 904 facilitates the generation, modification, sharing, accessing, storing, and/or deletion of digital content in augmented-reality-based imagery.

As further shown in FIG. 10, the computing device 1000 includes the lighting estimation system 906. The lighting estimation system 906 includes, but is not limited to, a digital-scene manager 1002, a virtual-object manager 1004, a neural-network trainer 1006, a neural-network operator 1008, an augmented-reality renderer 1010, and/or a storage manager 1012. The following paragraphs describe each of these components in turn.

As just mentioned, the lighting estimation system 906 includes the digital-scene manager 1002. The digital-scene manager 1002 identifies, analyzes, and receives inputs concerning digital scenes. For example, in some embodiments, the digital-scene manager 1002 receives user inputs identifying digital scenes and presents digital scenes from an augmented-reality application. Additionally, in some embodiments, the digital-scene manager 1002 identifies multiple digital scenes for presentation as part of a sequence of images (e.g., an augmented-reality sequence).

As further shown in FIG. 10, the virtual-object manager 1004 identifies, analyzes, and receives inputs concerning virtual objects. For example, in some embodiments, the virtual-object manager 1004 receives user inputs identifying virtual objects and requesting that the lighting estimation system 110 render virtual objects at designated locations within digital scenes. Additionally, in some embodiments, the virtual-object manager 1004 provides selectable options for virtual objects, such as selectable options shown in a user interface of an augmented-reality application.

As further shown in FIG. 10, the neural-network trainer 1006 trains a local-lighting-estimation-neural network 1018. For example, in some embodiments, the neural-network trainer 1006 trains the local-lighting-estimation-neural network 1018 as illustrated in FIG. 4A or 4B, respectively. Among other embodiments, for example, the neural-network trainer 1006 may use a discriminator-neural network 1020 to determine an adversarial loss when training the local-lighting-estimation-neural network 1018. In some embodiments, the neural-network trainer 1006 further communicates with the storage manager 1012 to generate, apply, and/or access digital training scenes from digital scenes 1014, ground-truth-lighting parameters from location-specific-lighting parameters 1022, ground-truth-depth parameters from location-specific-depth parameters 1024, localized albedo images 1026, localized shading image 1028, and/or the local-lighting-estimation-neural network 1018.

As further shown in FIG. 10, the neural-network operator 1008 applies a trained version of the local-lighting-estimation-neural network 1018. For example, in some embodiments, the neural-network operator 1008 applies the local-lighting-estimation-neural network 1018 as illustrated in FIG. 1 or 4C, respectively. In some embodiments, the neural-network operator 1008 further communicates with the the storage manager 1012 to apply and/or access digital scenes from the digital scenes 1014, virtual objects from virtual objects 1016, location-specific-lighting parameters from the location-specific-lighting parameters 1022, location-specific-depth parameters from the location-specific-depth parameters 1024, and/or the local-lighting-estimation-neural network 1018.

In addition to the neural-network operator 1008, in some embodiments, the lighting estimation system 906 further comprises the augmented-reality renderer 1010. The augmented-reality renderer 1010 renders modified digital scenes comprising virtual objects, such as the digital scenes shown in FIGS. 4B-4D. For example, in some embodiments, based on a request to render a virtual object at a designated position within a digital scene, the augmented-reality renderer 1010 renders a modified digital scene comprising the virtual object at the designated position illuminated according to location-specific-lighting parameters from the neural-network operator 1008.

In one or more embodiments, each of the components of the lighting estimation system 906 are in communication with one another using any suitable communication technologies. Additionally, the components of the lighting estimation system 906 can be in communication with one or more other devices including one or more client devices described above. Although the components of the lighting estimation system 906 are shown to be separate in FIG. 10, any of the subcomponents may be combined into fewer components, such as into a single component, or divided into more components as may serve a particular implementation. Furthermore, although the components of FIG. 10 are described in connection with the lighting estimation system 906, at least some of the components for performing operations in conjunction with the lighting estimation system 906 described herein may be implemented on other devices within the environment 900.

Each of the components 1002-1028 of the lighting estimation system 906 can include software, hardware, or both. For example, the components 1002-1028 can include one or more instructions stored on a computer-readable storage medium and executable by processors of one or more computing devices, such as a client device or server device. When executed by the one or more processors, the computer-executable instructions of the lighting estimation system 906 can cause the computing device(s) to perform the methods described herein. Alternatively, the components 1002-1028 can include hardware, such as a special-purpose processing device to perform a certain function or group of functions. Alternatively, the components 1002-1028 of the lighting estimation system 906 can include a combination of computer-executable instructions and hardware.

Furthermore, the components 1002-1028 of the lighting estimation system 906 may, for example, be implemented as one or more operating systems, as one or more stand-alone applications, as one or more generators of an application, as one or more plug-ins, as one or more library functions or functions that may be called by other applications, and/or as a cloud-computing model. Thus, the components 1002-1028 may be implemented as a stand-alone application, such as a desktop or mobile application. Furthermore, the components 1002-1028 may be implemented as one or more web-based applications hosted on a remote server. The components 1002-1028 may also be implemented in a suite of mobile device applications or "apps." To illustrate, the components 1002-1028 may be implemented in a software application, including, but not limited to, ADOBE ILLUSTRATOR, ADOBE EXPERIENCE DESIGN, ADOBE CREATIVE CLOUD, ADOBE PHOTOSHOP, PROJECT AERO, or ADOBE LIGHTROOM. "ADOBE," "ILLUSTRATOR," "EXPERIENCE DESIGN," "CREATIVE CLOUD," "PHOTOSHOP," "PROJECT AERO," and "LIGHTROOM" are either registered trademarks or trademarks of Adobe Inc. in the United States and/or other countries.

Figure 11:
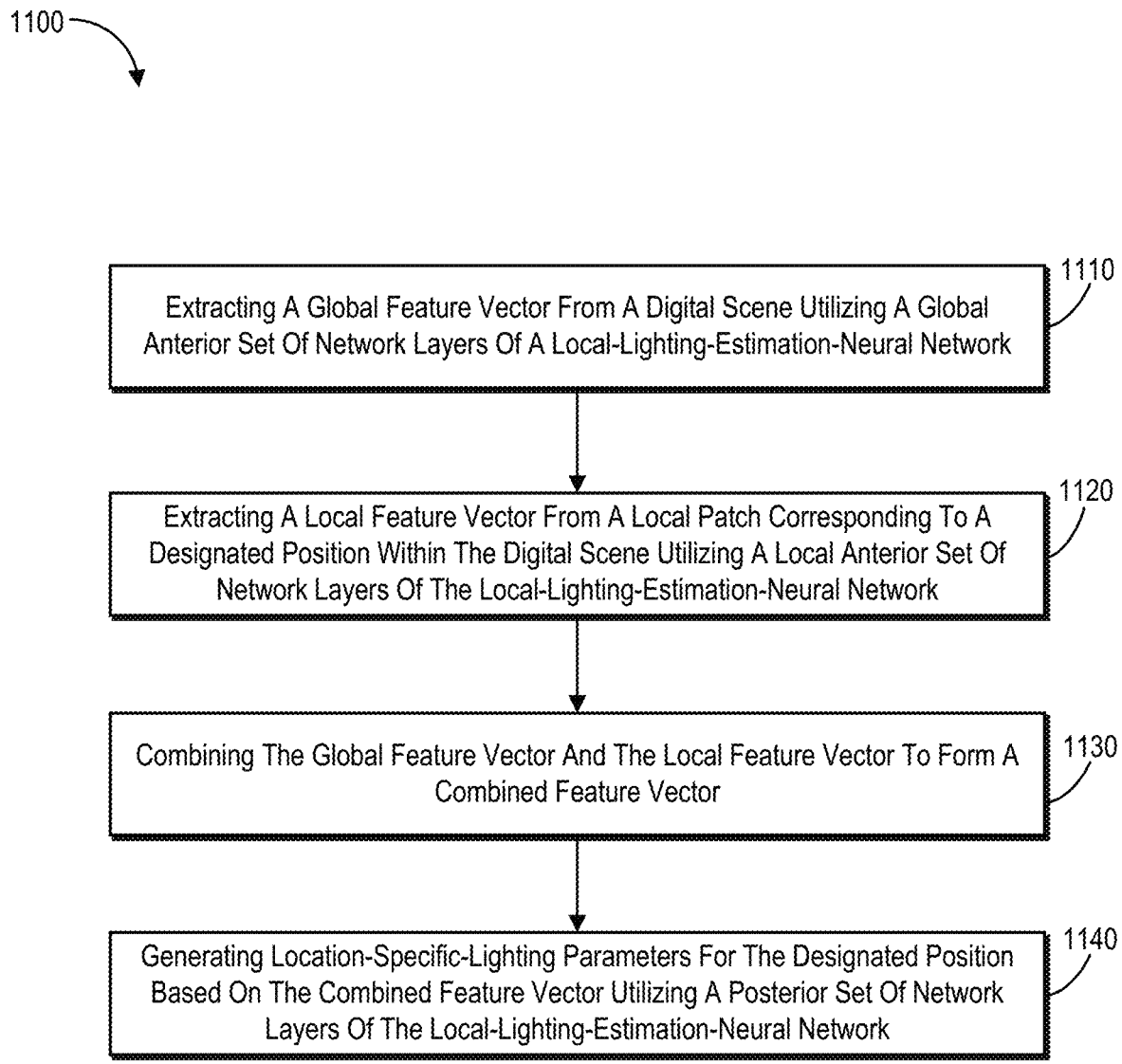
FIG. 11 illustrates a flowchart of a series of acts of using a local-lighting-estimation-neural network to generate location-specific-lighting parameters for a designated position within a digital scene in accordance with one or more embodiments.

Turning now to FIG. 11, this figure illustrates a flowchart of a series of acts 1100 of using a local-lighting-estimation-neural network to generate location-specific-lighting parameters for a designated position within a digital scene in accordance with one or more embodiments. While FIG. 11 illustrates acts according to one embodiment, alternative embodiments may omit, add to, reorder, and/or modify any of the acts shown in FIG. 11. The acts of FIG. 11 can be performed as part of a method. Alternatively, a non-transitory computer readable storage medium can comprise instructions that, when executed by one or more processors, cause a computing device to perform the acts depicted in FIG. 11. In still further embodiments, a system can perform the acts of FIG. 11.

As shown in FIG. 11, the acts 1100 include an act 1110 of extracting a global feature vector from a digital scene utilizing a global anterior set of network layers of a local-lighting-estimation-neural network. For example, in some embodiments, extracting the global feature vector from the digital scene utilizing the global anterior set of network layers comprises: extracting a global feature map from the digital scene utilizing an initial network layer of the global anterior set of network layers; and extracting the global feature vector from the global feature map utilizing a subsequent network layer of the global anterior set of network layers. In certain implementations, the global anterior set of network layers comprises a global set of blocks from a densely connected convolutional network and a global encoder.

Relatedly, in certain implementations, extracting the global feature vector from the global feature map comprises: identifying a local position indicator for the designated position within the digital scene; modifying the global feature map based on the local position indicator for the designated position; and extracting the global feature vector from the modified global feature map utilizing the subsequent network layer of the global anterior set of network layers. Further, in certain implementations, modifying the global feature map based on the local position indicator for the designated position comprises: generating a masking feature map based on the local patch; and applying the masking feature map to the global feature map to generate a masked-dense-feature map.

As further shown in FIG. 11, the acts 1100 include an act 1120 of extracting a local feature vector from a local patch corresponding to a designated position within the digital scene utilizing a local anterior set of network layers of the local-lighting-estimation-neural network. For example, in certain embodiments, extracting the local feature vector from the local patch of the digital scene utilizing the local anterior set of network layers comprises: extracting a local feature map from the local patch of the digital scene utilizing an initial network layer of the local anterior set of network layers; and extracting the local feature vector from the local feature map utilizing a subsequent network layer of the local anterior set of network layers. In certain implementations, the local anterior set of network layers comprises a local set of blocks from a densely connected convolutional network and a local encoder.

As further shown in FIG. 11, the acts 1100 include an act 1130 of combining the global feature vector and the local feature vector to form a combine feature vector. For example, in certain implementations, the act 1130 includes generating a combined feature vector by combining a global feature vector extracted from the modified global feature map and a local feature vector extracted from the local feature map.

As further shown in FIG. 11, the acts 1100 include an act 1140 of generating location-specific-lighting parameters for the designated position based on the combined feature vector utilizing a posterior set of network layers of the local-lighting-estimation-neural network. In certain implementations, the posterior set of network layers comprises multiple fully connected layers.

As suggested above, in certain implementations, generating the location-specific-lighting parameters for the designated position comprises generating localized-lighting-spherical-harmonic coefficients indicating lighting conditions for an object at the designated position. Similarly, in some cases, generating the location-specific-lighting parameters for the designated position comprises generating localized-lighting-spherical-harmonic coefficients of degree five for each color channel, the localized-lighting-spherical-harmonic coefficients indicating lighting conditions for an object at the designated position.

Further, in some embodiments, generating the location-specific-lighting parameters for the designated position comprises: extracting a latent feature vector from the combined feature vector utilizing an initial network layer of the posterior set of network layers; and generating the location-specific-lighting parameters from the latent feature vector utilizing a subsequent network layer of the posterior set of network layers.

In addition to the acts 1110-1140, in some cases, the acts 1100 further include identifying a request to render a virtual object at a designated position within a digital scene; and, based on the request, rendering a modified digital scene comprising the virtual object at the designated position illuminated according to the location-specific-lighting parameters.

Similarly, in one or more embodiments, the acts 1100 further include identifying a position-adjustment request to move the virtual object from the designated position within the digital scene to a new designated position within the digital scene; extracting a new global feature vector from the digital scene utilizing the global anterior set of network layers; extracting a new local feature vector from a new local patch of the digital scene utilizing the local anterior set of network layers; combining the new global feature vector and the new local feature vector to form a new combined feature vector; generating new location-specific-lighting parameters for the new designated position based on the new combined feature vector utilizing the posterior set of network layers; and based on the position-adjustment request, rendering an adjusted digital scene comprising the virtual object at the new designated position illuminated according to the new location-specific-lighting parameters.

As suggested above, in some implementations, the acts 1100 further include generating location-specific-depth parameters for the designated position based on the combined feature vector utilizing an alternative posterior set of network layers; and rendering the modified digital scene comprising the virtual object at the designated position according to the location-specific-depth parameters. In some cases, generating the location-specific-depth parameters for the designated position comprises generating localized-depth-spherical-harmonic coefficients indicating a location for the object at the designated position. Similarly, in one or more embodiments, generating the location-specific-depth parameters for the designated position comprises generating localized-depth-spherical-harmonic coefficients of degree five indicating a location for an object at the designated position.

Additionally, in certain implementations, the acts 1100 further include extracting skip links from the subsequent network layer of the local anterior set of network layers as part of processing the local feature map; generating a coded vector from the combined feature vector utilizing the posterior set of network layers; and utilizing a decoder to reconstruct a localized albedo image representing color within the local patch and a localized shading image representing shading within the local patch based on the skip links and the coded vector.

As indicated above, in some cases, the acts 1100 further include training the local-lighting-estimation-neural network by: comparing the location-specific-lighting parameters with a set of ground-truth-lighting parameters for the designated position within the digital scene to determine a training loss; and modifying network parameters of the local-lighting-estimation-neural network based on the training loss. In some such embodiments, the acts 1100 also include training the local-lighting-estimation-neural network by: generating location-specific-depth parameters for the designated position based on the combined feature vector utilizing an alternative posterior set of network layers; comparing the location-specific-depth parameters with a set of ground-truth-depth parameters for the designated position within the digital scene to determine an additional training loss; and modifying the network parameters of the local-lighting-estimation-neural network based on the additional training loss.

In one or more embodiments, the acts 1100 further include training the local-lighting-estimation-neural network by: extracting skip links from a network layer of the local anterior set of network layers as part of processing the local feature map; generating a coded vector from the combined feature vector utilizing an alternative posterior set of network layers of the local-lighting-estimation-neural network; utilizing a decoder to reconstruct a localized albedo image representing reflectance of light within the local patch and a localized shading image representing shading within the local patch based on the skip links and the coded vector; determining a ground-truth loss based on a comparison of the localized albedo image to a ground-truth-albedo image and the localized shading image to a ground-truth-shading image; determining a reconstruction loss based on a comparison of the local patch to the localized albedo image and the localized shading image; and modifying the network parameters of the local-lighting-estimation-neural network based on the ground-truth loss and the reconstruction loss.

As further suggested above, in one or more embodiments, the acts 1100 further include training the local-lighting-estimation-neural network by: extracting a latent feature vector from the combined feature vector utilizing an initial network layer of the posterior set of network layers; modifying the latent feature vector utilizing a gradient reversal layer to generate a gradient-modified-latent-feature vector; determining an adversarial loss based on a discriminator-neural network comparing the gradient-modified-latent-feature vector and a ground-truth-feature vector corresponding to a ground-truth-digital scene; and modifying the network parameters of the local-lighting-estimation-neural network based on the adversarial loss.

In addition (or in the alternative) to the acts describe above, in some embodiments, the acts 1100 include a step for generating location-specific-lighting parameters for the designated position from global features and local features of the digital scene by utilizing a local-lighting-estimation-neural network. For instance, the algorithms and acts described in reference to FIG. 4C can comprise the corresponding acts for performing a step for generating location-specific-lighting parameters for the designated position from global features and local features of the digital scene by utilizing a local-lighting-estimation-neural network.

Embodiments of the present disclosure may comprise or utilize a special-purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or generators and/or other electronic devices. When information is transferred, or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface generator (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In one or more embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural marketing features and/or methodological acts, it is to be understood that the subject matter defined in the appended claims is not necessarily limited to the described marketing features or acts described above. Rather, the described marketing features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program generators may be located in both local and remote memory storage devices.

Embodiments of the present disclosure can also be implemented in cloud computing environments. In this description, "cloud computing" is defined as a subscription model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing subscription model can be composed of various characteristics such as, for example, on-demand self-service, broad network access, resource pooling, rapid elasticity, measured service, and so forth. A cloud-computing subscription model can also expose various service subscription models, such as, for example, Software as a Service ("SaaS"), a web service, Platform as a Service ("PaaS"), and Infrastructure as a Service ("IaaS"). A cloud-computing subscription model can also be deployed using different deployment subscription models such as private cloud, community cloud, public cloud, hybrid cloud, and so forth. In this description and in the claims, a "cloud-computing environment" is an environment in which cloud computing is employed.

FIG. 12 illustrates a block diagram of exemplary computing device 1200 that may be configured to perform one or more of the processes described above. As shown by FIG. 12, the computing device 1200 can comprise a processor 1202, a memory 1204, a storage device 1206, an I/O interface 1208, and a communication interface 1210, which may be communicatively coupled by way of a communication infrastructure 1212. In certain embodiments, the computing device 1200 can include fewer or more components than those shown in FIG. 12. Components of the computing device 1200 shown in FIG. 12 will now be described in additional detail.

In one or more embodiments, the processor 1202 includes hardware for executing instructions, such as those making up a computer program. As an example, and not by way of limitation, to execute instructions for digitizing real-world objects, the processor 1202 may retrieve (or fetch) the instructions from an internal register, an internal cache, the memory 1204, or the storage device 1206 and decode and execute them. The memory 1204 may be a volatile or non-volatile memory used for storing data, metadata, and programs for execution by the processor(s). The storage device 1206 includes storage, such as a hard disk, flash disk drive, or other digital storage device, for storing data or instructions related to object digitizing processes (e.g., digital scans, digital models).

The I/O interface 1208 allows a user to provide input to, receive output from, and otherwise transfer data to and receive data from computing device 1200. The I/O interface 1208 may include a mouse, a keypad or a keyboard, a touch screen, a camera, an optical scanner, network interface, modem, other known I/O devices or a combination of such I/O interfaces. The I/O interface 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1208 is configured to provide graphical data to a display for presentation to a user. The graphical data may be representative of one or more graphical user interfaces and/or any other graphical content as may serve a particular implementation.

The communication interface 1210 can include hardware, software, or both. In any event, the communication interface 1210 can provide one or more interfaces for communication (such as, for example, packet-based communication) between the computing device 1200 and one or more other computing devices or networks. As an example and not by way of limitation, the communication interface 1210 may include a network interface controller ("NIC") or network adapter for communicating with an Ethernet or other wire-based network or a wireless NIC ("WNIC") or wireless adapter for communicating with a wireless network, such as a WI-FI.

Additionally, the communication interface 1210 may facilitate communications with various types of wired or wireless networks. The communication interface 1210 may also facilitate communications using various communication protocols. The communication infrastructure 1212 may also include hardware, software, or both that couples components of the computing device 1200 to each other. For example, the communication interface 1210 may use one or more networks and/or protocols to enable a plurality of computing devices connected by a particular infrastructure to communicate with each other to perform one or more aspects of the digitizing processes described herein. To illustrate, the image compression process can allow a plurality of devices (e.g., server devices for performing image processing tasks of a large number of images) to exchange information using various communication networks and protocols for exchanging information about a selected workflow and image data for a plurality of images.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

We claim:

1. A non-transitory computer readable medium storing instructions thereon that, when executed by at least one processor, cause a computer system to:
   identify a request to render a virtual object at a designated position within a digital scene;
   extract a global feature vector from the digital scene utilizing a global anterior set of network layers of a local-lighting-estimation-neural network;
   extract a local feature vector from a local patch of the digital scene utilizing a local anterior set of network layers of the local-lighting-estimation-neural network;
   combine the global feature vector and the local feature vector to form a combined feature vector;
   generate location-specific-lighting parameters for the designated position based on the combined feature vector utilizing a posterior set of network layers of the local-lighting-estimation-neural network; and
   based on the request, render a modified digital scene comprising the virtual object at the designated position illuminated according to the location-specific-lighting parameters.

2. The non-transitory computer readable medium of claim 1, further comprising instructions that, when executed by the at least one processor, cause the computer system to:
   generate location-specific-depth parameters for the designated position based on the combined feature vector utilizing an alternative posterior set of network layers; and
   render the modified digital scene comprising the virtual object at the designated position according to the location-specific-depth parameters.

3. The non-transitory computer readable medium of claim 2, further comprising instructions that, when executed by the at least one processor, cause the computer system to:

generate the location-specific-lighting parameters for the designated position by generating localized-lighting-spherical-harmonic coefficients indicating lighting conditions for an object at the designated position; and generate the location-specific-depth parameters for the designated position by generating localized-depth-spherical-harmonic coefficients indicating a location for the object at the designated position.

4. The non-transitory computer readable medium of claim 1, further comprising instructions that, when executed by the at least one processor, cause the computer system to generate the location-specific-lighting parameters for the designated position by:

extracting a latent feature vector from the combined feature vector utilizing an initial network layer of the posterior set of network layers; and generating the location-specific-lighting parameters from the latent feature vector utilizing a subsequent network layer of the posterior set of network layers.

5. The non-transitory computer readable medium of claim 1, further comprising instructions that, when executed by the at least one processor, cause the computer system to:

extract the global feature vector from the digital scene utilizing the global anterior set of network layers by:
extracting a global feature map from the digital scene utilizing an initial network layer of the global anterior set of network layers; and
extracting the global feature vector from the global feature map utilizing a subsequent network layer of the global anterior set of network layers;

extract the local feature vector from the local patch of the digital scene utilizing the local anterior set of network layers by:
extracting a local feature map from the local patch of the digital scene utilizing an initial network layer of the local anterior set of network layers; and
extracting the local feature vector from the local feature map utilizing a subsequent network layer of the local anterior set of network layers.

6. The non-transitory computer readable medium of claim 5, further comprising instructions that, when executed by the at least one processor, cause the computer system to extract the global feature vector from the global feature map by:

identifying a local position indicator for the designated position within the digital scene;
modifying the global feature map based on the local position indicator for the designated position; and
extracting the global feature vector from the modified global feature map utilizing the subsequent network layer of the global anterior set of network layers.

7. The non-transitory computer readable medium of claim 5, further comprising instructions that, when executed by the at least one processor, cause the computer system to:

extract skip links from the subsequent network layer of the local anterior set of network layers as part of processing the local feature map;
generate a coded vector from the combined feature vector utilizing the posterior set of network layers; and
utilize a decoder to reconstruct a localized albedo image representing color within the local patch and a localized shading image representing shading within the local patch based on the skip links and the coded vector.

8. The non-transitory computer readable medium of claim 1, further comprising instructions that, when executed by the at least one processor, cause the computer system to:

identify a position-adjustment request to move the virtual object from the designated position within the digital scene to a new designated position within the digital scene;
extract a new global feature vector from the digital scene utilizing the global anterior set of network layers;
extract a new local feature vector from a new local patch of the digital scene utilizing the local anterior set of network layers;
combine the new global feature vector and the new local feature vector to form a new combined feature vector;
generate new location-specific-lighting parameters for the new designated position based on the new combined feature vector utilizing the posterior set of network layers; and
based on the position-adjustment request, render an adjusted digital scene comprising the virtual object at the new designated position illuminated according to the new location-specific-lighting parameters.

9. The non-transitory computer readable medium of claim 1, wherein:

the global anterior set of network layers comprises a global set of blocks from a densely connected convolutional network and a global encoder;
the local anterior set of network layers comprises a local set of blocks from a densely connected convolutional network and a local encoder; and
the posterior set of network layers comprises multiple fully connected layers.

10. A system comprising:
at least one processor;
at least one non-transitory computer readable medium comprising a digital scene and a local-lighting-estimation-neural network; and
instructions that, when executed by the at least one processor, cause the system to:
extract a global feature map from the digital scene utilizing a global anterior set of network layers of the local-lighting-estimation-neural network;
modify the global feature map based on a local position indicator for a designated position within the digital scene utilizing the global anterior set of network layers;
extract a local feature map from a local patch of the digital scene utilizing a local anterior set of network layers of the local-lighting-estimation-neural network;
generate a combined feature vector by combining a global feature vector extracted from the modified global feature map and a local feature vector extracted from the local feature map; and
generate location-specific-lighting parameters for the designated position based on the combined feature vector utilizing a posterior set of network layers of the local-lighting-estimation-neural network.

11. The system of claim 10, further comprising instructions that, when executed by the at least one processor, cause the system to:

identify a request to render a virtual object at the designated position within the digital scene; and
based on the request, render a modified digital scene comprising the virtual object at the designated position illuminated according to the location-specific-lighting parameters.

12. The system of claim 11, further comprising instructions that, when executed by the at least one processor, cause the system to:

generate location-specific-depth parameters for the designated position based on the combined feature vector utilizing an alternative posterior set of network layers; and render the modified digital scene comprising the virtual object at the designated position according to the location-specific-depth parameters.

13. The system of claim 12, further comprising instructions that, when executed by the at least one processor, cause the system to:

generate the location-specific-lighting parameters for the designated position by generating localized-lighting-spherical-harmonic coefficients of degree five for each color channel, the localized-lighting-spherical-harmonic coefficients indicating lighting conditions for an object at the designated position; and generate the location-specific-depth parameters for the designated position by generating localized-depth-spherical-harmonic coefficients of degree five indicating a location for the object at the designated position.

14. The system of claim 10, further comprising instructions that, when executed by the at least one processor, cause the system to modify the global feature map based on the local position indicator for the designated position by:

generating a masking feature map based on the local patch; and applying the masking feature map to the global feature map to generate a masked-dense-feature map.

15. The system of claim 10, further comprising instructions that, when executed by the at least one processor, cause the system to generate the location-specific-lighting parameters for the designated position by:

extracting a latent feature vector from the combined feature vector utilizing an initial network layer of the posterior set of network layers; and generating the location-specific-lighting parameters from the latent feature vector utilizing a subsequent network layer of the posterior set of network layers.

16. The system of claim 10, further comprising instructions that, when executed by the at least one processor, cause the system to train the local-lighting-estimation-neural network by:

comparing the location-specific-lighting parameters with a set of ground-truth-lighting parameters for the designated position within the digital scene to determine a training loss; and modifying network parameters of the local-lighting-estimation-neural network based on the training loss.

17. The system of claim 16, further comprising instructions that, when executed by the at least one processor, cause the system to train the local-lighting-estimation-neural network by:

generating location-specific-depth parameters for the designated position based on the combined feature vector utilizing an alternative posterior set of network layers;

comparing the location-specific-depth parameters with a set of ground-truth-depth parameters for the designated position within the digital scene to determine an additional training loss; and modifying the network parameters of the local-lighting-estimation-neural network based on the additional training loss.

18. The system of claim 16, further comprising instructions that, when executed by the at least one processor, cause the system to train the local-lighting-estimation-neural network by:

extracting skip links from a network layer of the local anterior set of network layers as part of processing the local feature map;

generating a coded vector from the combined feature vector utilizing an alternative posterior set of network layers of the local-lighting-estimation-neural network;

utilizing a decoder to reconstruct a localized albedo image representing reflectance of light within the local patch and a localized shading image representing shading within the local patch based on the skip links and the coded vector;

determining a ground-truth loss based on a comparison of the localized albedo image to a ground-truth-albedo image and the localized shading image to a ground-truth-shading image;

determining a reconstruction loss based on a comparison of the local patch to the localized albedo image and the localized shading image; and modifying the network parameters of the local-lighting-estimation-neural network based on the ground-truth loss and the reconstruction loss.

19. The system of claim 16, further comprising instructions that, when executed by the at least one processor, cause the system to train the local-lighting-estimation-neural network by:

extracting a latent feature vector from the combined feature vector utilizing an initial network layer of the posterior set of network layers;

modifying the latent feature vector utilizing a gradient reversal layer to generate a gradient-modified-latent-feature vector;

determining an adversarial loss based on a discriminator-neural network comparing the gradient-modified-latent-feature vector and a ground-truth-feature vector corresponding to a ground-truth-digital scene; and modifying the network parameters of the local-lighting-estimation-neural network based on the adversarial loss.

20. In a digital medium environment for rendering augmented-reality scenes, a computer-implemented method for estimating lighting conditions for virtual objects, comprising:

identifying a request to render a virtual object at a designated position within a digital scene;

performing a step for generating location-specific-lighting parameters for the designated position from global features and local features of the digital scene by utilizing a local-lighting-estimation-neural network; and based on the request, render a modified digital scene comprising the virtual object at the designated position illuminated according to the location-specific-lighting parameters.

* * * * *